(12) United States Patent
Kim et al.

(10) Patent No.: US 8,744,521 B2
(45) Date of Patent: Jun. 3, 2014

(54) MOBILE COMMUNICATION TERMINAL HAVING A PROJECTION MODULE FOR PROJECTING IMAGES ON A PROJECTION SURFACE EXTERNAL TO THE MOBILE COMMUNICATION TERMINAL

(75) Inventors: Jong Hwan Kim, Gyeonggi-do (KR); Duck Moon Shin, Seoul (KR); Jeong Hyuk Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 550 days.

(21) Appl. No.: 12/468,020

(22) Filed: May 18, 2009

(65) Prior Publication Data

US 2010/0093399 A1    Apr. 15, 2010

(30) Foreign Application Priority Data

Oct. 15, 2008    (KR) .................. 10-2008-0101103

(51) Int. Cl.
*H04M 1/00* (2006.01)

(52) U.S. Cl.
USPC ........ 455/556.1; 455/566; 455/567; 353/122; 353/31; 353/39; 353/119; 345/1.1; 345/156; 345/166; 715/719; 715/730

(58) Field of Classification Search
CPC ............ H04M 2250/16; H04M 2250/54; H04W 52/027; G06F 1/1637; G06F 1/1645; G06F 3/0425
See application file for complete search history.

(56) References Cited

U.S. PATENT DOCUMENTS

| | | | | |
|---|---|---|---|---|
| 7,884,822 B2 * | 2/2011 | Saito et al. | ................... | 345/427 |
| 2002/0154224 A1 | 10/2002 | Yoneda | | |
| 2003/0179243 A1 * | 9/2003 | Numano | ....................... | 345/782 |
| 2006/0136828 A1 * | 6/2006 | Asano | ........................... | 715/733 |
| 2007/0019096 A1 * | 1/2007 | Yoneda | .................... | 348/333.01 |
| 2007/0053586 A1 * | 3/2007 | Makino | ........................ | 382/167 |
| 2007/0057866 A1 * | 3/2007 | Lee et al. | ...................... | 345/1.1 |
| 2007/0216653 A1 * | 9/2007 | Chang | ............................ | 345/169 |
| 2007/0252822 A1 * | 11/2007 | Kim et al. | .................... | 345/173 |
| 2007/0265717 A1 * | 11/2007 | Chang | ........................... | 700/83 |

(Continued)

FOREIGN PATENT DOCUMENTS

| | | |
|---|---|---|
| CN | 101169700 | 4/2008 |
| EP | 1793270 | 6/2007 |
| TW | I305894 | 2/2009 |

OTHER PUBLICATIONS

The State Intellectual Property Office of the People's Republic of China Application Serial No. 200910149284.X, Office Action dated Nov. 26, 2012, 6 pages.

*Primary Examiner* — Rafael Pérez-Gutiérrez
*Assistant Examiner* — Keith Fang
(74) *Attorney, Agent, or Firm* — Lee, Hong, Degerman, Kang & Waimey

(57) ABSTRACT

A mobile communication terminal comprises a projection module for projecting images on a projection surface external to the mobile communication terminal; a display screen on which a first image and a second image are rendered; a user interface to allow a user interact with the mobile communication terminal; and a controller to process information, in response to user interaction with the user interface to generate an output via the projection module; wherein the user interacts with the user interface to cause at least the first image to be projected on the projection surface by the projection module, while both the first image and the second image are displayed on the display screen.

16 Claims, 89 Drawing Sheets

(56) References Cited

U.S. PATENT DOCUMENTS

| | | | |
|---|---|---|---|
| 2008/0068566 A1* | 3/2008 | Denoue et al. | 353/122 |
| 2008/0158189 A1* | 7/2008 | Kim | 345/173 |
| 2008/0239132 A1* | 10/2008 | Kohama | 348/333.01 |
| 2008/0303786 A1* | 12/2008 | Nakamura et al. | 345/156 |
| 2009/0143098 A1* | 6/2009 | Shiono | 455/556.1 |
| 2010/0031202 A1* | 2/2010 | Morris et al. | 715/863 |
| 2010/0083166 A1* | 4/2010 | Happonen | 715/784 |

* cited by examiner

MOBILE COMMUNICATION TERMINAL HAVING A PROJECTION MODULE FOR PROJECTING IMAGES ON A PROJECTION SURFACE EXTERNAL TO THE MOBILE COMMUNICATION TERMINAL

CROSS-REFERENCE TO RELATED APPLICATIONS

Pursuant to 35 USC 119, this application claims priority to the filing date of the Korean Patent Application No. 10-2008-0101103, filed on Oct. 15, 2008, the content of which is hereby incorporated by reference herein in its entirety.

TECHNICAL FIELD

The present disclosure relates to a mobile terminal and method of controlling a display thereof, and more particularly, to a mobile terminal having a projector function.

BACKGROUND

Communication terminals can be classified as mobile terminals or stationary terminals. Mobile terminals can be either handheld or vehicle mounted. Certain mobile communication terminals (hereafter "terminals") include multimedia player functionality, and allow for photographing of still images or moving pictures. Mobile terminals may be also utilized for playback of music or moving picture files, game play, broadcast reception and the like.

A projector function may be implemented in a mobile terminal so that an image displayed on a display screen of the mobile terminal can be projected onto an external surface. Unfortunately, currently developed projection features only allow for the exact image that is displayed on the mobile terminal to be projected. That is, the projection function is limited to the exact image that is displayed on the mobile terminal's display screen. Systems and methods are needed that can improve upon the current state of the art.

SUMMARY

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a mobile communication terminal comprises a projection module for projecting images on a projection surface external to the mobile communication terminal; a display screen on which a first image and a second image are rendered; a user interface to allow a user interact with the mobile communication terminal; and a controller to process information, in response to user interaction with the user interface to generate an output via the projection module. The user interacts with the user interface to cause at least the first image to be projected on the projection surface by the projection module, while both the first image and the second image are displayed on the display screen.

The display screen is divided into a first region and a second region, in response to user interaction with the user interface such that the first image is rendered on the first region and the second image is rendered on the second region.

The user interacts with the user interface to designate at least the first region or the second region as a projection region such that an image rendered on the projection region is projected on the projection surface by the projection module.

The user interface may comprise a touch screen module for accepting user input in response to user touching the display screen. A user divides the display screen into the first region and the second region by touching the display screen at a first point and touching the display screen at a second point, such that two screen regions are defined by an imaginary line connecting the first point and the second point.

When the first region is designated as the projection region, and the second region is designated as a non-projection region, one or more images selected from the second region to be displayed on the first region are projected by the projection module on the projection surface. An image is moved from the second region to the first region, in response to user interaction with the user interface by way of dragging and dropping the image from the second region into the first region.

A portion of the image rendered on the projection region is selected, in response to user interaction with the touch screen such that the selected portion of the image is projected by the projection module on the projection surface. The portion of the image is selected, in response to a user interacting with the touch screen by way of touching a first point and a second point on the touch screen, wherein coordinates of the first point and the second point define a rectangular shape comprising the portion of the selected image.

The mobile communication terminal comprises first and second touch screens, wherein the first region is designated on the first touch screen and the second region is designated on the second touch screen. The first region is designated as the non-projection region and the second region is designated as the projection region, in response to user interaction with the user interface.

In accordance with one embodiment, the method of projecting images rendered on a display screen of a mobile communication terminal is provided. The method comprises rendering a first image and a second image on a display screen of the mobile communication terminal; and projecting the first image on a projection surface external to the mobile communication terminal, while both the first image and the second image are displayed on the display screen.

The method may further comprise dividing the display screen into a first region and a second region, in response to user interaction with a user interface of the mobile communication terminal such that the first image is rendered on the first region and the second image is rendered on the second region. The user interacts with the user interface to designate at least the first region or the second region as a projection region such that an image rendered on the projection region is projected on the projection surface by the projection module.

The user interface in one implementation comprises a touch screen module for accepting user input in response to the user touching the display screen. The method may further comprise dividing the display screen into the first region and the second region, in response to the user touching the display screen at a first point and a second point, such that two screen regions are defined by an imaginary line connecting the first point and the second point.

When the first region is designated as the projection region, and the second region is designated as a non-projection region, one or more images selected from the second region to be displayed on the first region are projected by the projection module on the projection surface. In one embodiment, the method may further comprise moving an image from the second region to the first region, in response to user interaction with the user interface by way of dragging and dropping the image from the second region into the first region.

The method may further comprise selecting a portion of the image rendered on the projection region, in response to user interaction with the touch screen such that the selected portion of the image is projected by the projection module on the projection surface. In one embodiment, the portion of the image is selected, in response to a user interacting with the touch screen by way of touching a first point and a second point on the touch screen, wherein coordinates of the first point and the second point define a rectangular shape comprising the portion of the selected image.

In one embodiment, the mobile communication terminal comprises first and second touch screens, wherein the first region is designated on the first touch screen and the second region is designated on the second touch screen; and designating the first region as the non-projection region and designating the second region as the projection region, in response to user interaction with the user interface.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Mobile terminals described in this disclosure can include a mobile phone, a smart phone, a laptop computer, a digital broadcast terminal, a PDA (personal digital assistants), a PMP (portable multimedia player), a navigation system and the like.

Except a case applicable to a mobile terminal only, it is apparent to those skilled in the art that the configurations according to an embodiment described in this disclosure is applicable to such a stationary terminal as a digital TV, a desktop computer and the like.

Figure 1:
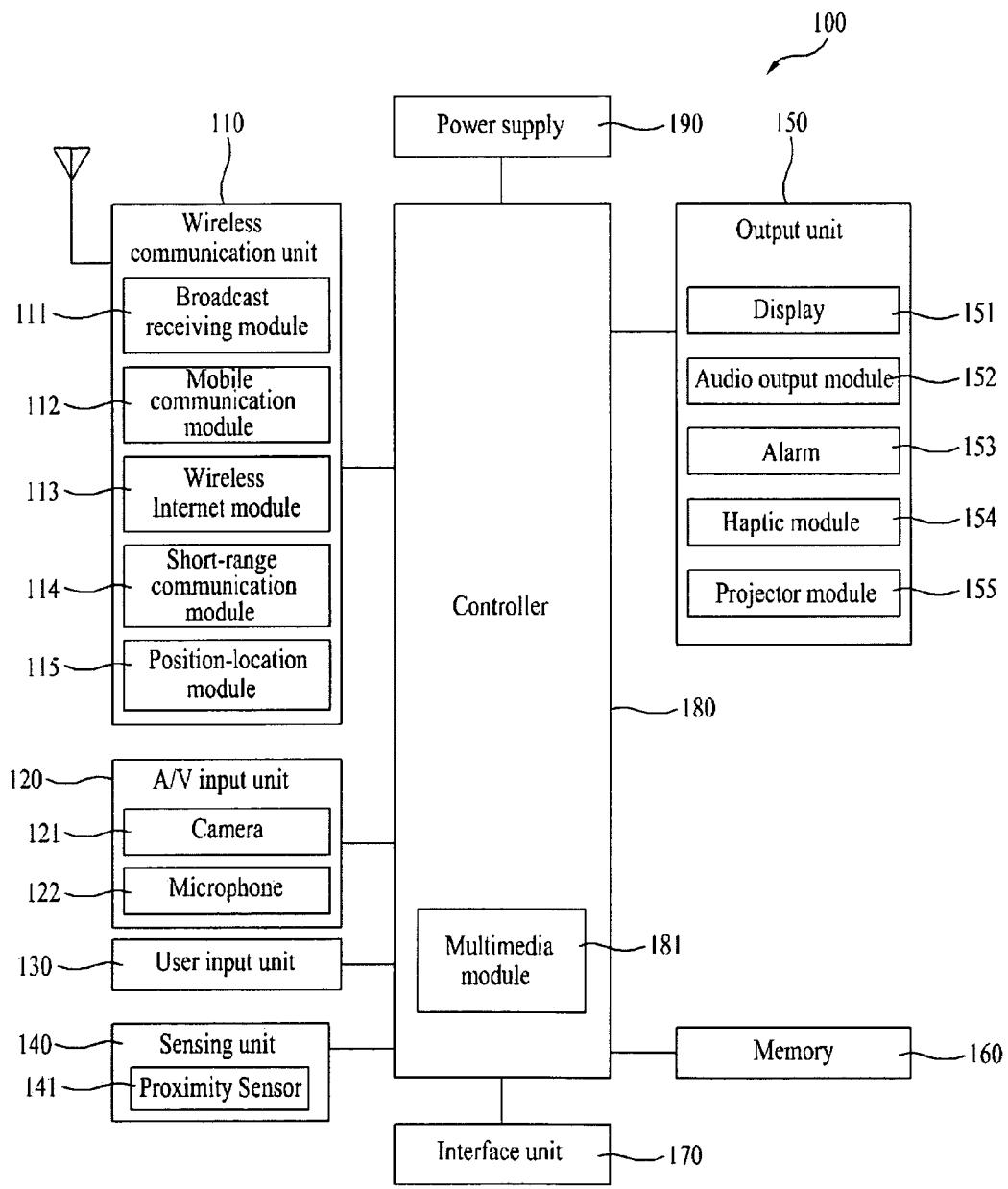
FIG. 1 is a block diagram of a mobile terminal according to one embodiment.

Referring to FIG. 1, a mobile terminal 100 according to one embodiment of the present disclosure includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In one implementation, the wireless communication unit 110 typically includes one or more components which permit wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112. The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160. The mobile communication module 112 communicates wireless signals between one or more network entities (e.g., base station, external terminal, server, etc.). Such wireless signals may represent audio, video, and data according to text/multimedia messages, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth™ and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display unit 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the mobile terminal 100 is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal 100. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal 100 is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display unit 151, an audio output module 152, an alarm unit 153, a haptic module 154, a projector module 155 and the like.

The display unit 151 is typically implemented to visually display (output) information associated with the mobile terminal 100. For instance, if the mobile terminal 100 is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display unit 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display unit 151 can be implemented in the optical transmittive type as well. In this configuration, a user is able to see an object in rear of a terminal body via the area occupied by the display unit 151 of the terminal body.

At least two display units 151 can be provided to the mobile terminal 100 in accordance with the implemented configuration of the mobile terminal 100. For instance, a plurality of display units 151 can be arranged on a single face of the mobile terminal 100 in a manner of being spaced apart from each other or being built in one body. Alternatively, a plurality of display units 151 can be arranged on different faces of the mobile terminal 100.

In case that the display unit 151 and a sensor for detecting a touch action (hereinafter called 'touch sensor') configures a mutual layer structure (hereinafter called 'touch screen'), it is able to use the display unit 151 as an input device as well as an output device. In this case, the touch sensor can be configured as a touch film, a touch sheet, a touchpad or the like.

The touch sensor can be configured to convert a pressure applied to a specific portion of the display unit 151 or a variation of a capacitance generated from a specific portion of the display unit 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display unit 151 is touched.

Referring to FIG. 1, a proximity sensor (not shown in the drawing) can be provided to an internal area of the mobile terminal 100 enclosed by the touch screen or around the touch screen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has longer durability than that of a contact type sensor and also has wider utility than the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touch screen includes the electrostatic capacity proximity sensor, it is configured to detect the proximity of a pointer using a variation of electric field according to the proximity of the pointer. In this case, the touch screen (touch sensor) can be classified as the proximity sensor.

In the following description, for clarity, an action that a pointer approaches without contacting with the touch screen to be recognized as located on the touch screen is termed 'proximity touch'. And, an action that a pointer actually touches the touch screen is termed 'contact touch'. The meaning of the position on the touch screen proximity-touched by the pointer means the position of the pointer which vertically opposes the touch screen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touch screen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.) of the mobile terminal 100. The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display unit 151 or the audio output unit 152. Hence, the display unit 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display unit 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole projector module 155.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 155.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160.

Moreover, data for various patterns of vibration and/or sound outputted in case of a touch input to the touch screen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module (not shown) is the chip for storing various kinds of information for authenticating a use authority of the mobile terminal 100 and can include User Identify Module (UIM), Subscriber Identity Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touch screen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
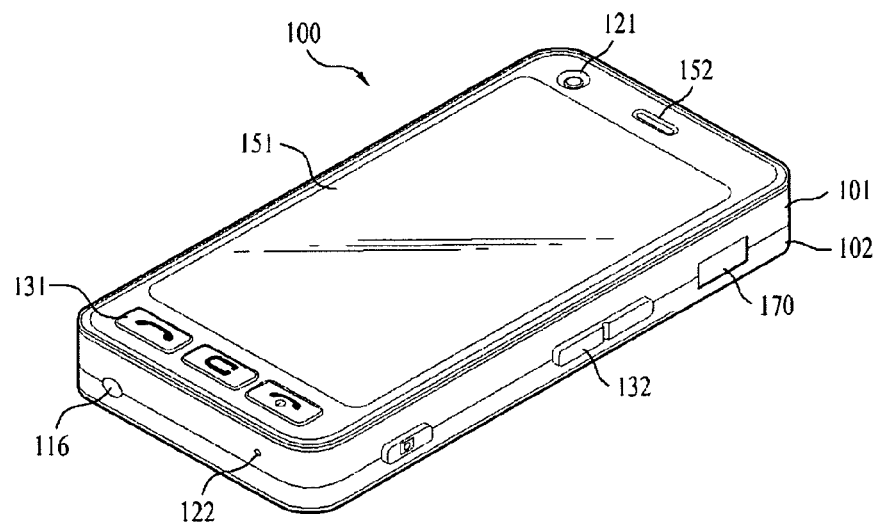
FIG. 2A is a front perspective diagram of a mobile terminal according to one embodiment.

Referring to FIG. 2A, in one embodiment the mobile terminal 100 has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

In one implementation, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display unit 151, an audio output unit 152, a camera 121, user input units 130/131 and 132, a microphone 122, an interface 180 and the like can be provided to the terminal body, and more particularly, to the front case 101.

In one embodiment, the display unit 151 occupies most of a main face of the front case 101. The audio output unit 151 and the camera 121 are provided to an area adjacent to one of both end portions of the display unit 151, while the user input unit 131 and the microphone 122 are provided to another area adjacent to the other end portion of the display unit 151. The user input unit 132 and the interface 170 can be provided to lateral sides of the front and rear cases 101 and 102.

The input unit 130 is manipulated to receive a command for controlling an operation of the mobile terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display unit 151 or the like can be inputted to the second manipulating unit 132.

Figure 2B:
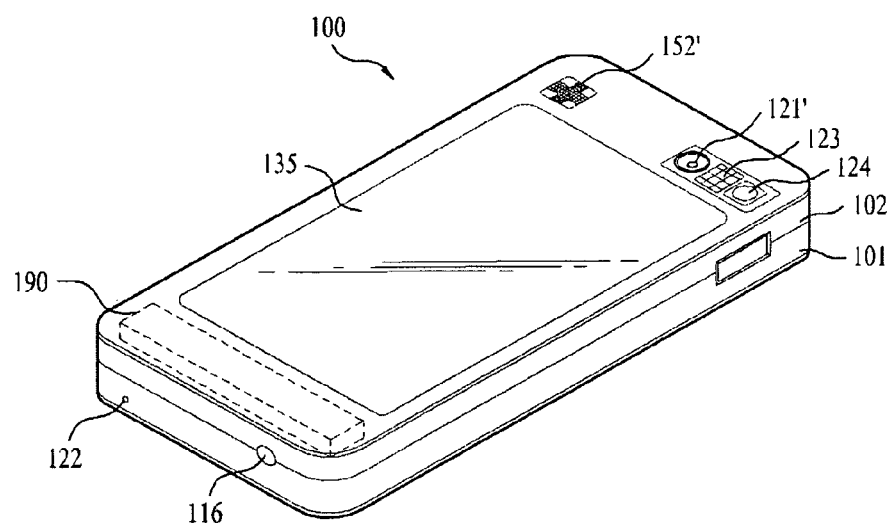
FIG. 2B is a rear perspective diagram of a mobile terminal.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Camera 121 may be configured to capture and transmit a picture of user's face for a video call. Camera 121' has sufficient resolution for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided at the rear of the terminal body. The additional audio output unit 152' is able to implement a stereo function together with the former audio output unit 152 shown in FIG. 2A and may be used for implementation of a speakerphone mode in talking over the mobile terminal 100.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying power to the mobile terminal 100 is provided to the terminal body. The power supply unit 190 can be configured to be built within the terminal body. Alternatively, the power supply unit 190 can be configured to be detachably connected to the terminal body.

A touchpad 135 for detecting a tactile input can be additionally provided at the rear of case 102. The touchpad 135 can be configured in a light transmittive type like the display unit 151. In this case, if the display unit 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touch screen can be provided to the rear case 102 as well.

The touchpad 135 is activated by interconnecting with the display unit 151 of the front case 101. The touchpad 135 can be provided in rear of the display unit 151 in parallel. The touchpad 135 can have a size equal to or smaller than that of the display unit 151.

Figure 3A:
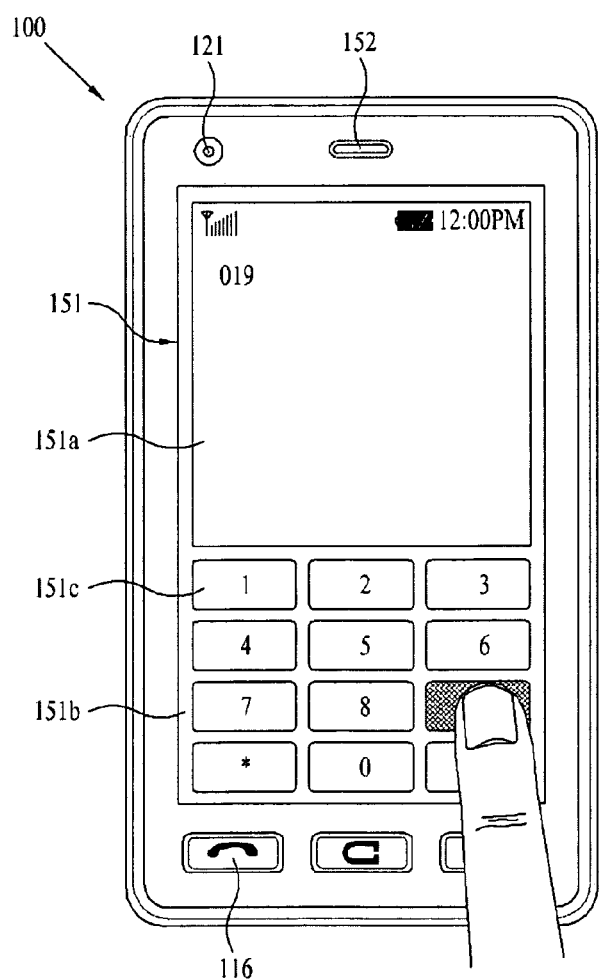
FIG. 3A and FIG. 3B are front diagrams of a mobile terminal according to one embodiment for explaining one operational status of the mobile terminal, respectively.

Interconnected operational mechanism between the display unit 151 and the touchpad 135 are explained with reference to FIG. 3A and FIG. 3B as follows.

In one implementation, various kinds of visual information can be displayed on the display unit 151. And, these information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

The display unit 151 is operable through an entire area or by being divided into a plurality of regions. In the latter case, a plurality of the regions can be configured interoperable.

For instance, an output window 151a and an input window 151b are displayed on the display unit 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Figure 3B:
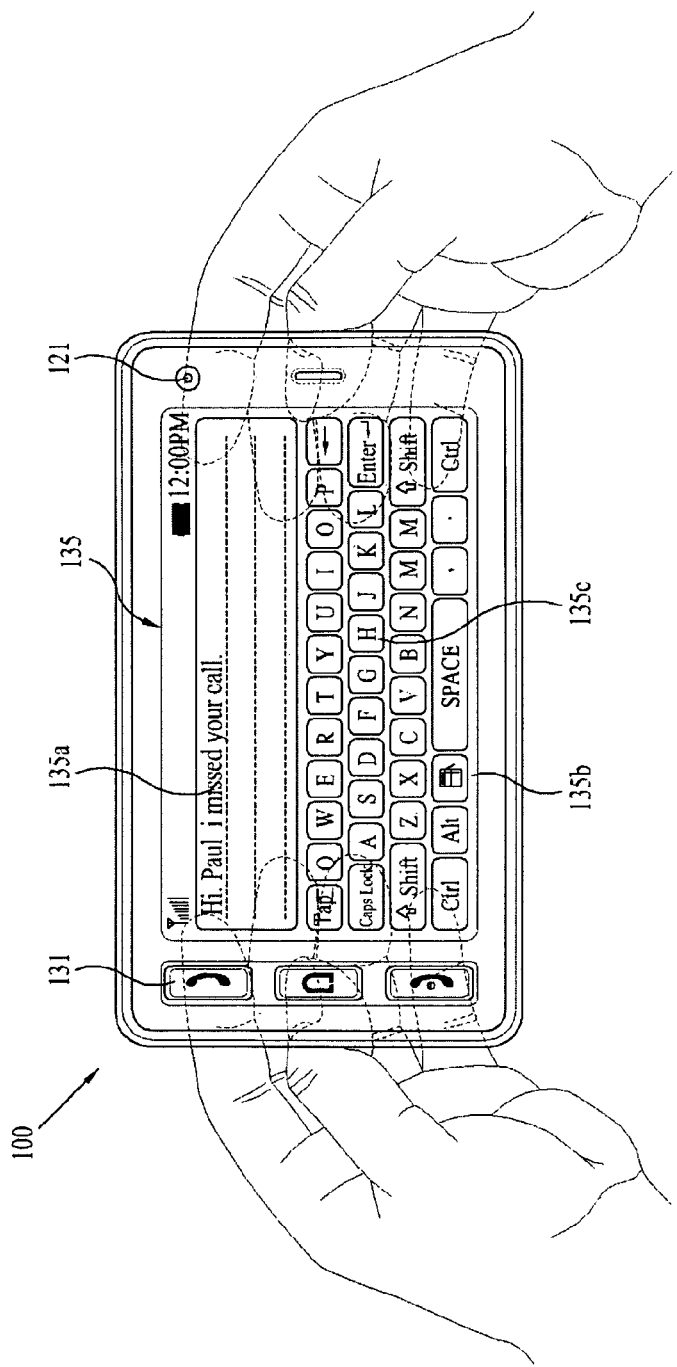

FIG. 3B shows that a touch applied to a soft key 151c' is inputted through a rear face of a terminal body. If FIG. 3A shows a case that the terminal body is vertically arranged (portrait), FIG. 3B shows a case that the terminal body is horizontally arranged (landscape). And, the display unit 151 can be configured to change an output picture according to the arranged direction of the terminal body.

FIG. 3B shows that a text input mode is activated in the mobile terminal 100.

An output window 151a' and an input window 151b' are displayed on the display unit 151. A plurality of soft keys 151c' representing at least one of characters, symbols and digits can be arranged in the input window 151b'. The soft keys 151c' can be arranged in the QWERTY key formation.

If the soft keys 151c' are touched through the touchpad (cf. '135' in FIG. 2B), the characters, symbols and digits corresponding to the touched soft keys are outputted to the output window 151a'. Thus, the touch input via the touchpad 135 is advantageous in that the soft keys 151c' can be prevented from being blocked by a finger in case of touch, which is compared to the touch input via the display unit 151. In case that the display unit 151 and the touchpad 135 are configured transparent, it is able to visually check fingers located at the backside of the terminal body. Hence, more correct touch inputs are possible.

The display unit 151 or the touchpad 135 can be configured to receive a touch input by scroll. A user scrolls the display unit 151 or the touchpad 135 to shift a cursor or pointer located at an entity (e.g., icon or the like) displayed on the display unit 151. Furthermore, in case that a finger is shifted on the display unit 151 or the touchpad 135, a path of the shifted finger can be visually displayed on the display unit 151. This may be useful in editing an image displayed on the display unit 151.

To cope with the situation that both the display unit (touch screen) 151 and the touchpad 135 are touched together within a predetermined time range, one function of the mobile terminal 100 can be executed. The above case of the simultaneous touch may correspond to a case that the terminal body is held by a user using a thumb and a first finger (clamping), for example. The above function can include activation or deactivation for the display unit 151 or the touchpad 135.

The proximity sensor 141 described with reference to FIG. 1 is explained in detail with reference to FIG. 4 as follows.

Figure 4A:
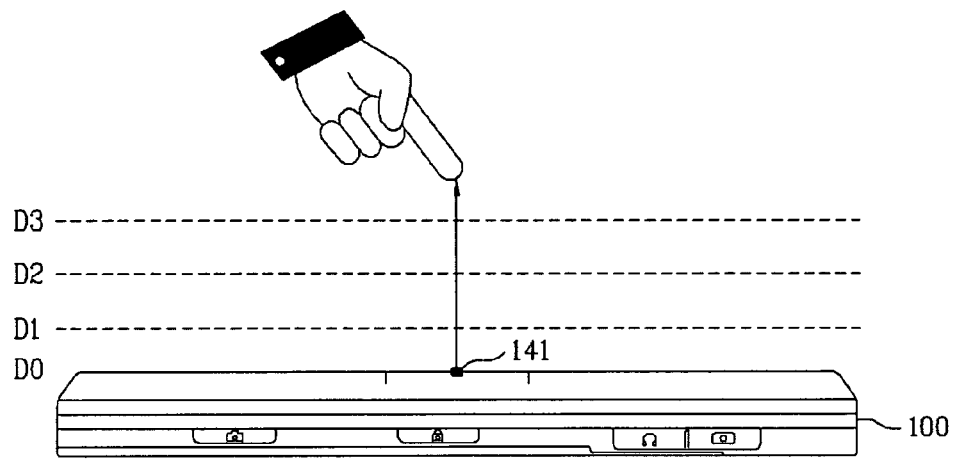
FIG. 4A is a diagram to explain the concept of proximity depth of a proximity sensor.

Referring to FIG. 4A, when such a pointer as a user's finger, a pen and the like approaches the touch screen, a proximity sensor 141 provided within or in the vicinity of the touch screen detects the approach of the pointer and then outputs a proximity signal.

The proximity sensor 141 can be configured to output a different proximity signal according to a distance between the pointer and the proximity-touched touch screen (hereinafter termed "proximity depth").

In FIG. 4A, exemplarily shown is a cross-section of the touch screen provided with a proximity sensor 141 capable to three proximity depths, for example. And, it is understood that a proximity sensor 141 capable of proximity depths amounting to the number smaller than 3 or equal to or greater than 4 is possible.

In detail, in case that the pointer is fully contacted with the touch screen (do), it is recognized as a contact touch. In case that the pointer is located to be spaced apart from the touch screen in a distance smaller than d1, it is recognized as a proximity touch to a first proximity depth. In case that the pointer is located to be spaced apart from the touch screen in a distance between d1 and d2, it is recognized as a proximity touch to a second proximity depth.

In case that the pointer is located to be spaced apart from the touch screen in a distance smaller than d3 or equal to or greater than d2, it is recognized as a proximity touch to a third proximity depth. In case that the pointer is located to be spaced apart from the touch screen in a distance equal to or greater than d3, it is recognized as a proximity touch that is released.

Hence, the controller 180 is able to recognize the proximity touch as one of various input signals according to the proximity depth and position of the pointer. And, the controller 180 is able to perform various operation controls according to the various input signals.

Figure 4B:
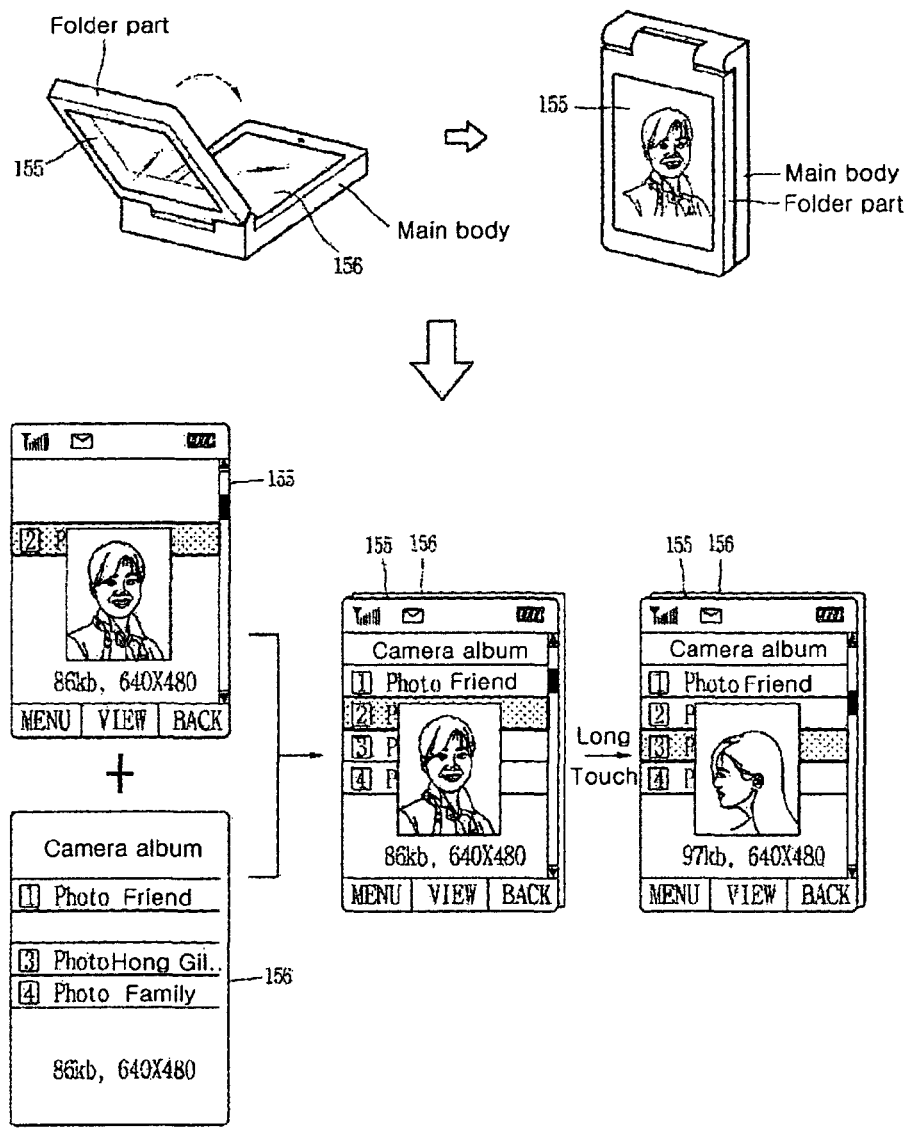
FIG. 4B is a diagram to explain the concept of a method of controlling a touch action on a pair of display units overlapped with each other.

Referring to FIG. 4B, in one embodiment a mobile terminal 100 shown in the drawing is a folder type terminal in which a folder part is connected to a main body in a manner of being folded or unfolded.

A first display unit 156 provided to the folder part is a light-transmittive or transparent type such as TOLED, while a second display unit 157 provided to the main body may be a non-transmittive type such as LCD. Each of the first and second display units 156 and 157 can include a touch-inputtable touch screen.

For instance, if a touch (contact touch or proximity touch) to the first display unit or TOLED 156 is detected, the controller 180 selects or runs at least one image from an image list displayed on the TOLED 156 according to a touch type and a touch duration.

In the following description, a method of controlling information displayed on a different display unit or an LCD 157 in case of an touch to the TOLED 156 externally exposed in an overlapped configuration is explained, in which the description is made with reference to input types classified into a touch, a long touch, a long-touch and drag and the like.

In the overlapped state (a state that mobile terminal 100 is closed or folded), the TOLED 156 is configured to be overlapped with the LCD 157. In this state, if a touch different from a touch for controlling an image displayed on the TOLED 155, e.g., a long touch (e.g., a touch having a duration of at least 2 seconds) is detected, the controller 180 enables at least one image to be selected from an image list displayed on the LCD 157 according to the touched touch input. The result from running the selected image is displayed on the TOLED 156.

The long touch is usable in selectively shifting a specific one of entities displayed on the LCD 157 to the TOLED 156 (without an action for running the corresponding entity). In particular, if a user performs a long touch on a prescribed region of the TOLED 156 corresponding to a specific entity of the LCD 157, the controller 180 controls the corresponding entity to be displayed by being shifted to the TOLED 156.

Meanwhile, an entity displayed on the TOLED 156 can be displayed by being shifted to the LCD 157 according to such a prescribed touch input to the TOLED 156 as flicking, swirling and the like. In the drawing, exemplarily shown is that a second menu displayed on the LCD 157 is displayed by being shifted to the TOLED 156.

In case that another input, e.g., a drag is additionally detected together with a long touch, the controller 180 executes a function associated with an image selected by the long touch so that a preview picture for the image can be displayed on the TOLED 156 for example. In the drawing, exemplarily shown is that a preview (picture of a male) for a second menu (image file) is performed.

While the preview image is outputted, if a drag toward a different image is additionally performed on the TOLED 156 by maintaining the long touch, the controller 180 shifts a selection cursor (or a selection bar) of the LCD 157 and then displays the image selected by the selection cursor on the preview picture (picture of female). Thereafter, after completion of the touch (long touch and drag), the controller 180 displays the initial image selected by the long touch.

The touch action (long touch and drag) is identically applied to a case that a slide (action of a proximity touch corresponding to the drag) is detected together with a long proximity touch (e.g., a proximity touch maintained for at least 2 or 3 seconds) to the TOLED 156.

In case that a touch action differing from the above-mentioned touch actions is detected, the controller 180 is able to operate in the same manner of the general touch controlling method.

The method of controlling the touch action in the overlapped state is applicable to a terminal having a single display. And, the method of controlling the touch action in the overlapped state is applicable to terminals differing from the folder type terminal having a dual display as well.

Figure 5A:
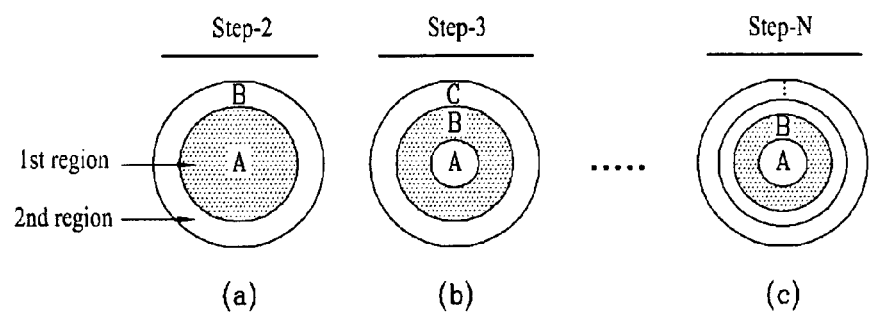
FIG. 5A and FIG. 5B are diagrams to explain the concepts of a proximity touch recognizing area for detecting a proximity signal and a haptic area for generating a tactile effect, respectively.

FIG. 5A represents an object such as an icon, a menu item and the like in a circle type for clarity and convenience of explanation.

A region for displaying an object on the display unit 151, as shown in (a) of FIG. 5A, can be divided into a first region A at a central part and a second region B enclosing the first region A. The first and second regions A and B can be configured to generate tactile effects differing from each other in strength or pattern. For instance, the first and second regions can be configured to generate 2-step vibrations in a manner of outputting a first vibration if the second region B is touched or outputting a second vibration greater than the first vibration if the first region A is touched.

In case that both of the proximity touch recognition region and the haptic region are simultaneously set in the region having the object displayed therein, it is able to set the haptic region for generating the tactile effect to be different from the proximity touch recognition region for detecting the proximity signal. In particular, it is able to set the haptic region to be narrower or wider than the proximity touch recognition region. For instance, in (a) of FIG. 5A, it is able to set the proximity touch recognition region to the area including both of the first and second regions A and B. And, it is able to set the haptic region to the first region A.

It is able to discriminate the region having the object displayed therein into three regions A, B and C as shown in (b) of FIG. 5A. Alternatively, it is able to discriminate the region having the object displayed therein into N regions (N>4) as shown in (c) of FIG. 5A. And, it is able to configure each of the divided regions to generate a tactile effect having a different strength or pattern. In case that a region having a single object represented therein is divided into at least three regions, it is able to set the haptic region and the proximity touch recognition region to differ from each other according to a user environment.

Figure 5B:
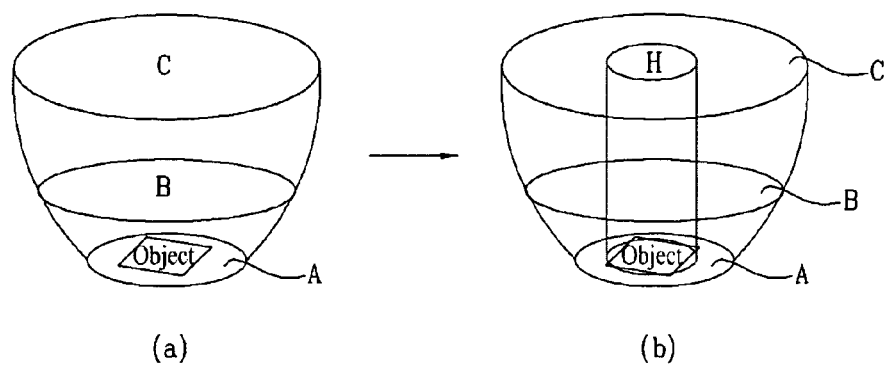

It is able to configure a size of the proximity touch recognition region of the display unit 151 to vary according to a proximity depth. In particular, referring to (a) of FIG. 5B, the proximity touch recognition region is configured to decrease by C→B→A according to the proximity depth for the display unit 151. On the contrary, the proximity touch recognition region is configured to increase by C→B→A according to the proximity depth for the display unit 151. Despite the above configuration, it is able to set the haptic region to have a predetermined size, as the region 'H' shown in (b) of FIG. 6B, regardless of the proximity depth for the display unit 151.

In case of dividing the object-displayed region for the setting of the haptic region or the proximity touch recognition region, it is able to use one of various schemes of horizontal/vertical division, radial division and combinations thereof as well as the concentric circle type division shown in FIG. 5A.

In the following description, the configuration of the above-described projector module provided to the bar type mobile terminal 100 is explained in detail with reference to FIG. 6A and FIG. 6B.

Figure 6A:
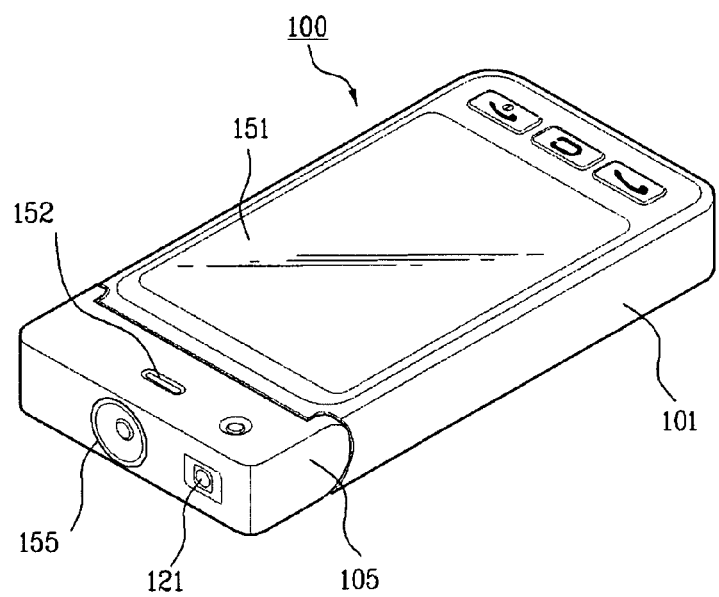
FIG. 6A and FIG. 6B are perspective diagrams of a mobile terminal according to one embodiment.

Referring to FIG. 6A, a projector body 105 having a projector module 155 can be rotatably coupled to a main body 101 of the mobile terminal 100.

In particular, the projector body 105 can be hinged to the main body 101. A projected angle of an image, which is projected using the projector module 155 provided to the projector body 105, can be controlled. And, a camera 121 can be provided to the projector body 105 to photograph the image projected by the projector module 155.

Figure 6B:
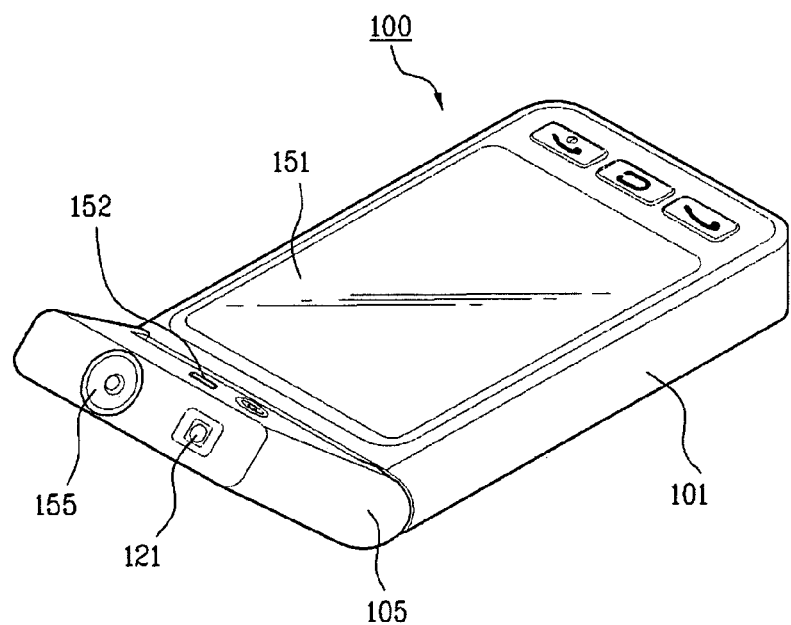

FIG. 6A shows a status before the projector body 105 rotatably coupled to the main body 101 is rotated, and FIG. 6B shows a status after the projector body 105 has been rotated.

Figure 7:
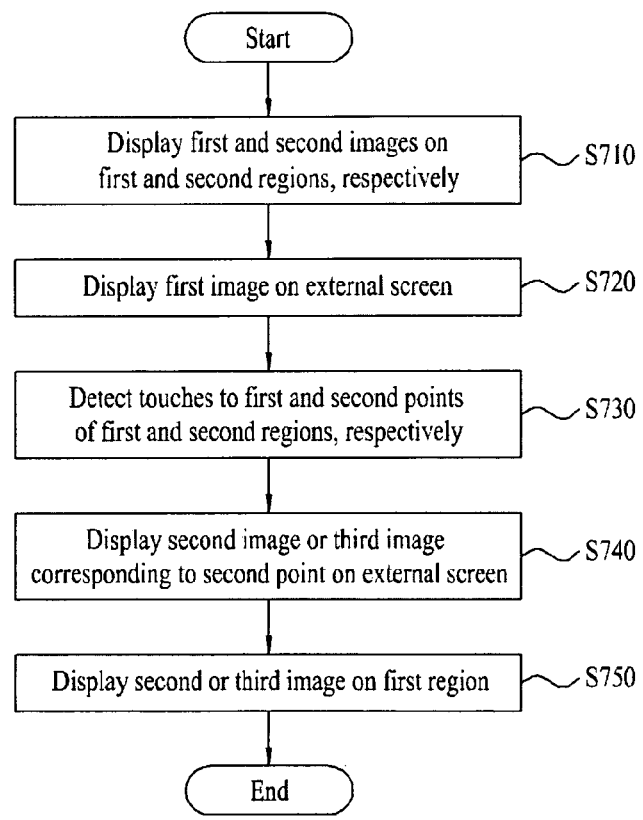
FIG. 7 is a flowchart for a method of controlling a display of a mobile terminal according to one embodiment.

Referring to FIG. 7, if a projector function is activated by a selection made by a user, the mobile terminal 100 displays first and second images on first and second regions of the mobile terminal's touch screen, respectively [S710].

For instance, if a user selects a projector function execution command key provided to a keypad or touch screen, a menu item e.g., 'view image via projector' may be provided to a user.

As the projector function is activated, the controller 180 is able to set the projector module 155 to enter an operative mode. Therefore, the projector module 155 is able to enter a mode for displaying an image on a projection plane. A projection plane refers to a surface on which an image projected from the projector module 155 may be displayed. Such a projection plane may be the external surface of a wall facing the projection lens of the projector module 155.

Under the control of the controller 180, the mobile terminal 100 is able to display the first image, which is being displayed on the first region, on the projection plane via the projector module 155 [S720].

The first region is a region of the mobile terminal's display screen utilized for displaying an image projected by the projector module 155 and is referred to as the projection region. The second region of the mobile terminal's display screen is the region of the display screen that displays images that are not projected by the projector module 155 on the projection plane and is referred to as the non-projection region.

An image displayed on the projection plane may coincide with an image displayed on a specific portion or whole part of the projection region.

Under the control of the controller 180, the mobile terminal 100 is able to set the projection region to correspond to a touch inputted via the touch screen.

In the following description, a projection region setting process is explained in detail with reference to FIGS. 8A to 15B.

Figure 8A:
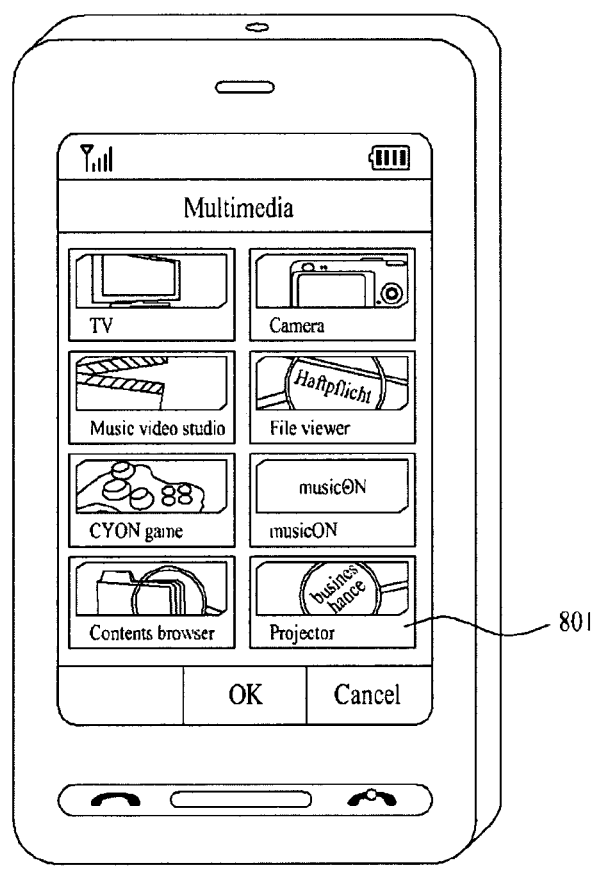
FIGS. 8A to 10 are diagrams for selecting a menu item for setting a projection region in a mobile terminal according to one embodiment.
Figure 8B:
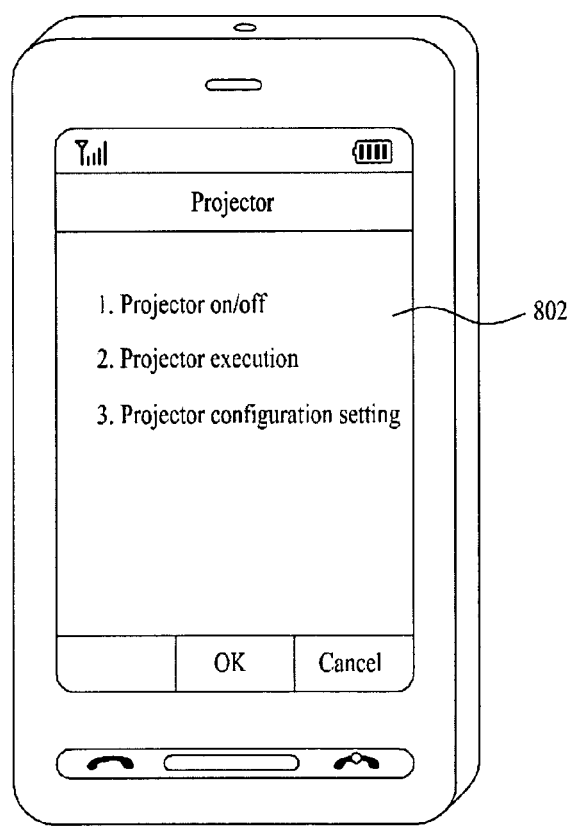

In one implementation, if a projector relevant menu item 801 is selected via a menu search prior to projector function activation, [FIG. 8A], the mobile terminal 100 is able to display a projector relevant operation list on a screen [FIG. 8B]. If a projector configuration setting 802 is selected from the projector relevant operation list shown in FIG. 8B, the mobile terminal 100 is able to display a projector configuration setting relevant operation list on the screen [FIG. 8C].

Figure 9A:
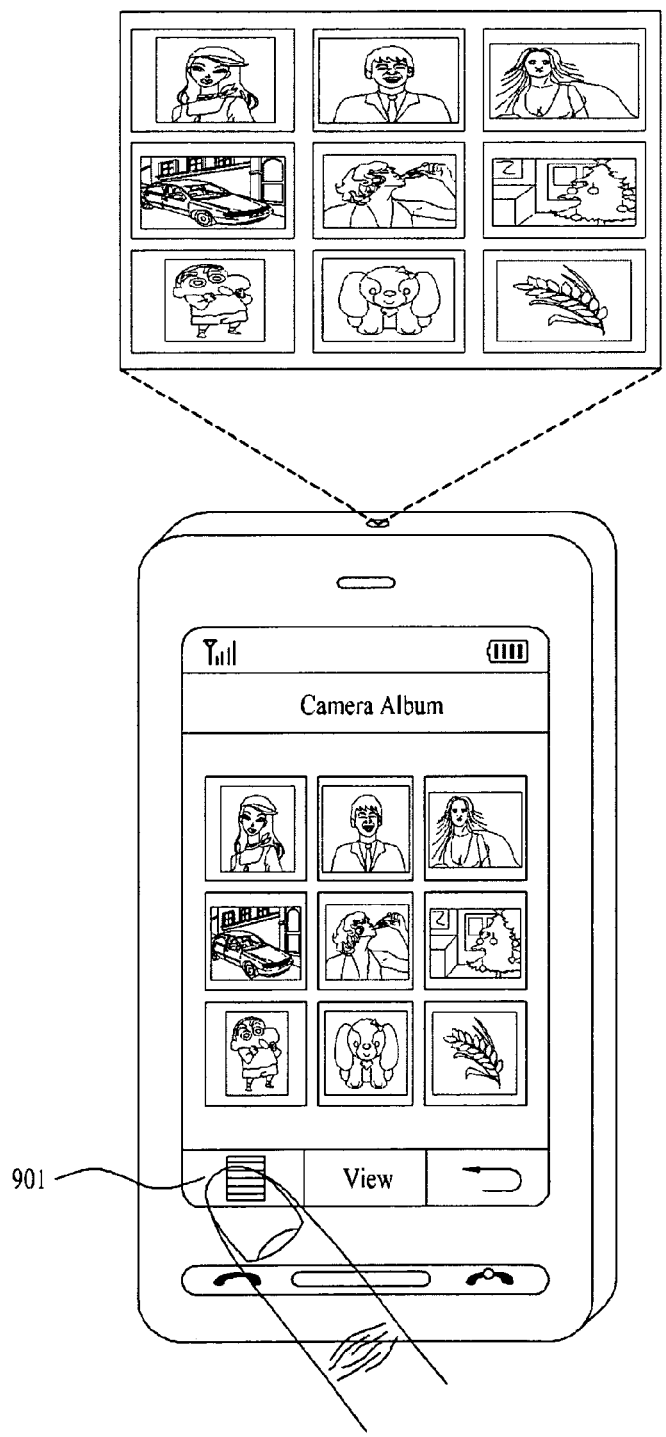
Figure 9B:
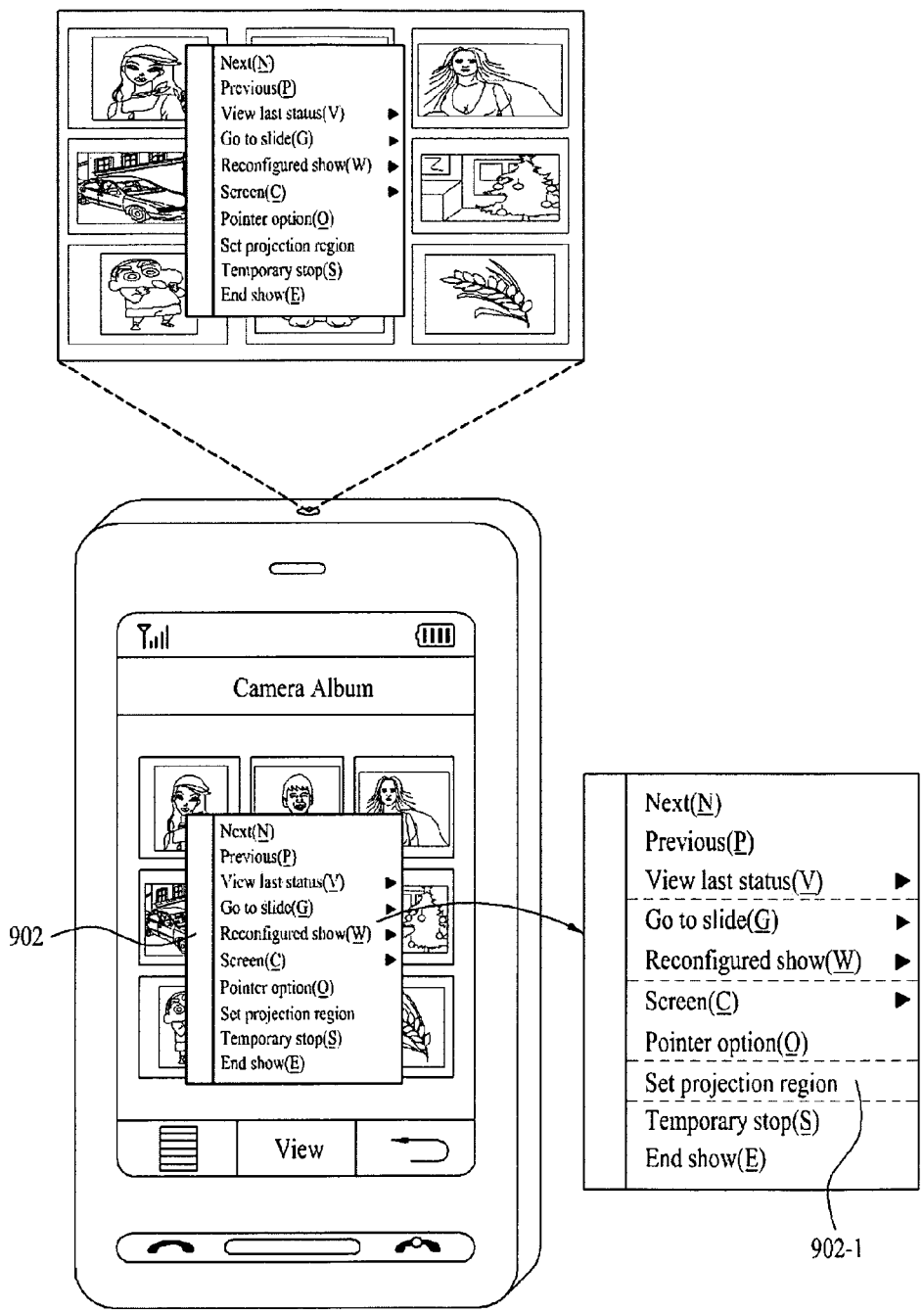

While an image is being displayed on a projection plane according to the projector function activation, if a projector relevant region 901 is selected [FIG. 9A], the mobile terminal 100 is able to display a projector display relevant operation list 902 on the screen [FIG. 9B].

Figure 8C:
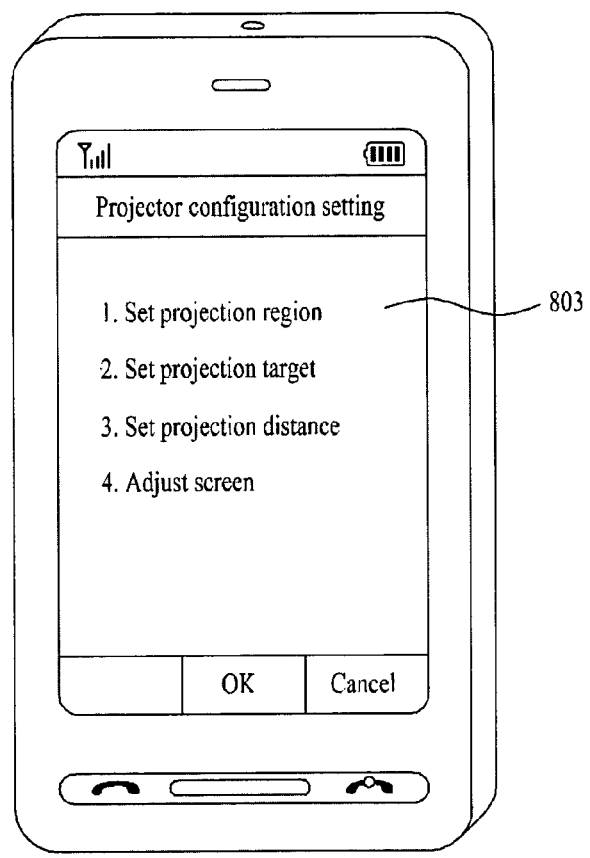

If a projection region setting 803 is selected from the projector configuration setting relevant operation list shown in FIG. 8C or a projection region setting 902-1 is selected from the projector display relevant operation list shown in FIG. 9B, the mobile terminal 100 is able to set a mode for projection region setting under the control of the controller 180.

For clarity and convenience, the following description is limited to the case of selecting the projection region setting 902-1 from the projector display operation list 902 shown in FIG. 9B.

Figure 10:
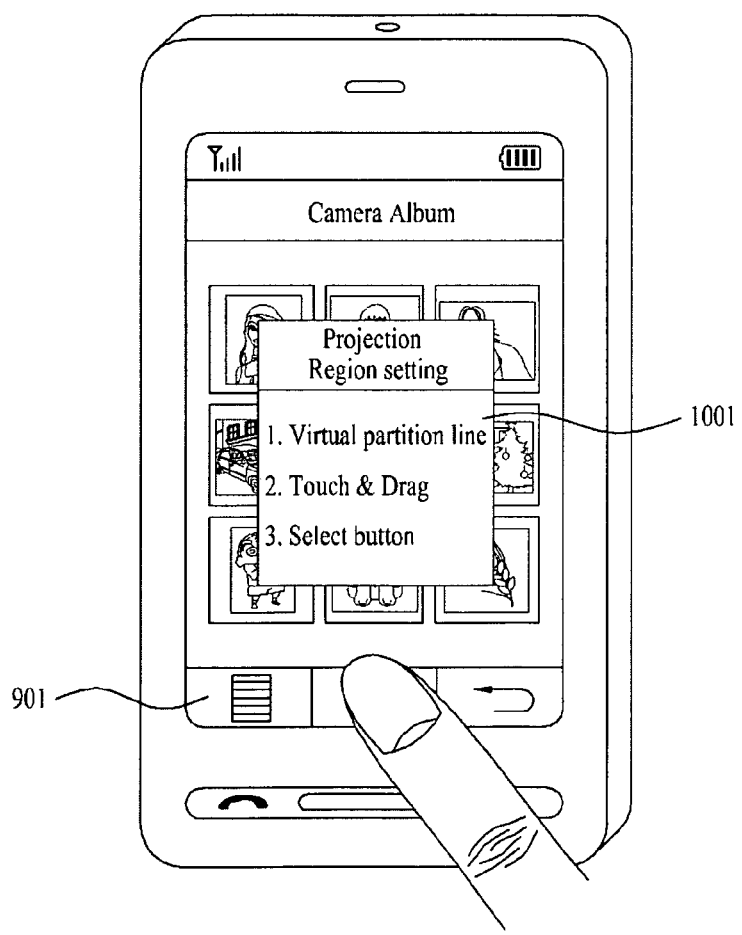

In one implementation, in case that a mode for the projection region setting is set under the control of the controller 180, the mobile terminal 100 is able to display a method list 1001 including methods for the projection region setting on the screen [FIG. 10].

Figure 11A:
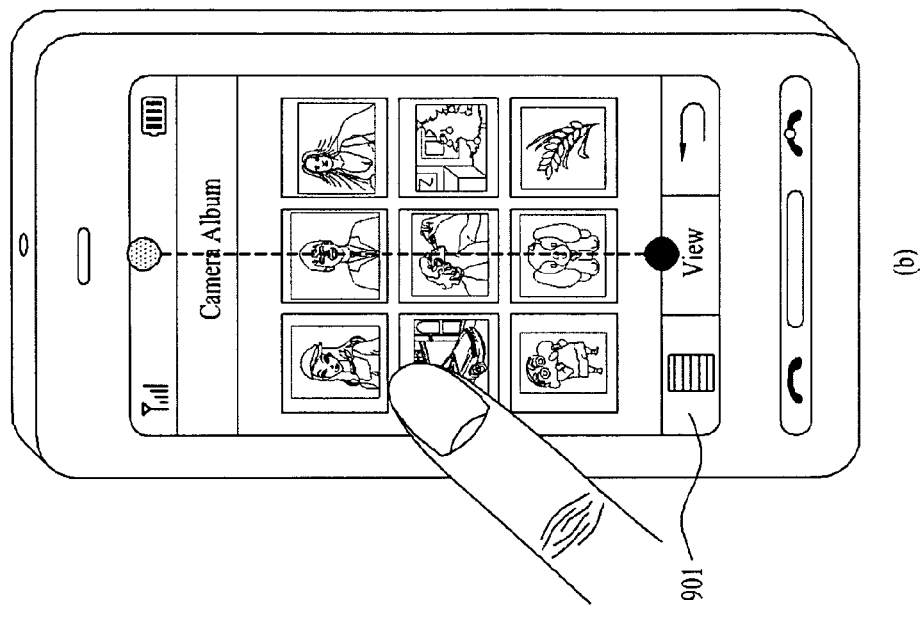
FIG. 11A and FIG. 11B are diagrams for setting a projection region using a virtual partition line in a mobile terminal according to one embodiment.
Figure 11A:
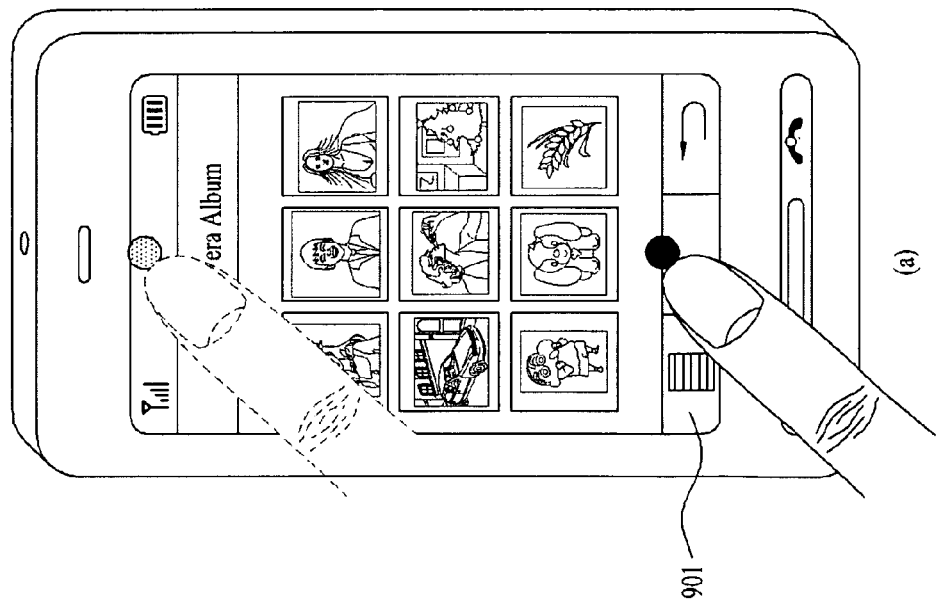
Figure 11B:
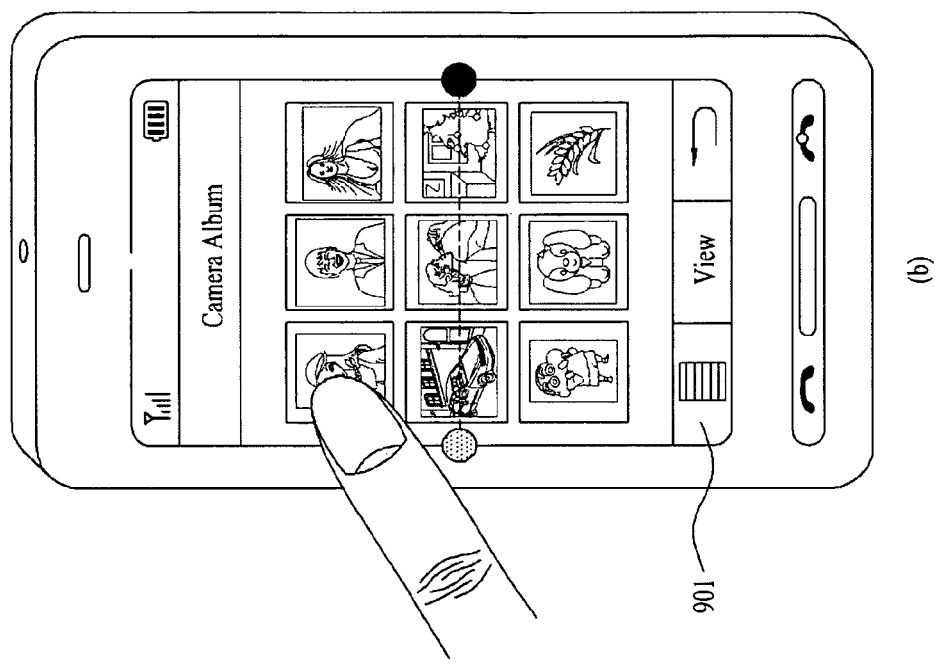
Figure 11B:
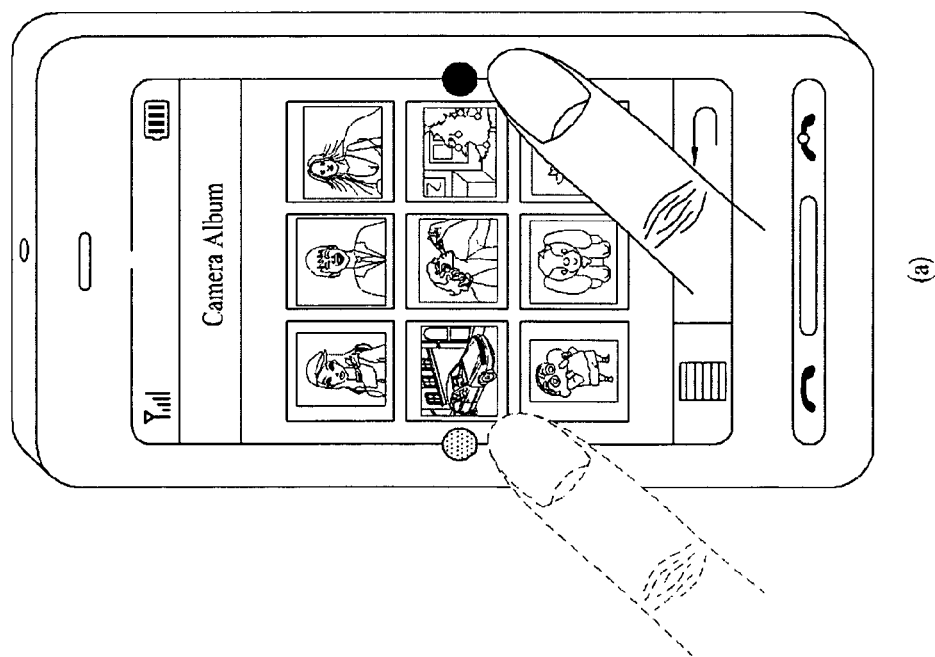

If 'virtual partition line' is selected from the method list 1001, the mobile terminal 100 receives one input of a user touch to a first point of a first one of four sides of the touch screen and another input of a user touch to a second point of a second one of the four sides of the touch screen [(a) of FIG. 11A or (a) of FIG. 11B], which forms a virtual partition line connecting the first and second points together, and is then able to partition the screen into a plurality of regions with reference to the virtual partition line [(b) of FIG. 11A or (b) of FIG. 11B]. Subsequently, the mobile terminal 100 is able to set a region selected (or touched) by a user to a projection region and another region not selected by the user to a non-projection region [(b) of FIG. 11A or (b) of FIG. 11B].

Figure 12A:
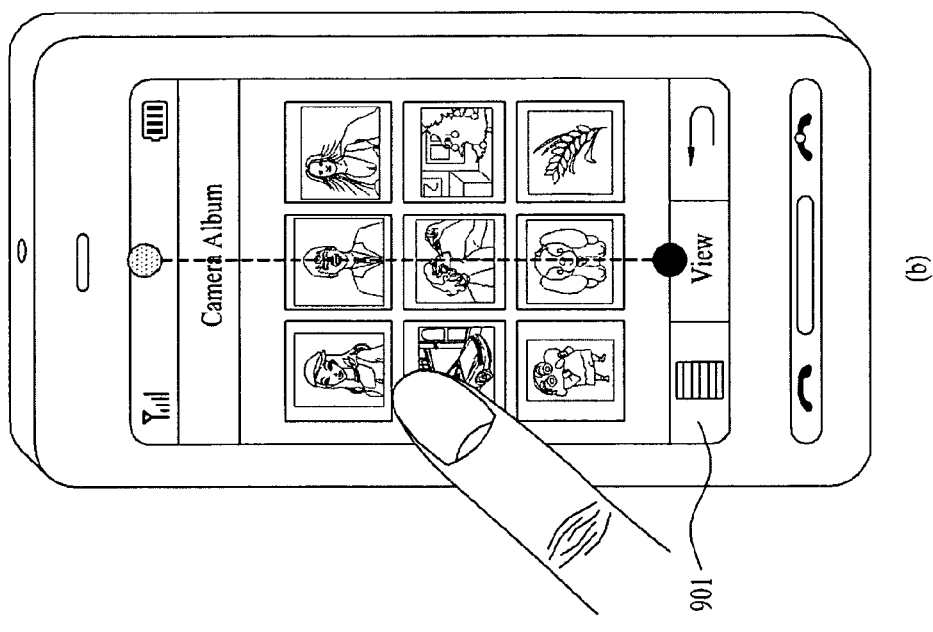
FIG. 12A and FIG. 12B are diagrams for setting a projection region using a touch and drag in a mobile terminal according to one embodiment.
Figure 12A:
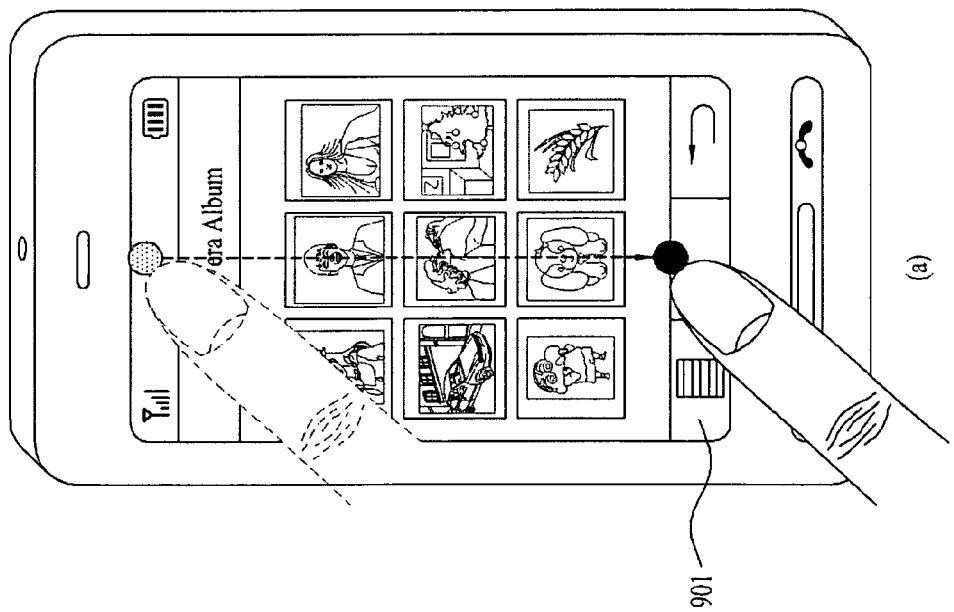
Figure 12B:
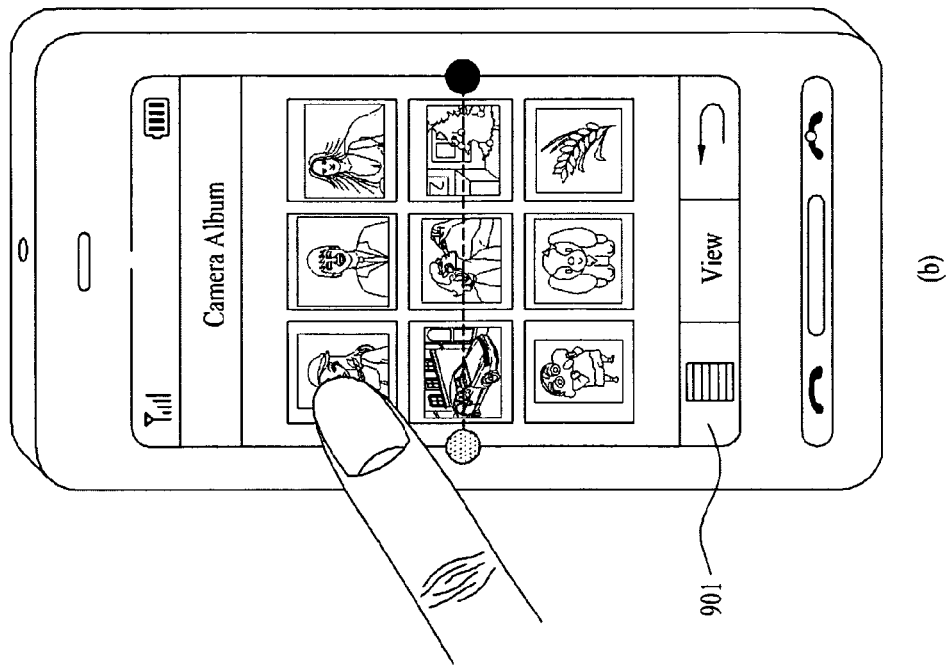
Figure 12B:
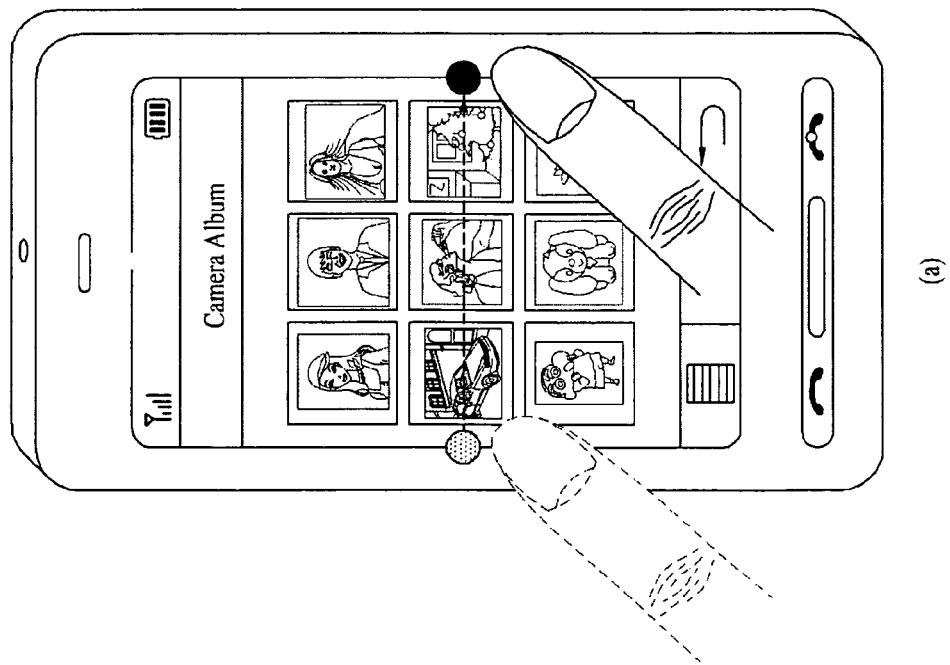

If 'touch and drag' is selected from the method list 1001, the mobile terminal 100 receives a touch and drag from a first point of a first one of four sides of the touch screen to a second point of a second one of the four sides of the touch screen [(a) of FIG. 12A or (a) of FIG. 12B] and is then able to partition the screen into a plurality of regions with reference to a line corresponding to the touch and drag [(b) of FIG. 12A or (b) of FIG. 12B]. Subsequently, the mobile terminal 100 is able to set a region selected (or touched) by a user to a projection region and another region not selected by the user to a non-projection region [(b) of FIG. 12A or (b) of FIG. 12B].

Figure 13A:
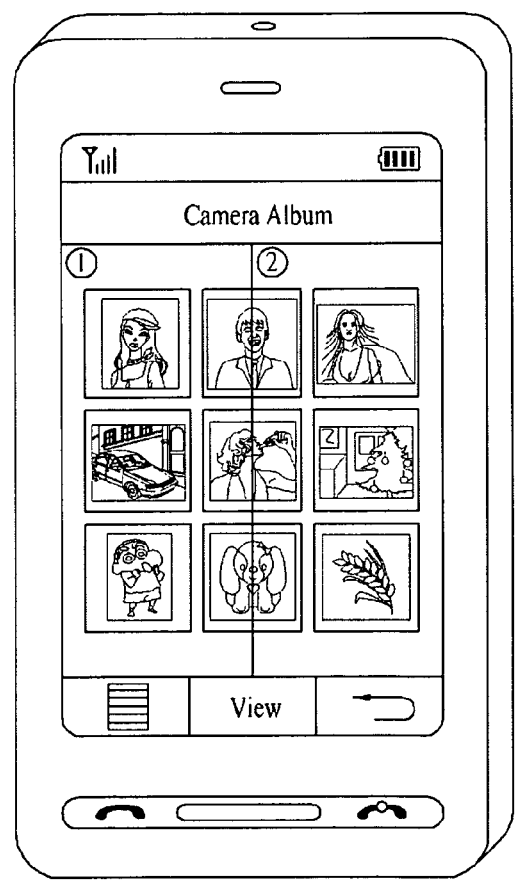
FIG. 13A and FIG. 13B are diagrams for setting a projection region using a number selection per partition region in a mobile terminal according to one embodiment.
Figure 13B:
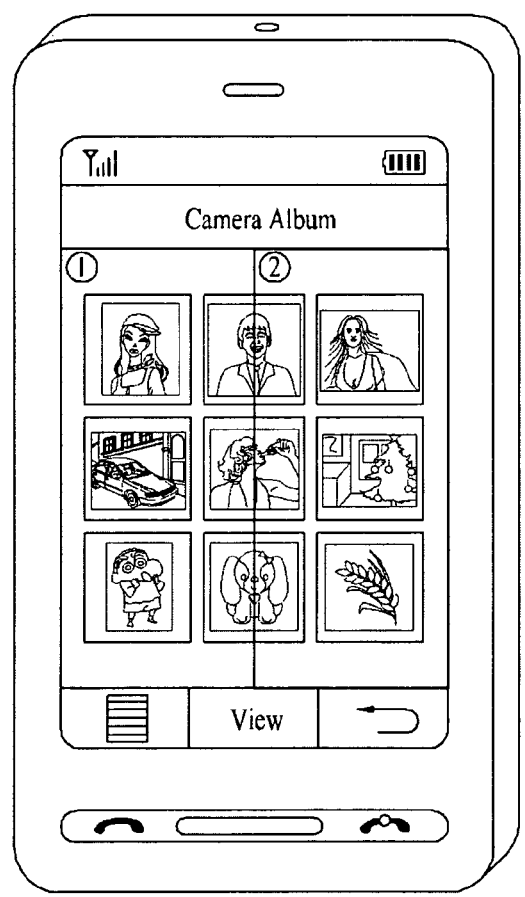

If 'button selection' is selected from the method list 1001, the mobile terminal 100 partitions the screen into a plurality of regions and is then able to grant numbers to a plurality of the regions, respectively [FIG. 13A]. Of a specific one (e.g., button '2') of a plurality of buttons provided to the user input unit 130 is selected, the mobile terminal 100 is able to set the region, to which the number (e.g., '2') assigned to the specific button (e.g., button '2') is granted, to a projection region and is able to set the rest region to a non-projection region.

Besides, the mobile terminal 100 is able to set a region, of which one point is touched by a user, among a plurality of the regions shown in FIG. 13A to a projection region and is also able to set the other regions to a non-projection regions [not shown in the drawings].

In other words, a user may divide or partition the display screen of the mobile terminal into one or more regions by drawing one or more imaginary (i.e., virtual) lines using, for example, his finger along the surface of the display screen such that one or more different regions are defined. The defined regions may be then identified as projection or non-projection regions, such that images displayed on the projection regions are projected by the projection module, and images that are displayed on the non-projection regions are not.

Figure 14A:
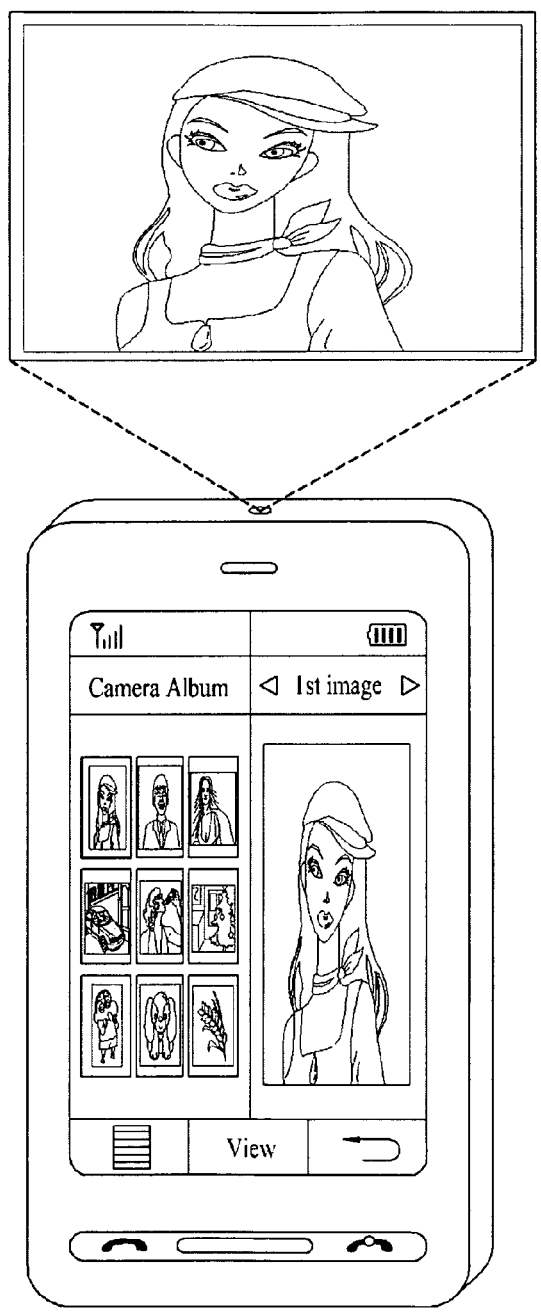
FIGS. 14A to 14C are diagrams for displaying an image within a projection region on a projection plane in a mobile terminal according to one embodiment.
Figure 14B:
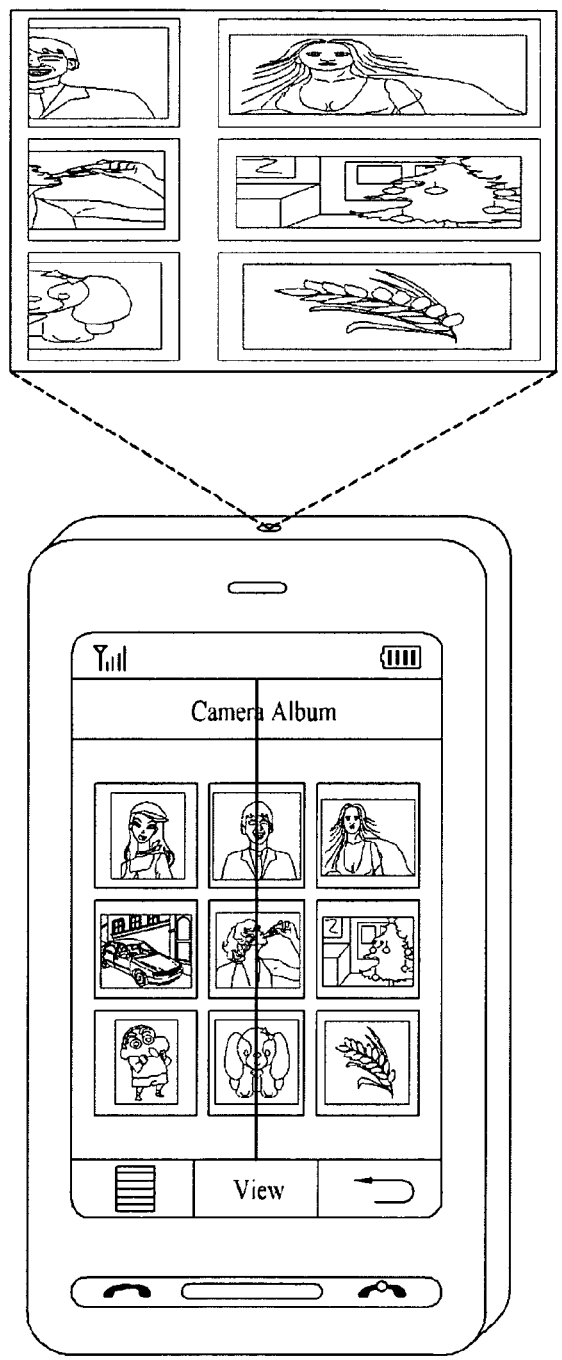
Figure 14C:
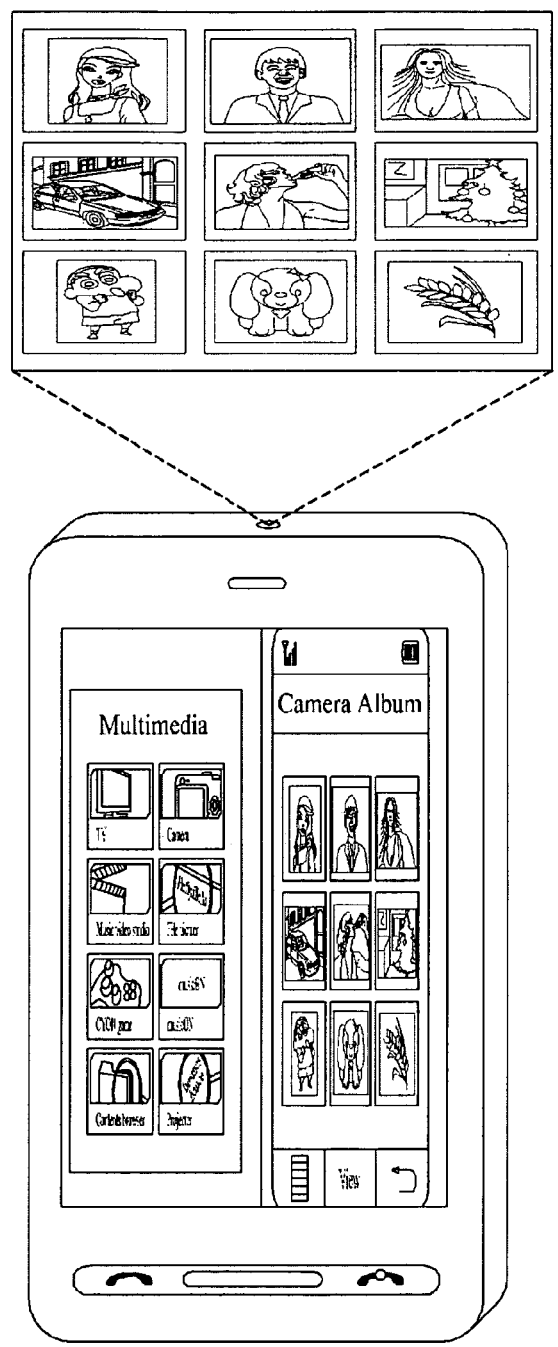

If a projection region is set in the course of displaying a photo search picture according to driving a camera relevant application, the mobile terminal 100 displays a first photo and the photo search picture on the projection region and a non-projection region, respectively [FIG. 14A], displays a photo search picture part corresponding to the projection region and another photo search picture part corresponding to the non-projection region [FIG. 14B], or displays the photo search picture and an application search picture on the projection and non-projection regions, respectively [FIG. 14C].

Optionally, the mobile terminal 100 includes a plurality of touch screens and is then able to provide the projection region and the non-projection region to different touch screens, respectively.

In other words, depending on implementation, certain graphical user interface features, such as menus that are not intended for projection on an external projection plane may be rendered on the non-projection region according to user interaction with the mobile terminal and other images and graphical user interface features that are intended for projection on an external projection plane may be rendered on the projection region.

Figure 15A:
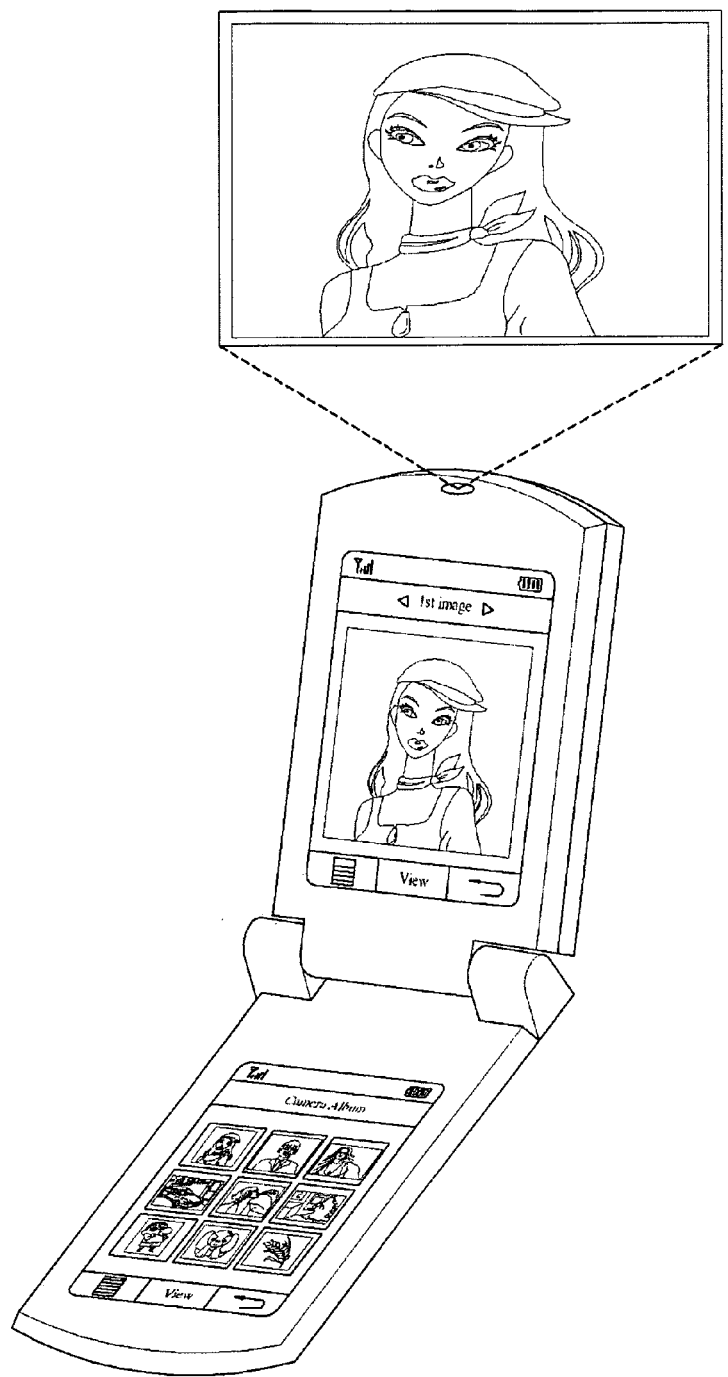
FIG. 15A and FIG. 15B are diagrams for displaying an image within a projection region on a projection plane in case that a mobile terminal according to one embodiment includes a pair of display units.

Referring to FIG. 15A, if the mobile terminal 100 is a folder type terminal, it can include first and second touch screens provided to upper and lower folders, respectively. The mobile terminal 100 is then able to provide the projection region and the non-projection region to the first touch screen and the second touch screen, respectively.

Figure 15B:
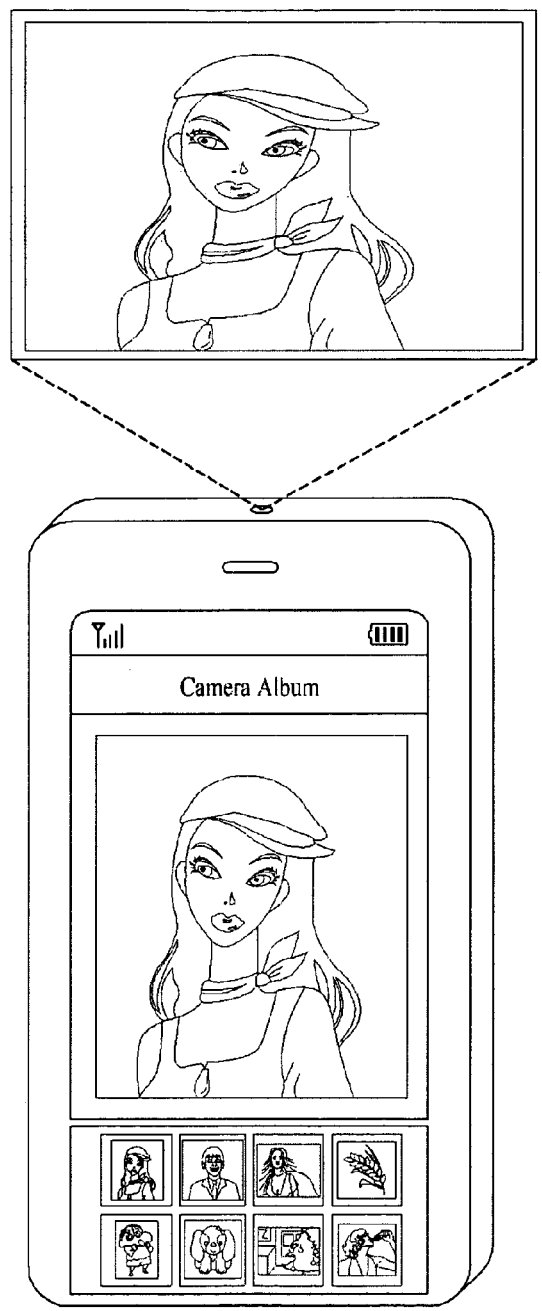

Referring to FIG. 15B, if the mobile terminal 100 is a bar type terminal, first and second touch screens are provided to a front side of the mobile terminal 100. The mobile terminal 100 is then able to provide the projection region and the non-projection region to the first touch screen and the second touch screen, respectively.

The type (folder, bar) of the mobile terminal 100 shown in FIG. 15A or FIG. 15B is exemplarily proposed. If a plurality of touch screens are provided to a single mobile terminal 100, the present disclosure is not limited to a specific type of mobile terminal 100.

Under the control of the controller 180, the mobile terminal 100 is able to set a projection range of an image displayed on a projection region to correspond to a touch inputted via the touch screen.

In the following description, the projection range setting is explained in detail with reference to FIGS. 16A to 19B.

In one implementation, prior to projector function activation, the mobile terminal 100 receives an input of a menu item for setting a projection range via a menu search and is then able to set the projection range by a method selected by a user from projection range setting methods (explained later).

Alternatively, the mobile terminal 100 is able to set a projection range in the course of displaying an image using the projector module 15 according to projector function activation. In particular, according to the present disclosure, the projection range can be set while a first image displayed on a projection region is being displayed on a projection plane.

For clarity, the following description is limited to the case of setting a projection range in the course of displaying a first image on a projection plane.

Figure 16A:
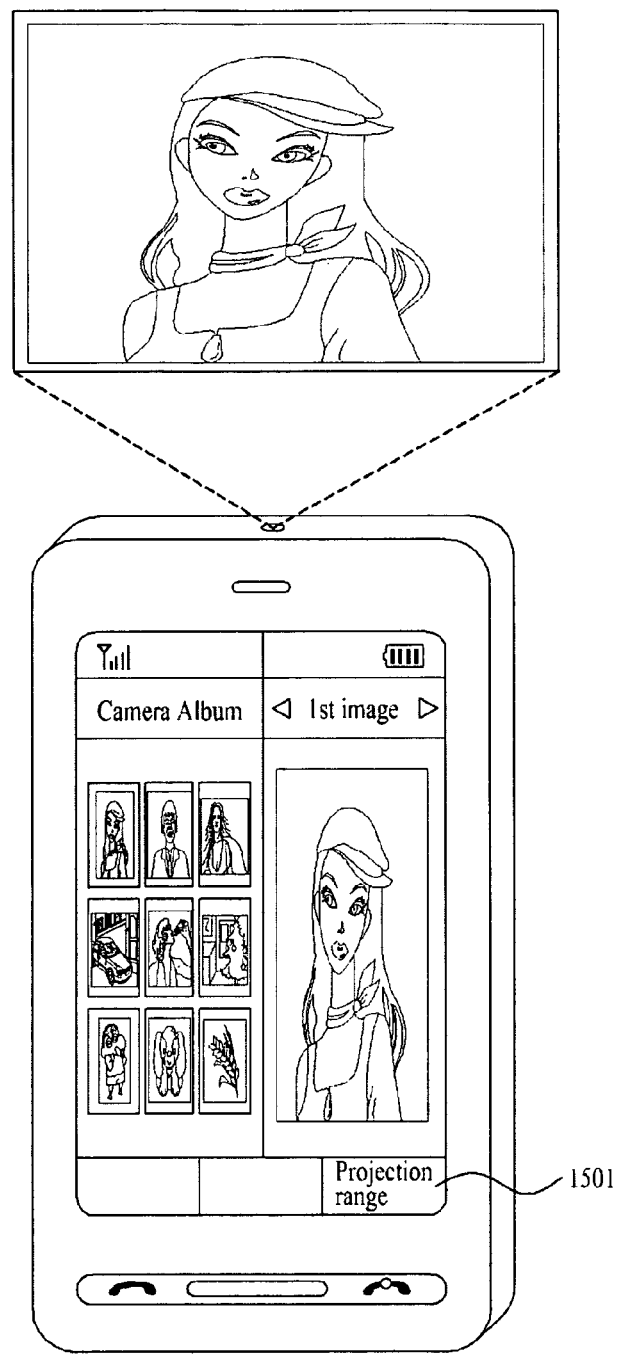
FIG. 16A and FIG. 16B are diagrams for selecting a menu item for setting a projection range in a mobile terminal according to one embodiment.
Figure 16B:
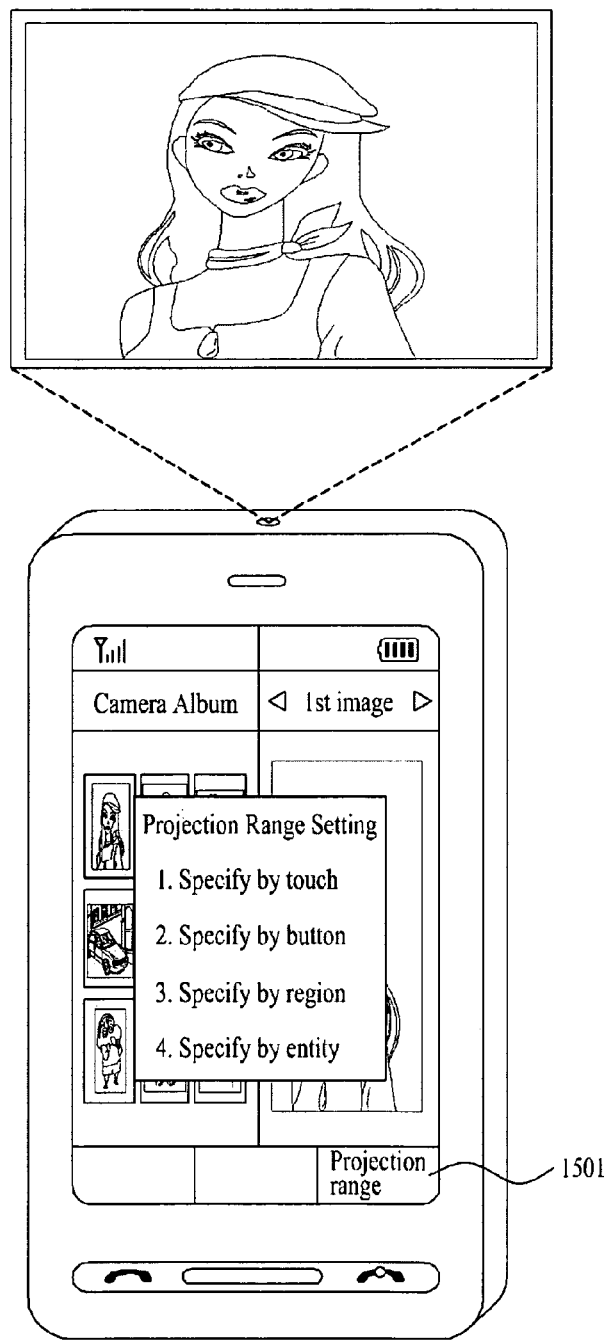

In one implementation, while a first image is being displayed on a projection plane using the projector module 155, if a key region 1501 for projection range setting is selected by a user [FIG. 16A], the mobile terminal 100 is able to display a method list including projection range setting methods on the screen [FIG. 16B].

Figure 17A:
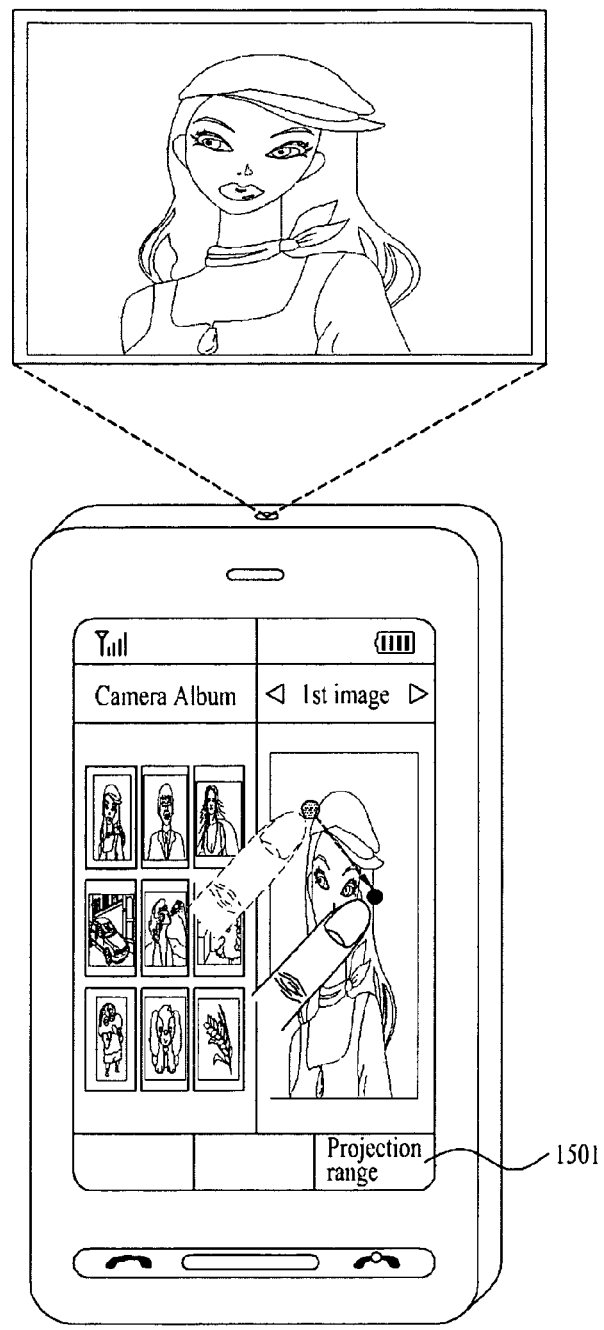
FIG. 17A and FIG. 17B are diagrams for setting a projection range by touching an image to be projected in a mobile terminal according to one embodiment of the present invention.
Figure 17B:
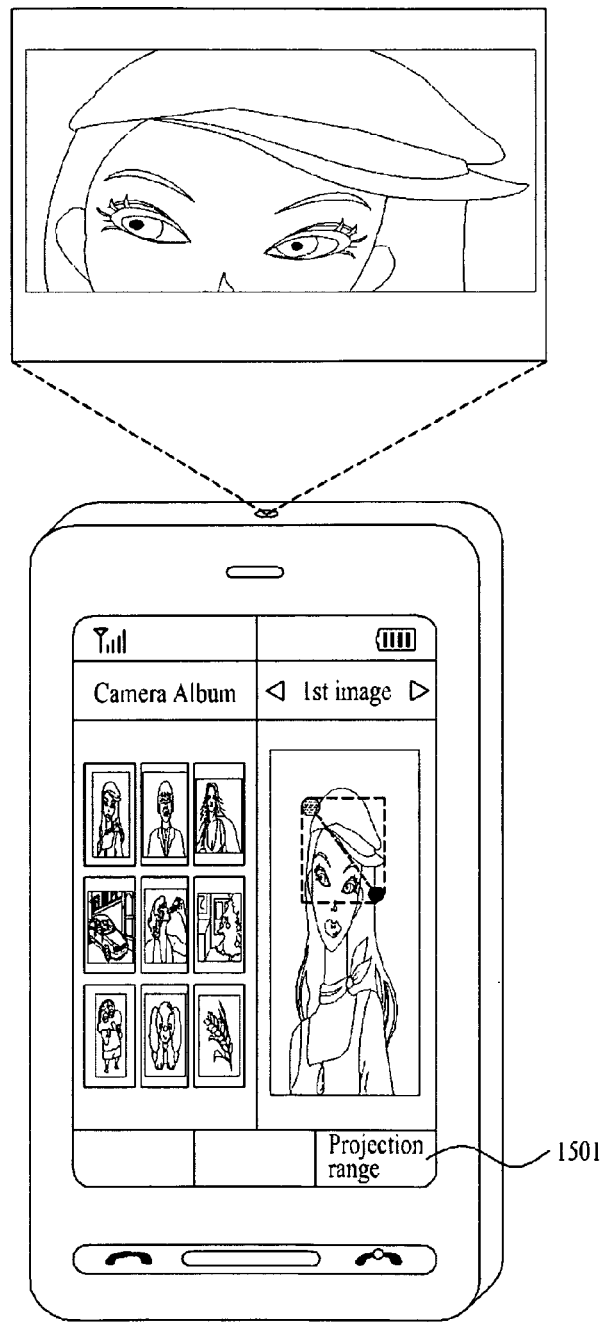

After 'specify by touch' has been selected from the method list, if the mobile terminal 100 detects a touch and drag to one point to another point of a projection region [FIG. 17A], the mobile terminal 100 is able to set a projection range to a part corresponding to the detected touch and drag [FIG. 17B]. Therefore, an image part corresponding to the projection range specified in FIG. 17B can be displayed on the projection plane.

After the 'specify by touch' has been selected, if a user inputs such a touch action for the projection range setting as multi-touch, a predetermined count of touches, a touch to a predetermined size, a predetermined gesture and the like, the mobile terminal 100 is able to set the projection range to correspond to the inputted touch action [not shown in the drawing].

Figure 18A:
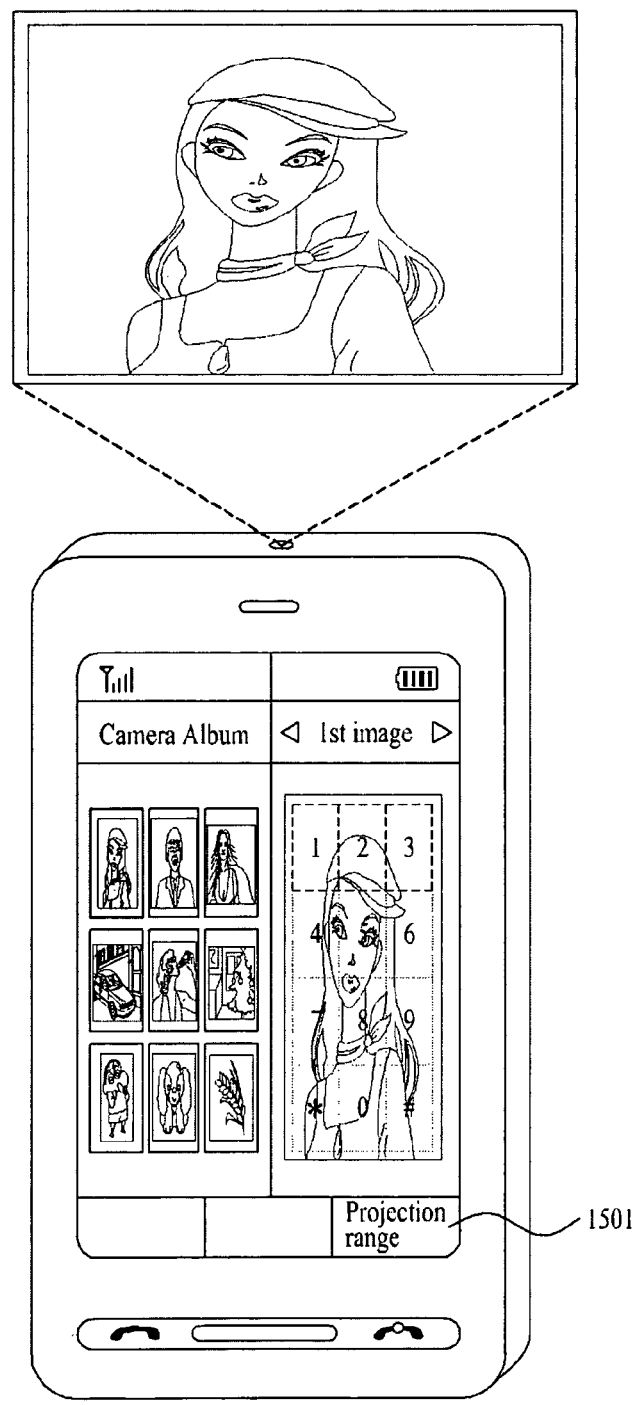
FIG. 18A and FIG. 18B are diagrams for setting a projection range using a button selection in a mobile terminal according to one embodiment.
Figure 18B:
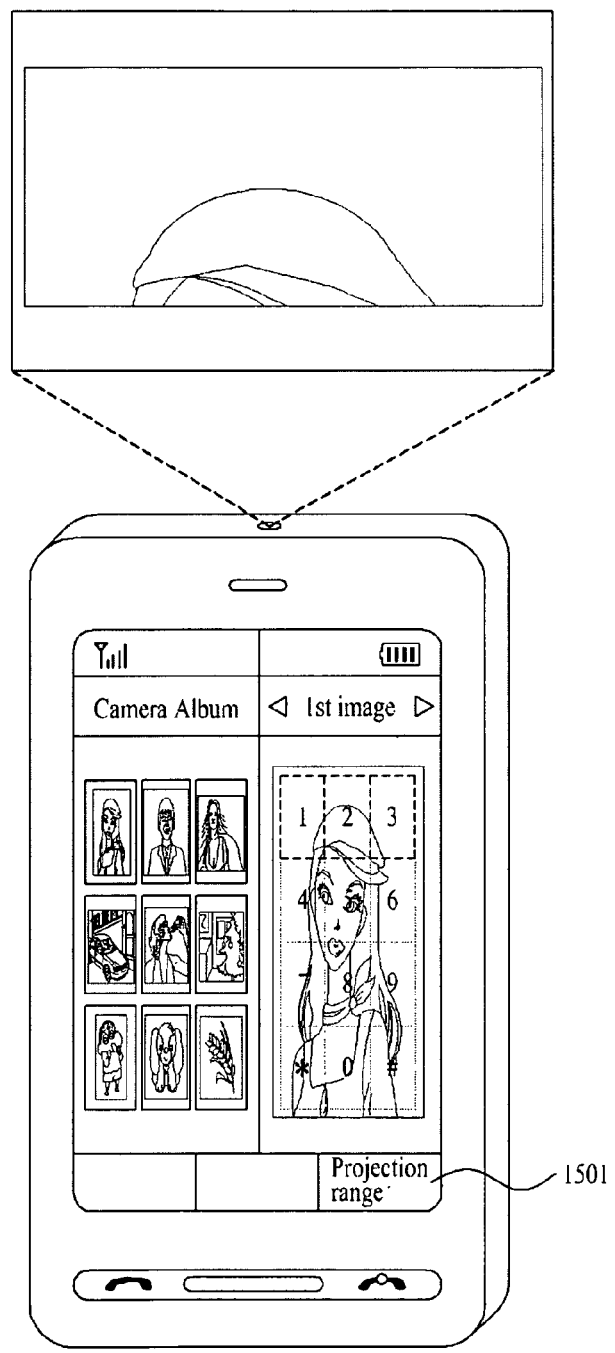

If 'specify by button' is selected from the method list, the mobile terminal 100 is able to display a keypad image including a plurality of buttons on a projection region [FIG. 18A]. In this case, the keypad image can be displayed in a manner of being overlaid on the image displayed on the projection region. Subsequently, if a specific button is selected (or touched) from the keypad image, the mobile terminal 100 is able to set a projection range to an image part corresponding to the selected specific button. Greater or fewer buttons may be employed within the scope of the present disclosure. Therefore, an image part corresponding to a projection range specified in FIG. 18B can be displayed on a projection plane.

Figure 19A:
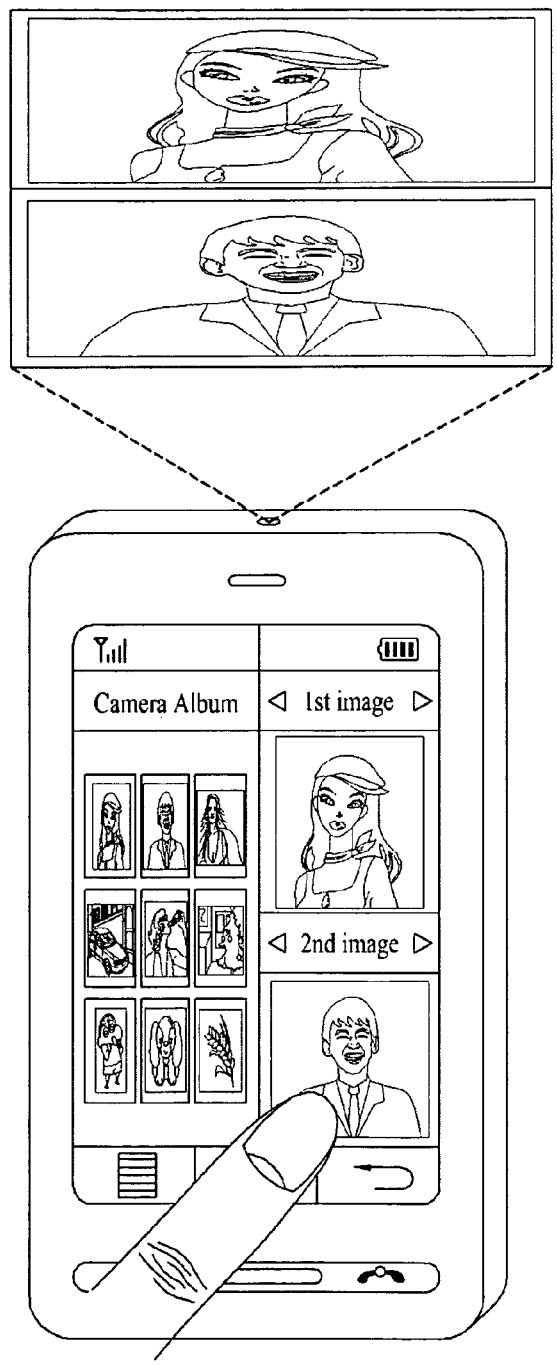
FIG. 19A and FIG. 19B are diagrams for setting a projection range using an entity designation in a mobile terminal according to one embodiment.
Figure 19B:
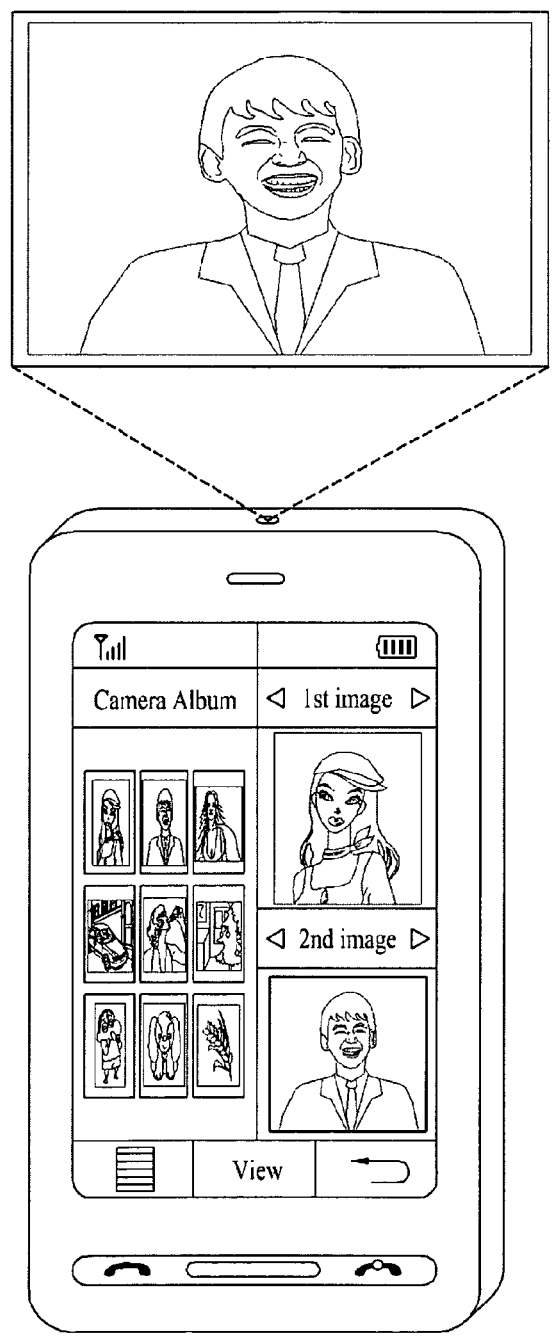

After 'specify by entity' has been selected from the method list, if a user selects a specific entity from a plurality of entities displayed on a projection region [FIG. 19A], the mobile terminal 100 is able to set a projection range to the selected specific entity [FIG. 19B]. Greater or fewer entities may be selected within the scope of the present disclosure. Therefore, the entity corresponding to the projection range set in FIG. 19B can be displayed on a projection plane.

In other words, depending on implementation, a user may be given the option to select from among a plurality of regions on the display screen of the mobile terminal, such that the selected regions are projected onto an external projection plane by the projection module. In certain embodiments, after selecting a region for projection, the user may deselect that region by interacting with the mobile terminal. The deselected region will then be eliminated from being projected on an external projection plane. A user may select one or more regions from said plurality of regions to be projected by the projection module at the same time or in sequence depending on implementation.

Referring now to FIG. 7, under the control of the controller 180, the mobile terminal 100 detects the touch to the first point of the projection region and the touch to the second point of the non-projection region [S730].

In this case, the touch to the first and second points may mean the touch for generating a command signal to display a second image displayed on the non-projection region or a third image corresponding to the second point in the second image on the projection plane and the projection region.

For instance, the touch to the first and second points can include the multi-touch to the first and second points, a touch and drag to the first point from the second point, or the like.

In case of detecting the touch to the first and second points in the detecting step S730, the mobile terminal 100 displays the second image or the third image corresponding to the second point on an external surface (e.g., projection plane) under the control of the controller 180 [S740].

Moreover, under the control of the controller 180, the mobile terminal 100 is able to display the second or third image, which is displayed on the projection plane in the displaying step S740, on the projection region [S750].

In the drawing, the displaying step S740 and the displaying step S750 are performed in order. Alternatively, both of the steps S740 and S750 are simultaneously performed. Alternatively, the displaying step S740 and the displaying step S750 can be performed in reverse order.

In this case, the second image can include at least one selected from the group including an image according to an application run, an application list, a multimedia data list, a web address list, a phone number list and a folder list.

And, the third image can include at least one selected from the group including an image according to a specific application run, an image according to execution of specific multimedia data, an image according to an access to a specific web address, an image according to a voice/video call connection to a specific phone number and an image according to execution of data included in a specific folder if a touch to at least one of a specific application in an application list, specific multimedia data in a multimedia data list, a specific web address in a web address list, a specific phone number in a phone number list and a specific folder in a folder list is detected as a touch to the second point.

In other words, a user may interact with a touch screen of the mobile terminal to select areas of the touch screen for projection by the projection module. The areas on the touch screen may be selected by way of a user dragging his finger a stylus or other pointing or touch instrument on the touch screen, as shown and discussed in further detail below.

Figure 20A:
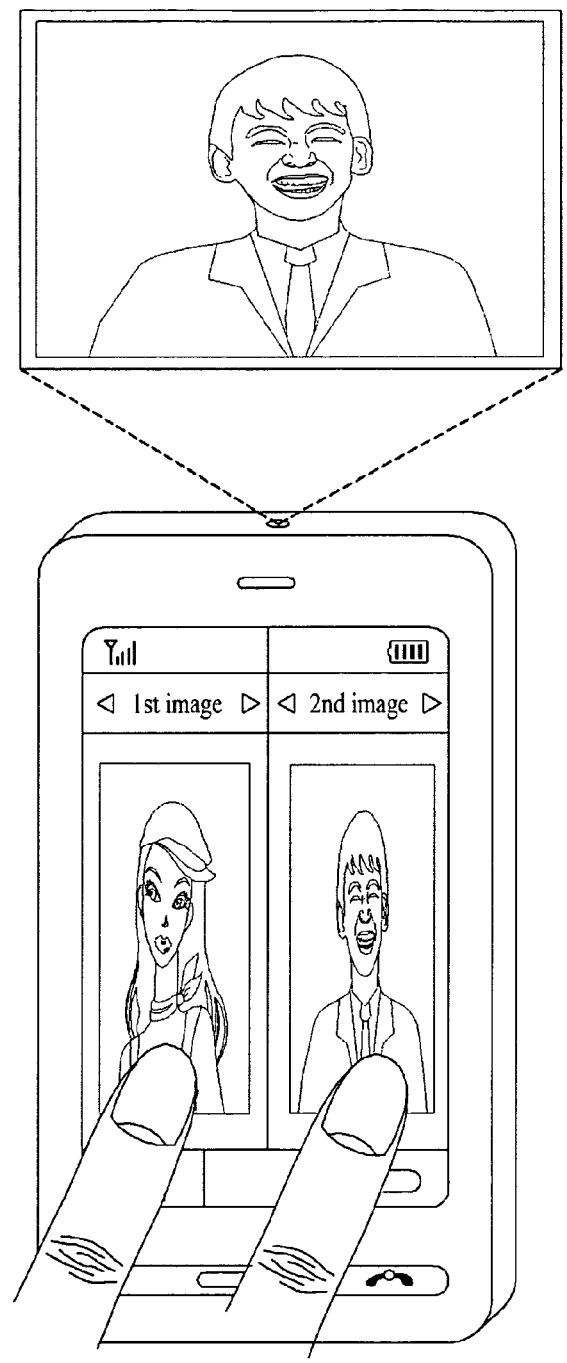
FIGS. 20A to 21 are diagrams for displaying an image on a projection region and a projection plane to correspond to a touch to a non-projection region or a projection region in a mobile terminal according to one embodiment.
Figure 20B:
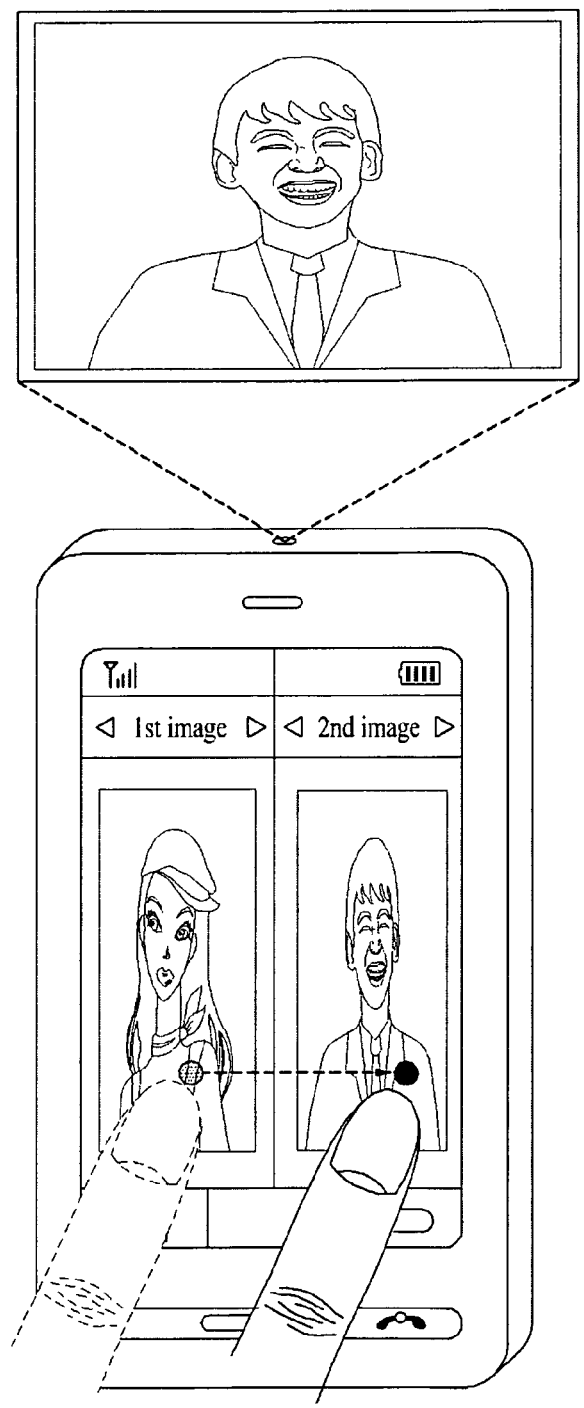
Figure 21:
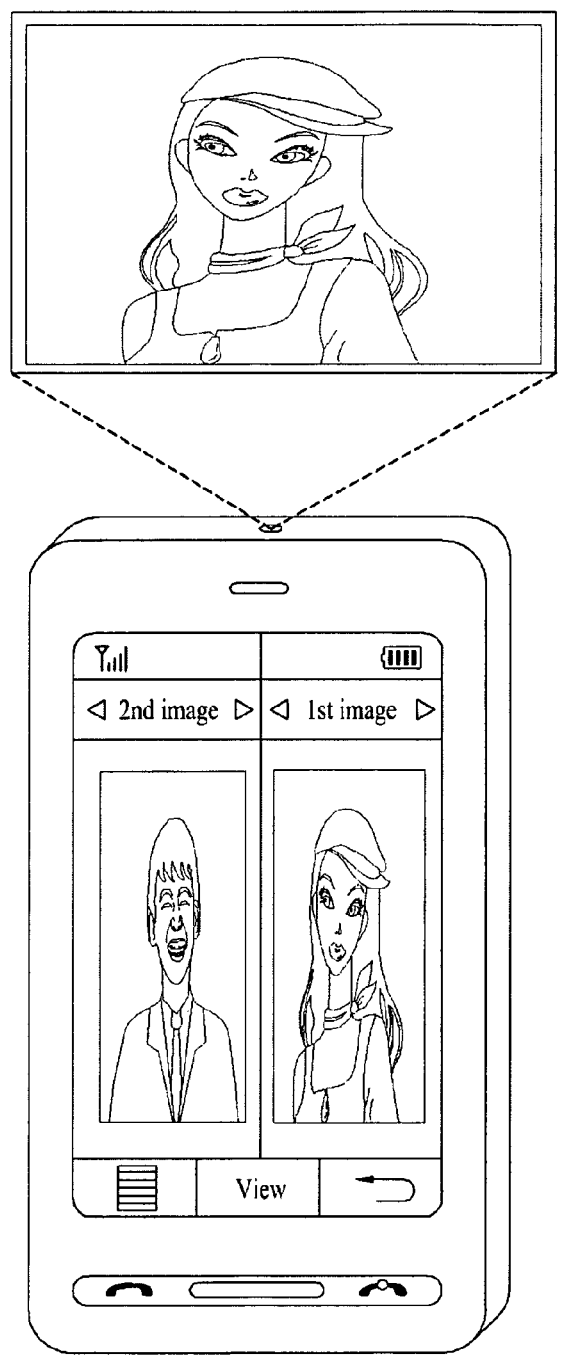

Referring to FIGS. 20A to 21, when a multi-touch to first and second points on a touch screen is detected [FIG. 20A] or a touch and drag to a first point from a second point is detected [FIG. 20B], the mobile terminal 100 is configured to display one or more images displayed on a non-projection region and on a projection region and a projection plane. In other words, referring to FIGS. 20 through 21, if the left side of the display constitutes the non-projection region and the right side of the display constitutes the projection region, an image displayed on the non-projection region may be moved by the user (e.g., by way of drag or drop or other user interaction supported by the mobile terminal's user interface) to the projection region.

Of course, the mobile terminal 100 is able to display an image (or a third image) corresponding to the second point on the projection region and the projection plane as well [not shown in the drawing].

In the following description, a process for displaying a second or third image on a projection region and a projection plane is further explained in detail. For clarity and convenience, the touch to first and second points is limited to a touch and drag to the first point from the second point.

Figure 22A:
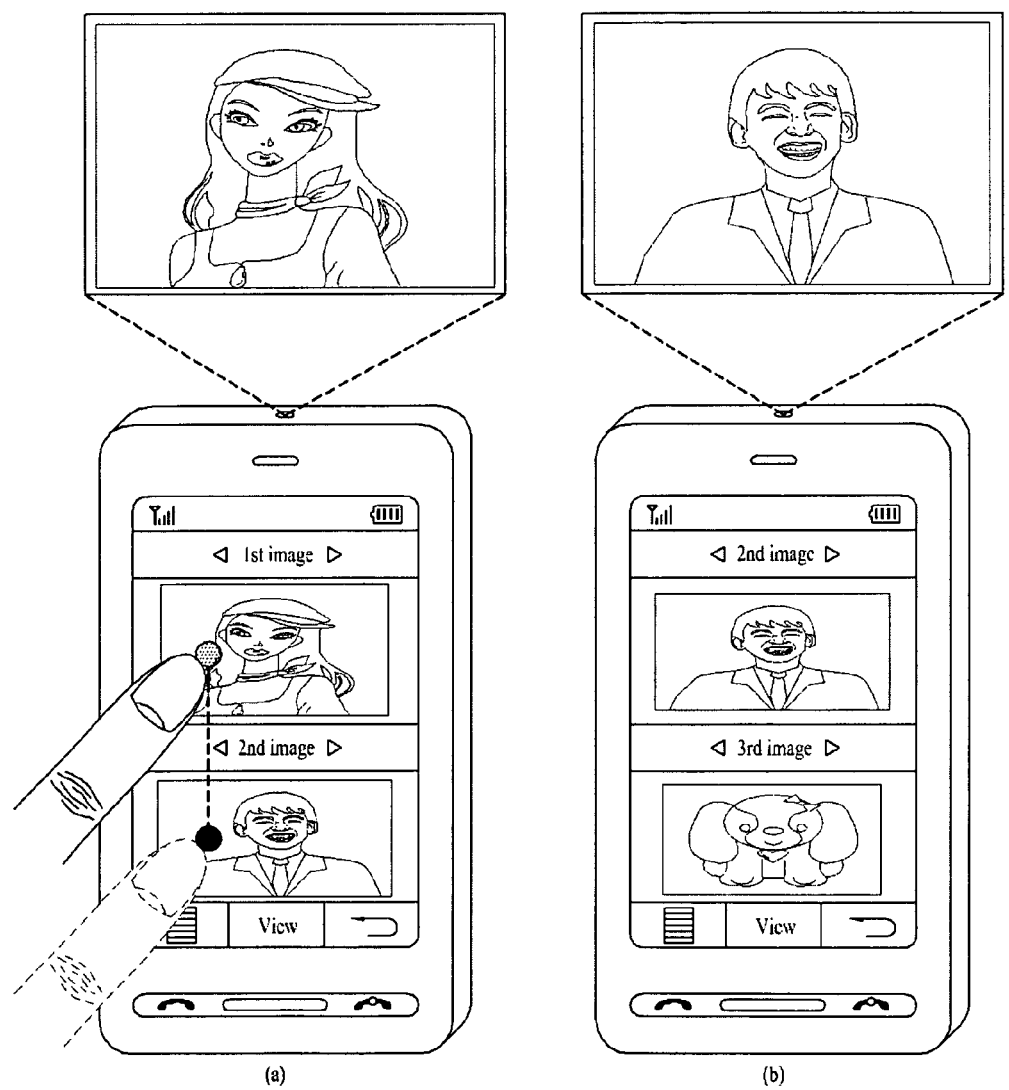
FIGS. 22A to 24B are diagrams for displaying an image displayed on a non-projection region on a projection region and a projection plane to correspond to a touch and drag performed between the non-projection region and the projection region in a mobile terminal according to one embodiment.
Figure 22B:
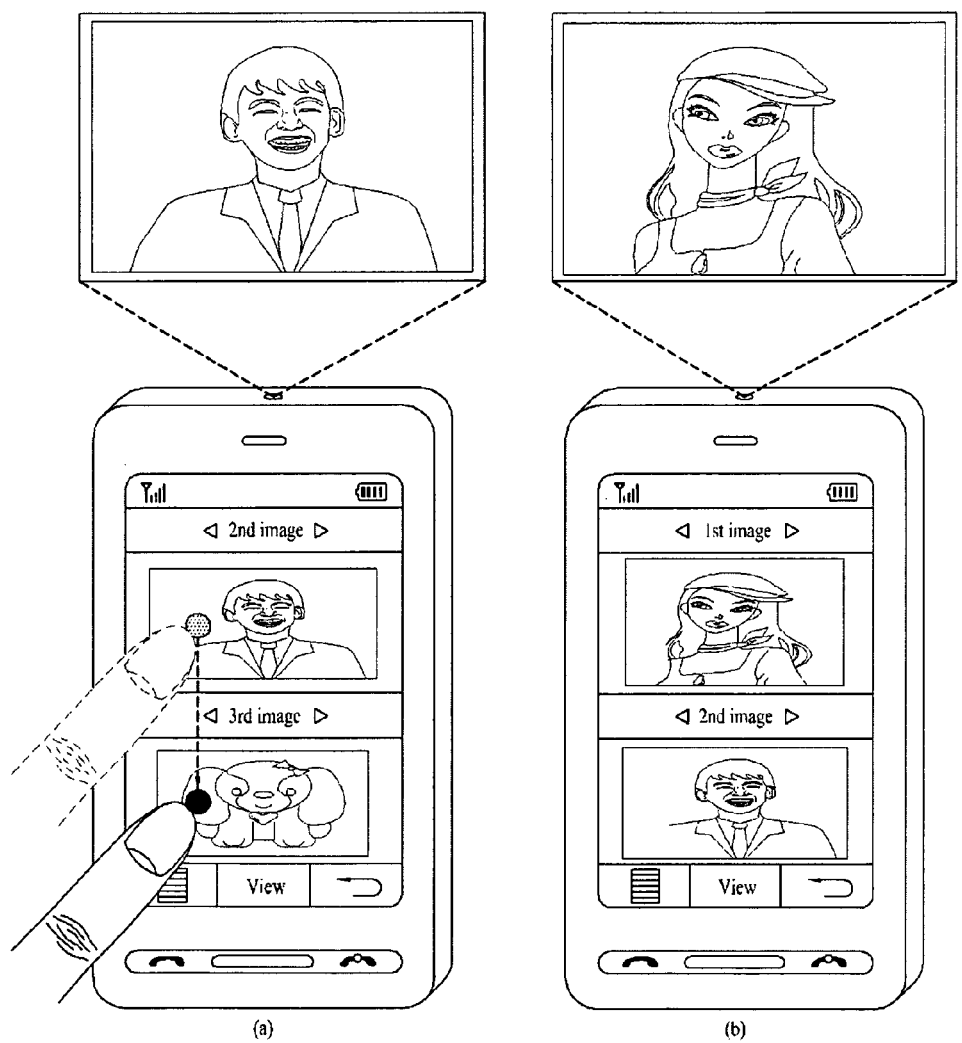

Referring to FIG. 22A and FIG. 22B, if the mobile terminal 100 detects a touch and drag to one point of a projection region from one point of a non-projection region in the course of displaying first and second photos on the projection and non-projection regions, respectively [(a) of FIG. 22A], the mobile terminal 100 is able to display the second photo on the projection region and the projection plane [(b) of FIG. 22A]. In doing so, a third photo can be displayed on the non-projection region.

If the mobile terminal 100 detects a touch and drag to one point of the non-projection region from one point of the projection region in the status shown in (b) of FIG. 22A [(a) of FIG. 22B], the mobile terminal 100 returns to the status shown in (a) of FIG. 22A and then displays the first photo on the projection region and the projection plane [(b) of FIG. 22B].

Figure 23A:
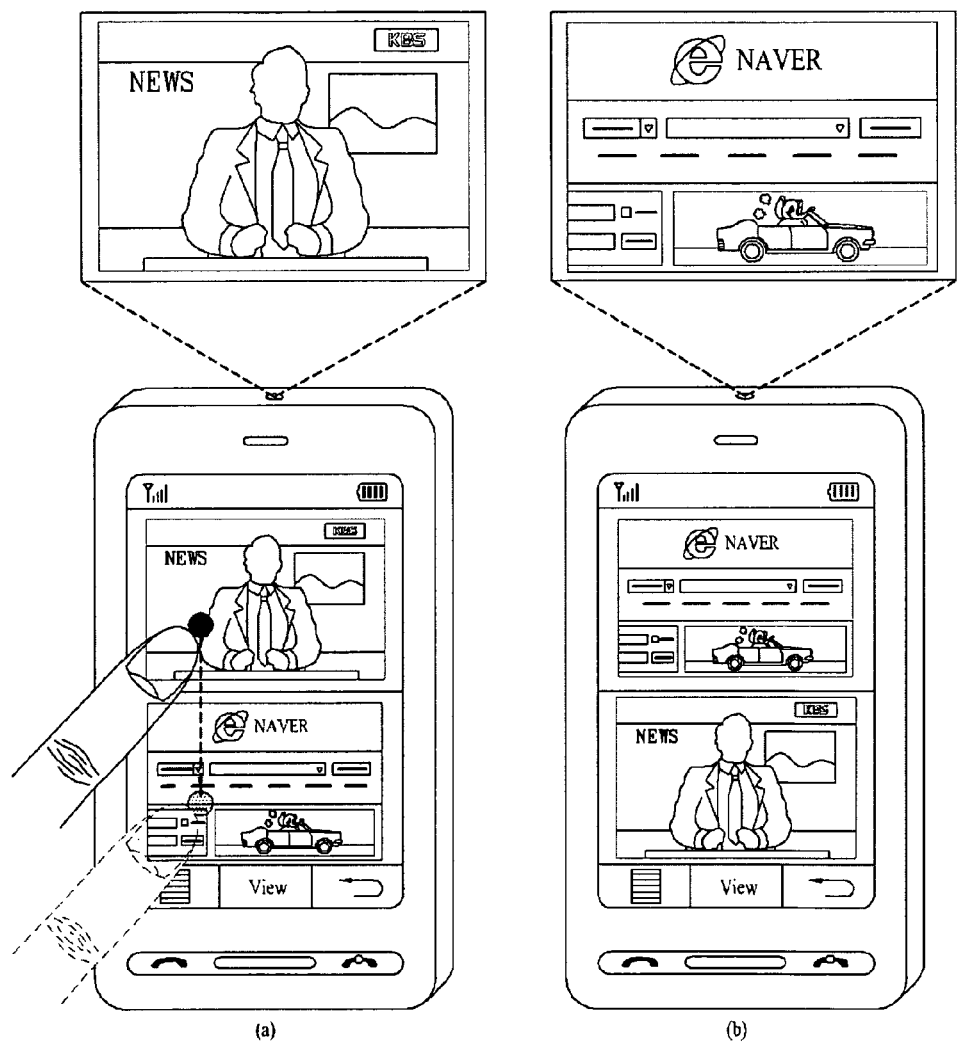
Figure 23B:
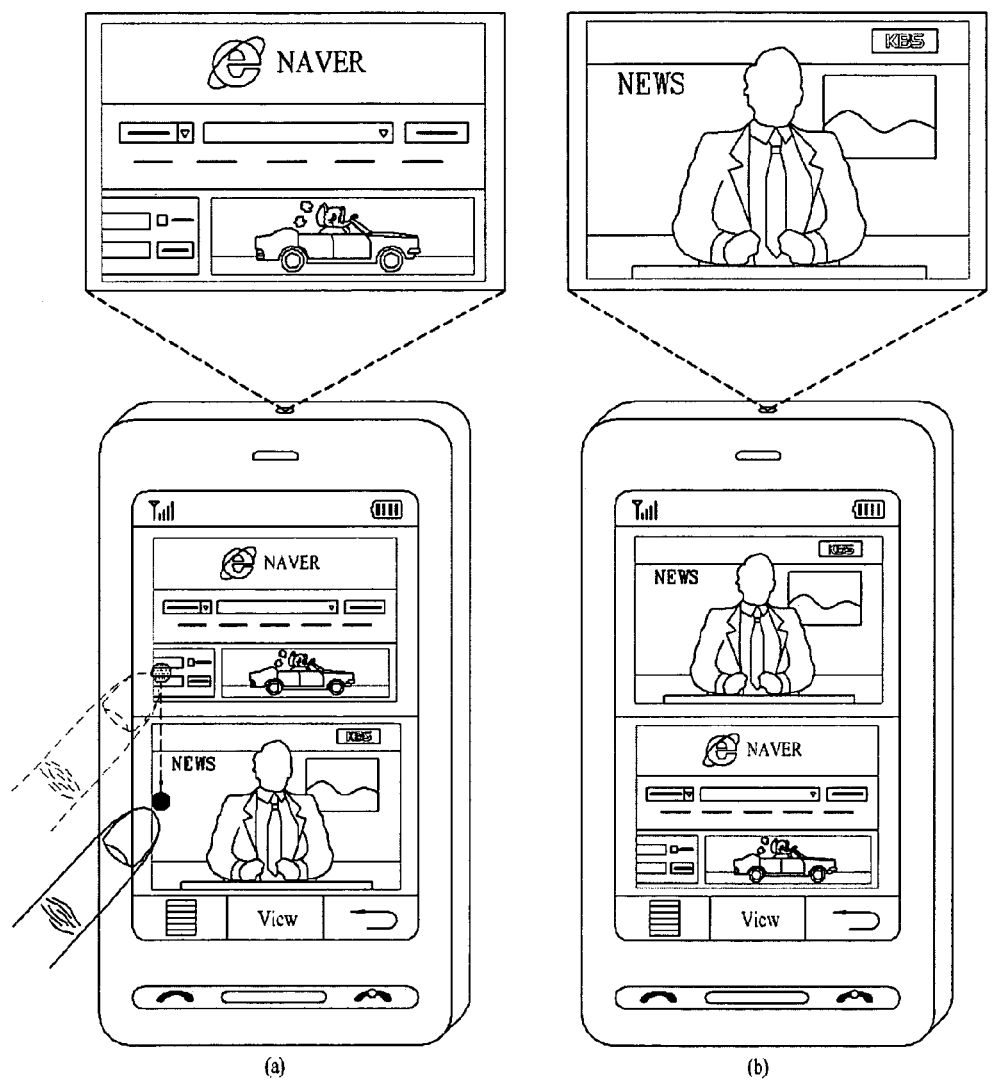

Referring to FIG. 23A and FIG. 23B, if the mobile terminal 100 detects a touch and drag to one point of a projection region from one point of a non-projection region in the course of displaying a broadcast output picture and an internet access picture on the projection region and the non-projection region, respectively (assuming that a broadcast output and an internet access are simultaneously in progress) [(a) of FIG. 23A], the mobile terminal 100 is able to display the internet access picture on the projection region and a projection plane [(b) of FIG. 23A]. In doing so, the broadcast output picture can be displayed on the non-projection region.

If the mobile terminal 100 detects a touch and drag to one point of the non-projection region from one point of the projection region in the status shown in (b) of FIG. 23A [(a) of FIG. 23B], the mobile terminal 100 returns to the status shown in (a) of FIG. 23A and then displays the broadcast output picture on the projection region and the projection plane [(b) of FIG. 23B].

Figure 24A:
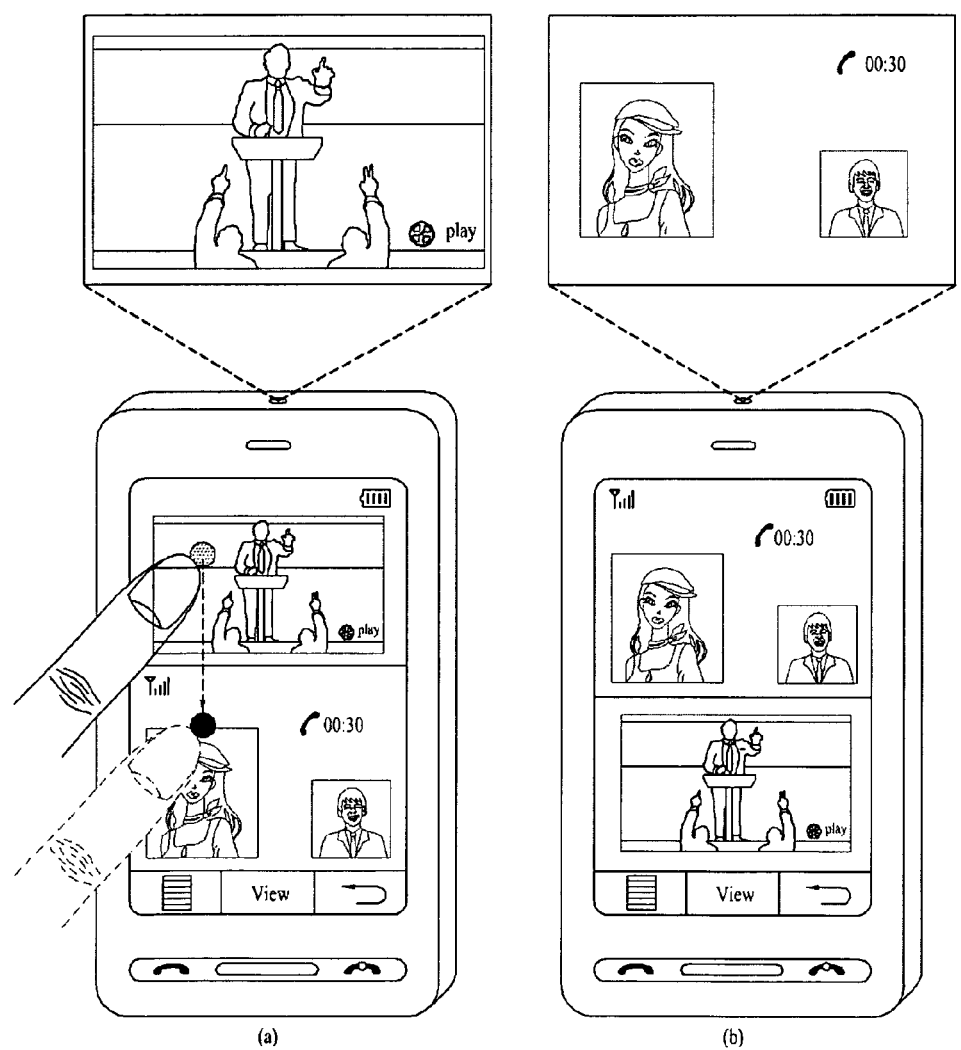
Figure 24B:
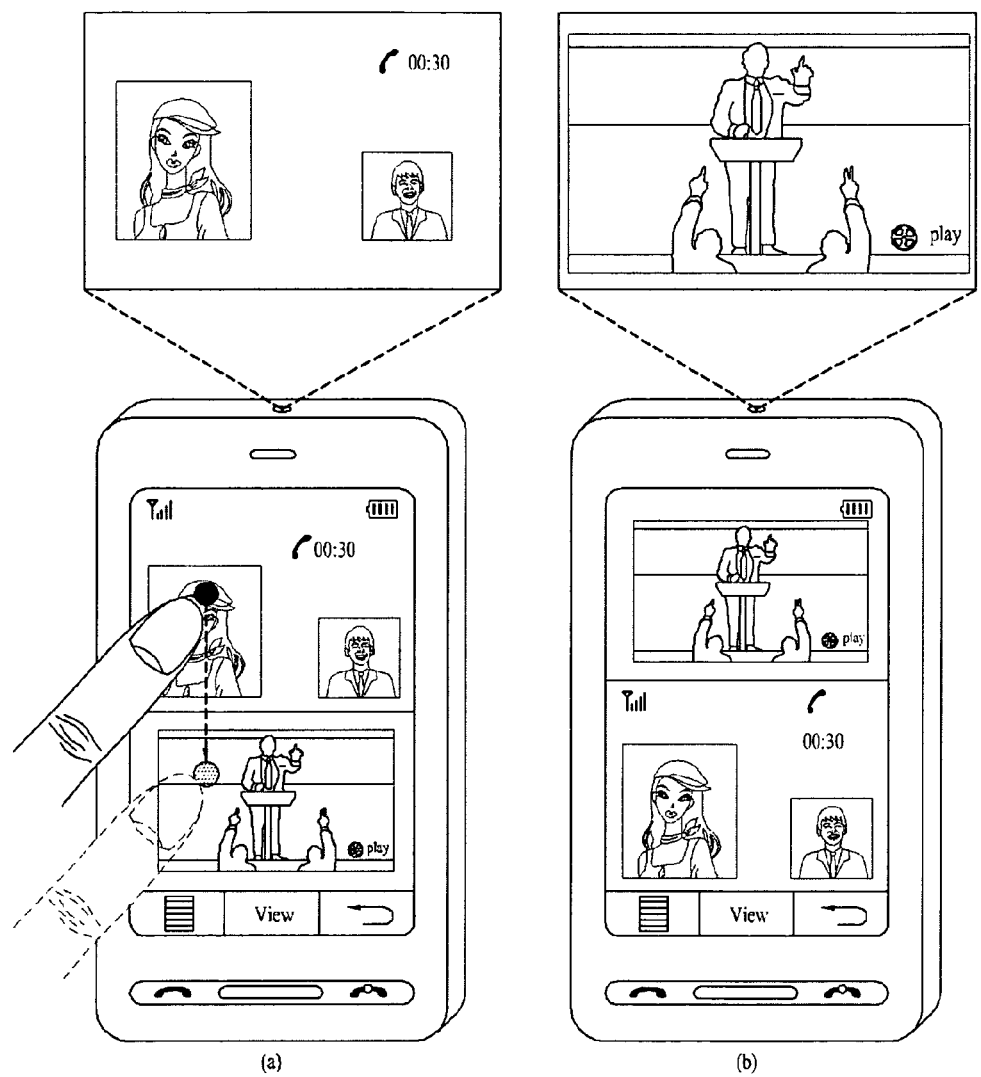

Referring to FIG. 24A and FIG. 24B, if the mobile terminal 100 detects a touch and drag to one point of a projection region from one point of a non-projection region in the course of displaying a moving picture play picture and a video call picture on the projection region and the non-projection region, respectively (assuming that a moving picture playback and a video call are simultaneously in progress) [(a) of FIG. 24A], the mobile terminal 100 is able to display the video call picture on the projection region and a projection plane [(b) of FIG. 24A]. In doing so, the moving picture play picture can be displayed on the non-projection region.

If the mobile terminal 100 detects a touch and drag to one point of the non-projection region from one point of the projection region in the status shown in (b) of FIG. 24A [(a) of FIG. 24B], the mobile terminal 100 returns to the status shown in (a) of FIG. 24A and then displays the moving picture play picture on the projection region and the projection plane [(b) of FIG. 24B].

Figure 25A:
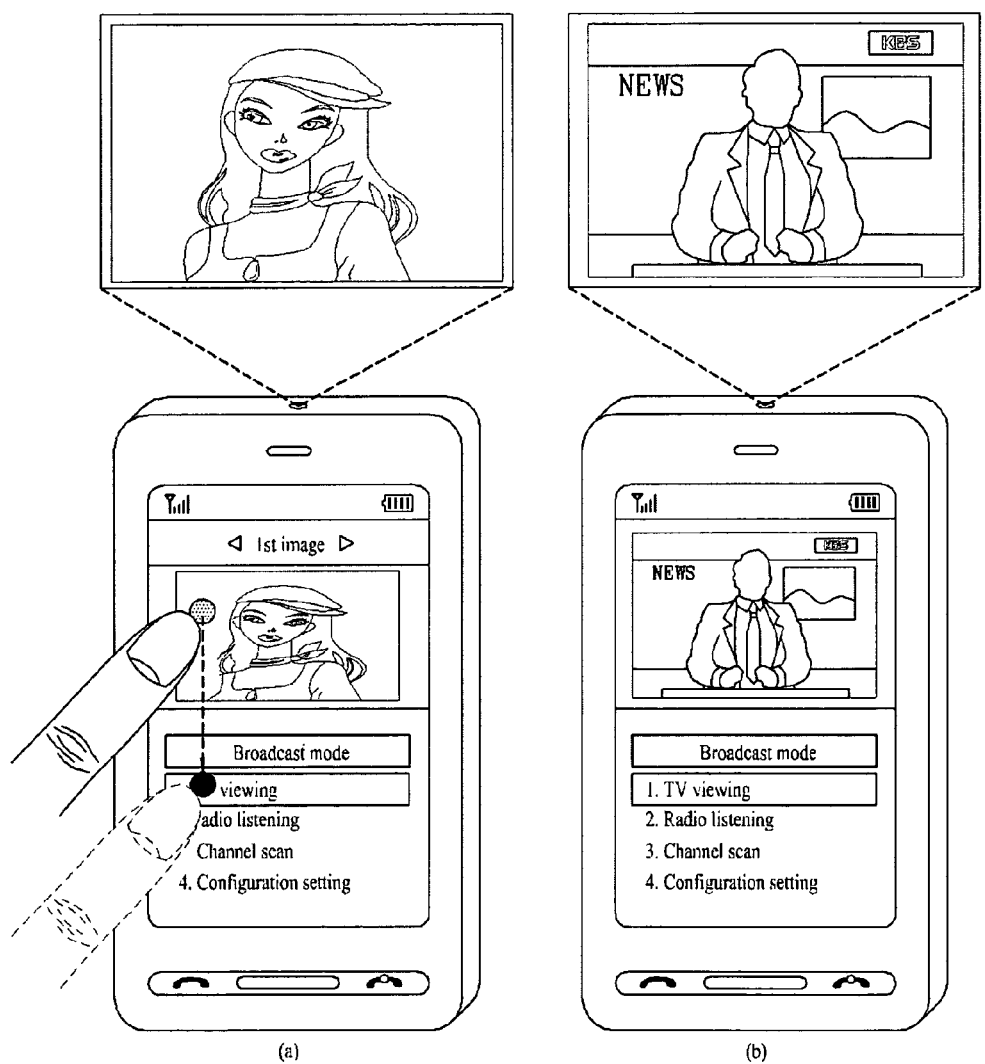
FIGS. 25A to 31B are diagrams for displaying an image corresponding to a touched point of a non-projection region on a projection region and a projection plane to correspond to a touch and drag performed between the non-projection region and the projection region in a mobile terminal according to one embodiment.
Figure 25B:
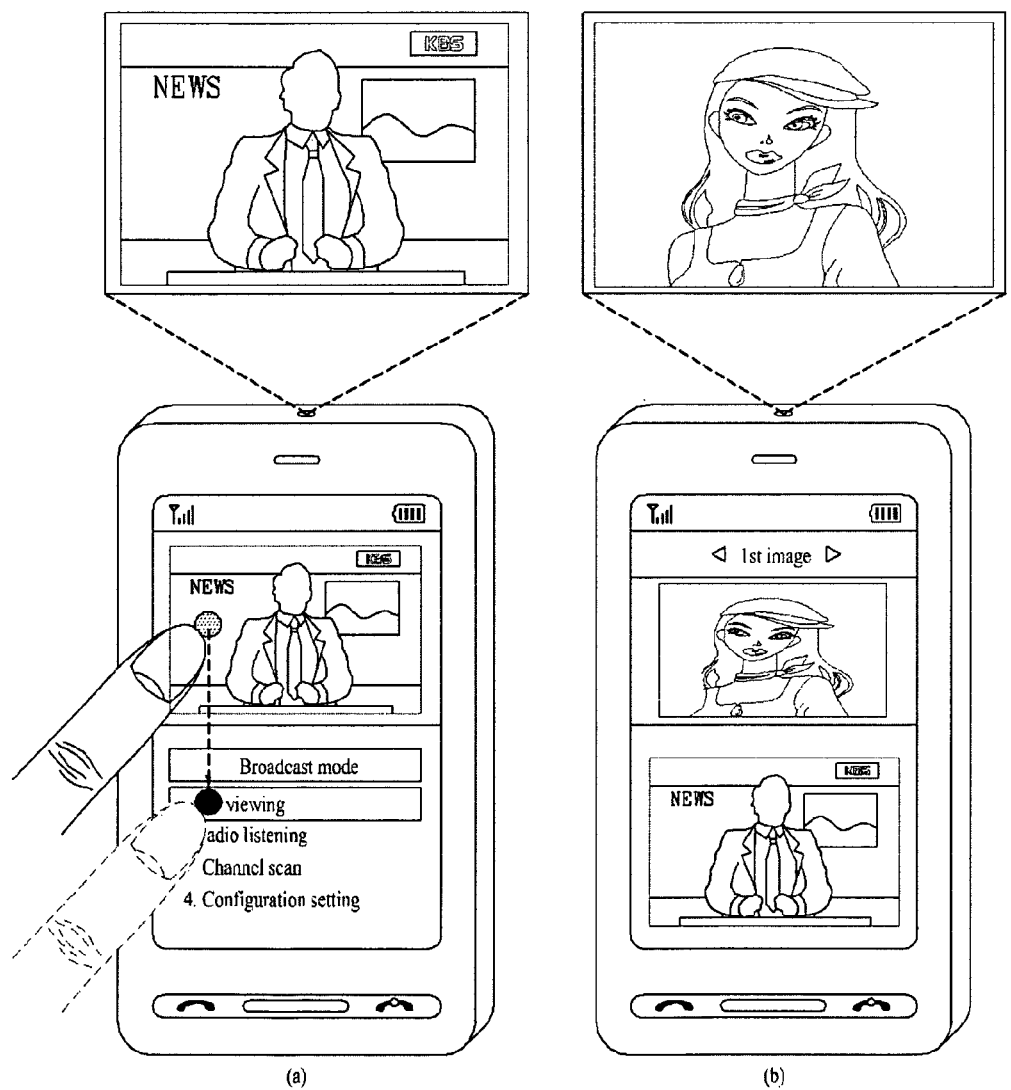

Referring to FIG. 25A and FIG. 25B, if the mobile terminal 100 detects a touch and drag to one point of a projection region from 'TV viewing' region in a list of a non-projection region in the course of displaying a first photo and a broadcast mode relevant operation list on the projection region and the non-projection region, respectively (assuming that a camera mode and a broadcast mode are simultaneously in progress) [(a) of FIG. 25A], the mobile terminal 100 is able to display a broadcast output picture on the projection region and a projection plane [(b) of FIG. 25B]. In doing so, the broadcast mode relevant operation list can keep being displayed on the non-projection region.

If the mobile terminal 100 detects a touch and drag to one point of the non-projection region from one point of the projection region in the status shown in (b) of FIG. 25A [(a) of FIG. 25B], the mobile terminal 100 displays the first photo on both of the projection region and the projection plane and displays the broadcast output picture on the non-projection region [(b) of FIG. 25B]. Alternatively, the mobile terminal 100 is able to return to the status shown in (a) of FIG. 25A.

Figure 26A:
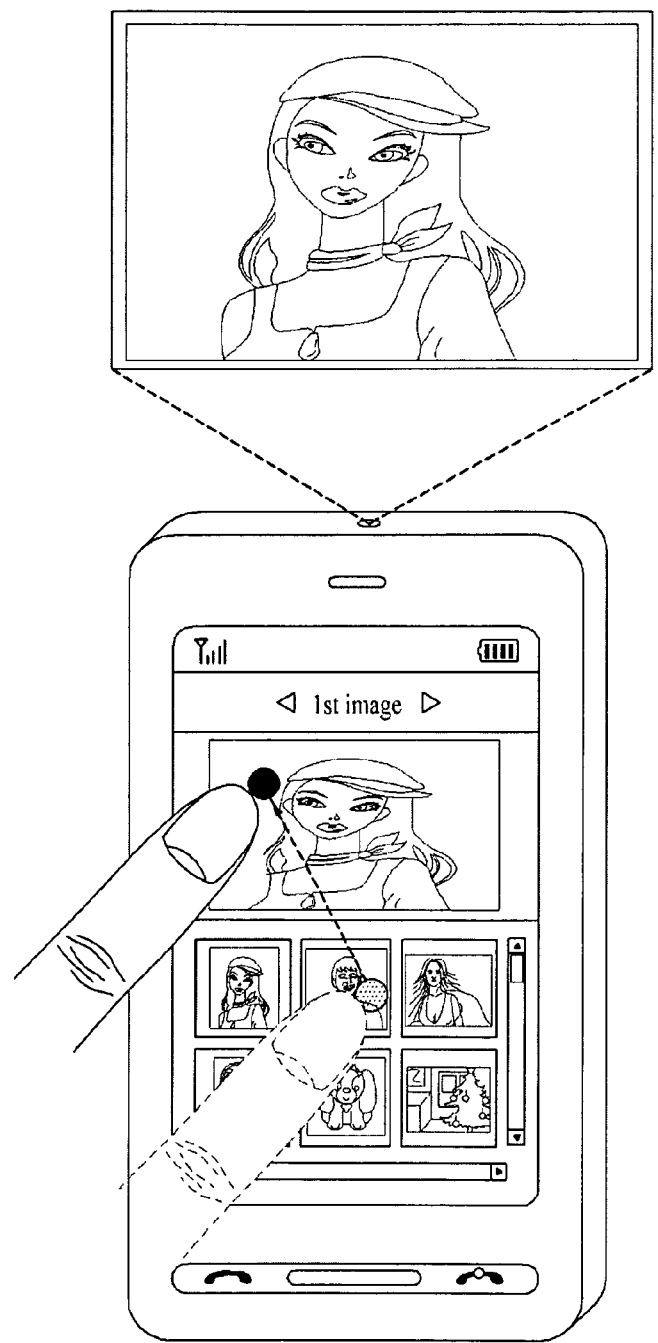
Figure 26B:
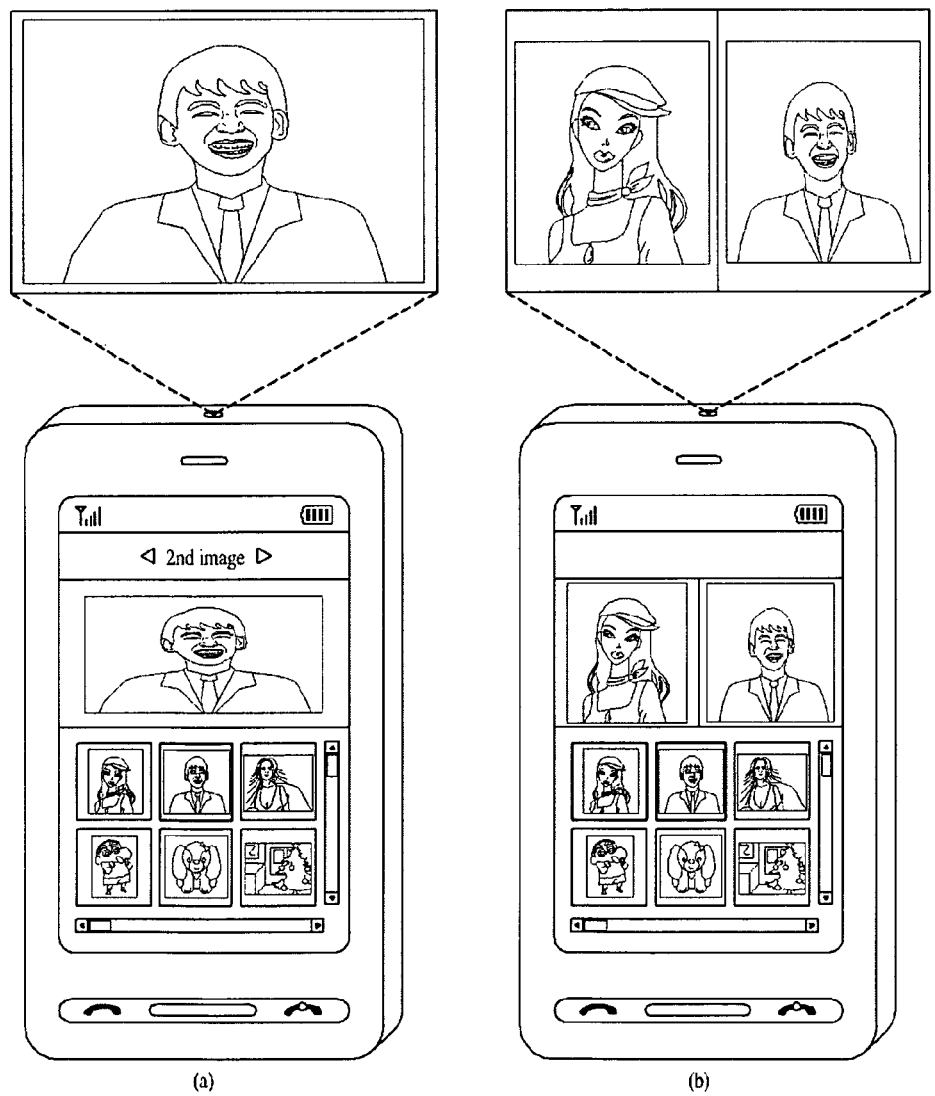

Referring to FIGS. 26A to 27B, if the mobile terminal 100 detects a touch and drag to one point of a projection region from 'second photo' region in a photo list of a non-projection region in the course of displaying a first photo and the photo list on the projection region and the non-projection region, respectively [(a) of FIG. 26A], the mobile terminal 100 is able to display a second photo on the projection region and a projection plane [(a) of FIG. 26B] or can display both of the first and second photos on both of the projection region and the projection plane [(b) of FIG. 26B]. In doing so, the photo list can keep being displayed on the non-projection region.

Figure 27A:
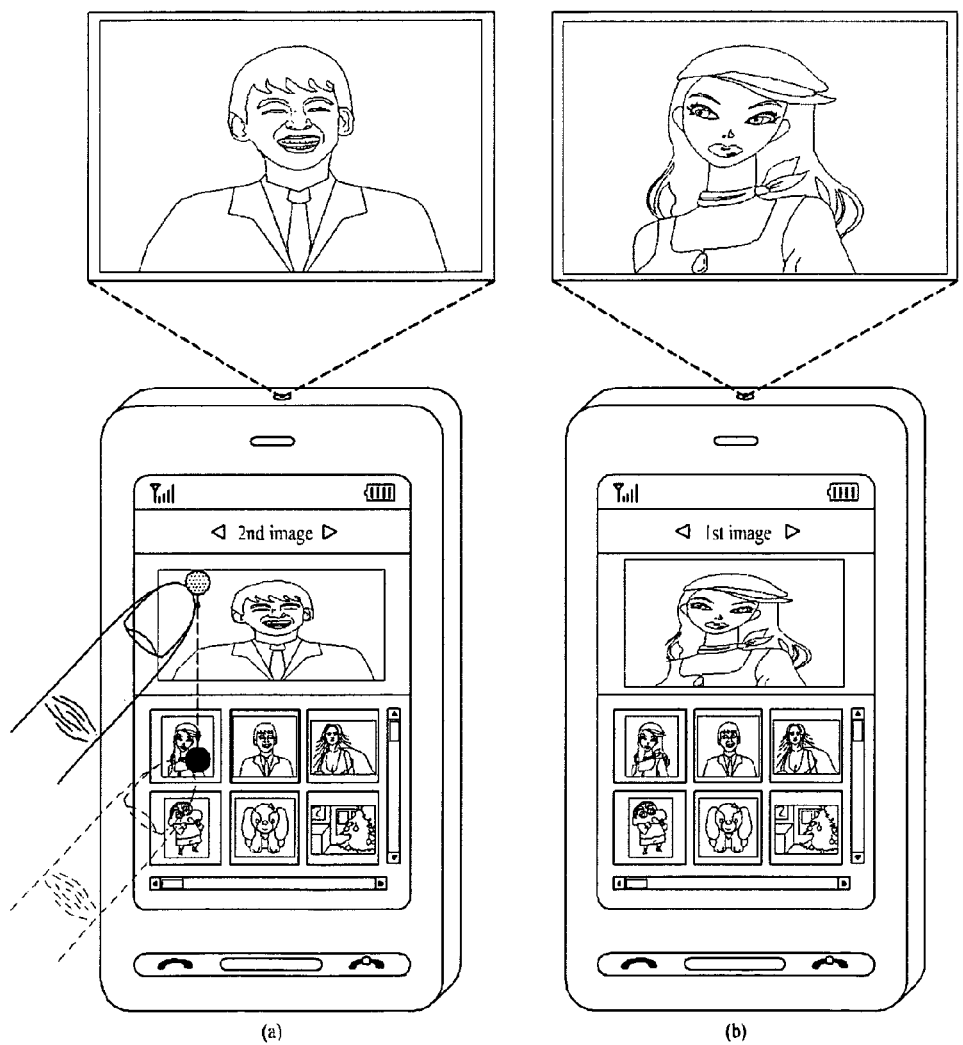

If the mobile terminal 100 detects a touch and drag to one point of the non-projection region from one point of the projection region in the status shown in (a) of FIG. 26B [(a) of FIG. 27A], the mobile terminal 100 is able to return to the status shown in FIG. 26A [(b) of FIG. 27A].

Figure 27B:
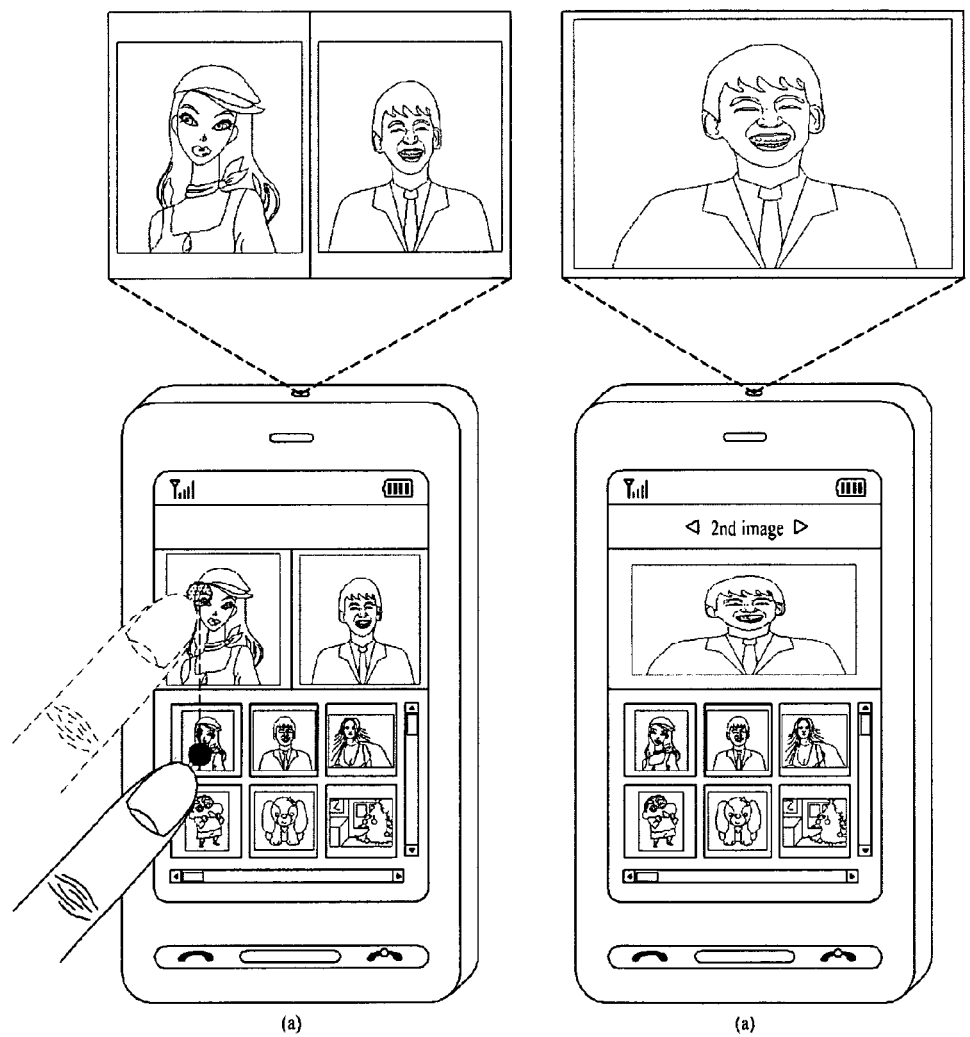

If the mobile terminal 100 detects a touch and drag to one point of the non-projection region from one point of either the first photo or the second photo of the projection region in the status shown in (b) of FIG. 26B [(a) of FIG. 27B], the mobile terminal 100 is able to display the photo, which avoids the above touch and drag, on both the projection region and the projection plane [(b) of FIG. 27B].

Figure 28A:
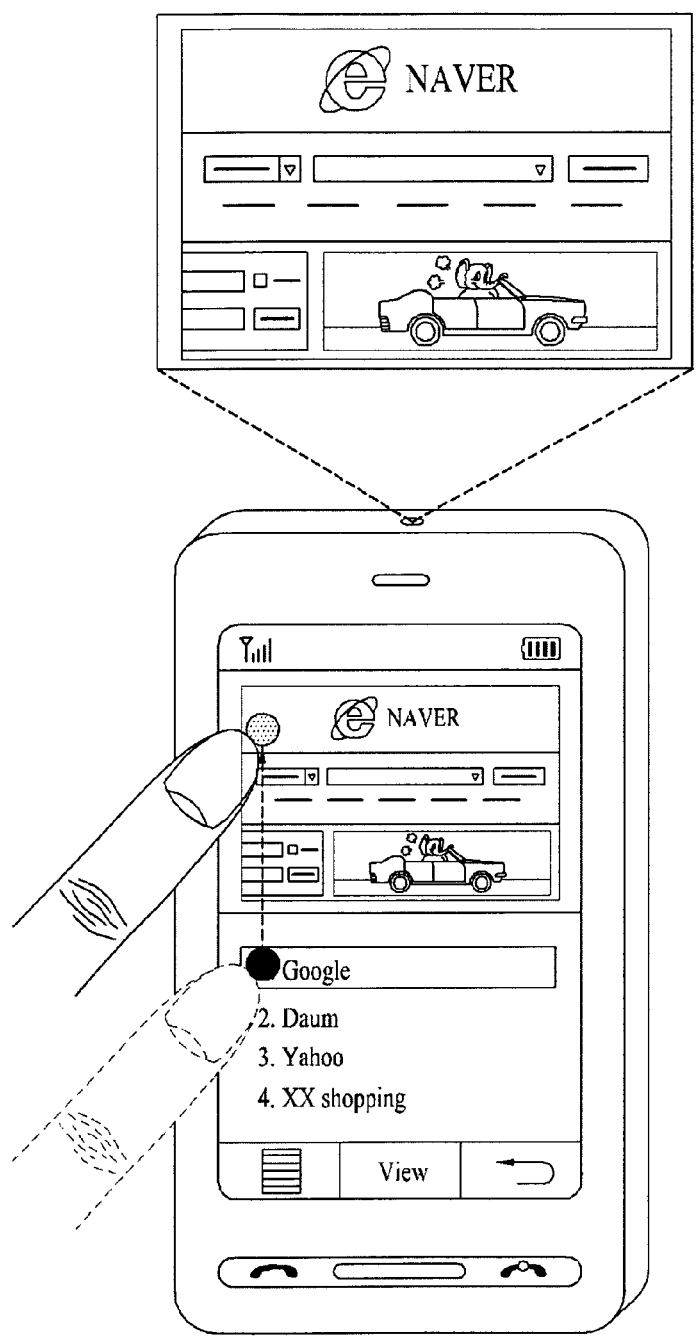
Figure 28B:
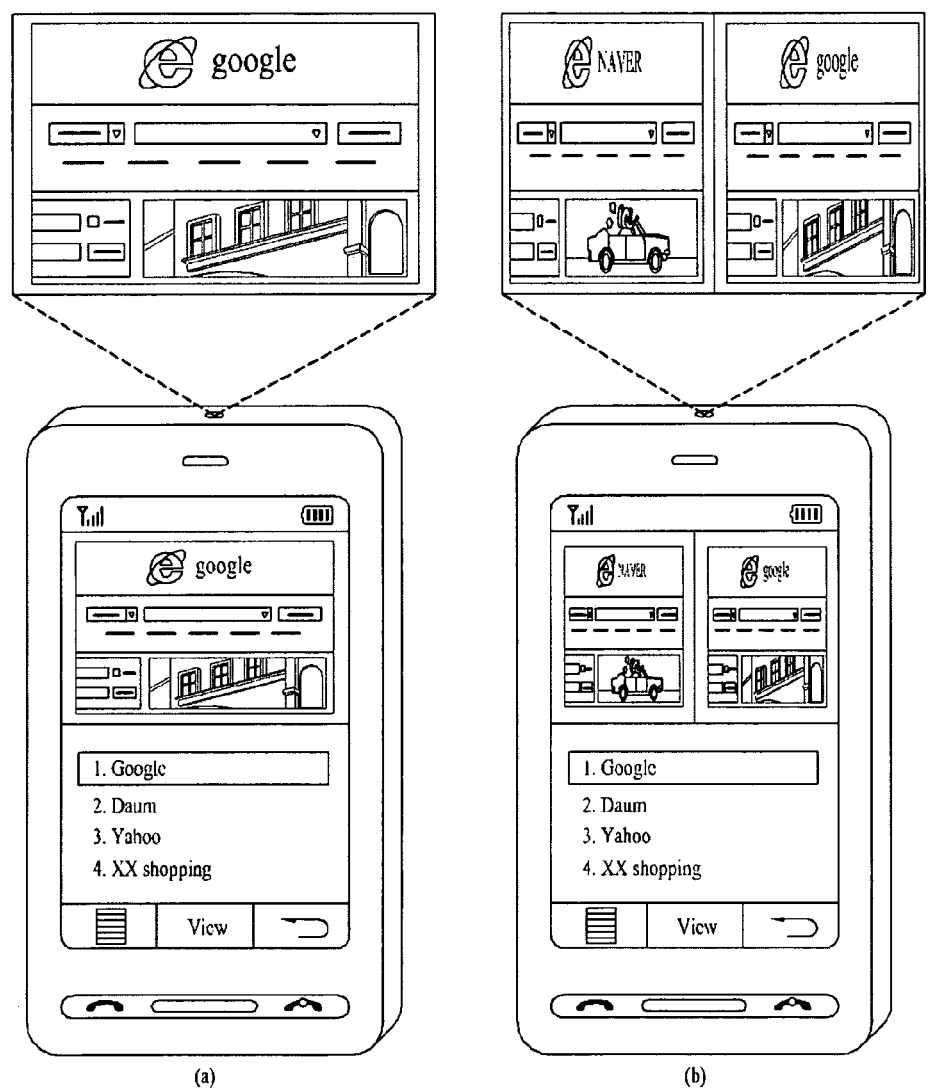

Referring to FIGS. 28A to 29B, if the mobile terminal 100 detects a touch and drag to one point of a projection region from 'second web address' region in a web address list of a non-projection region in the course of displaying an access picture to a first web address and the web address list on the projection region and the non-projection region, respectively [FIG. 28A], the mobile terminal 100 is able to display an access picture to a second web address on the projection region and a projection plane [(a) of FIG. 28B] or can display both of the access picture to the first web address and the access picture to the second web address on both of the projection region and the projection plane [(b) of FIG. 28B]. In doing so, the web address list can keep being displayed on the non-projection region.

Figure 29A:
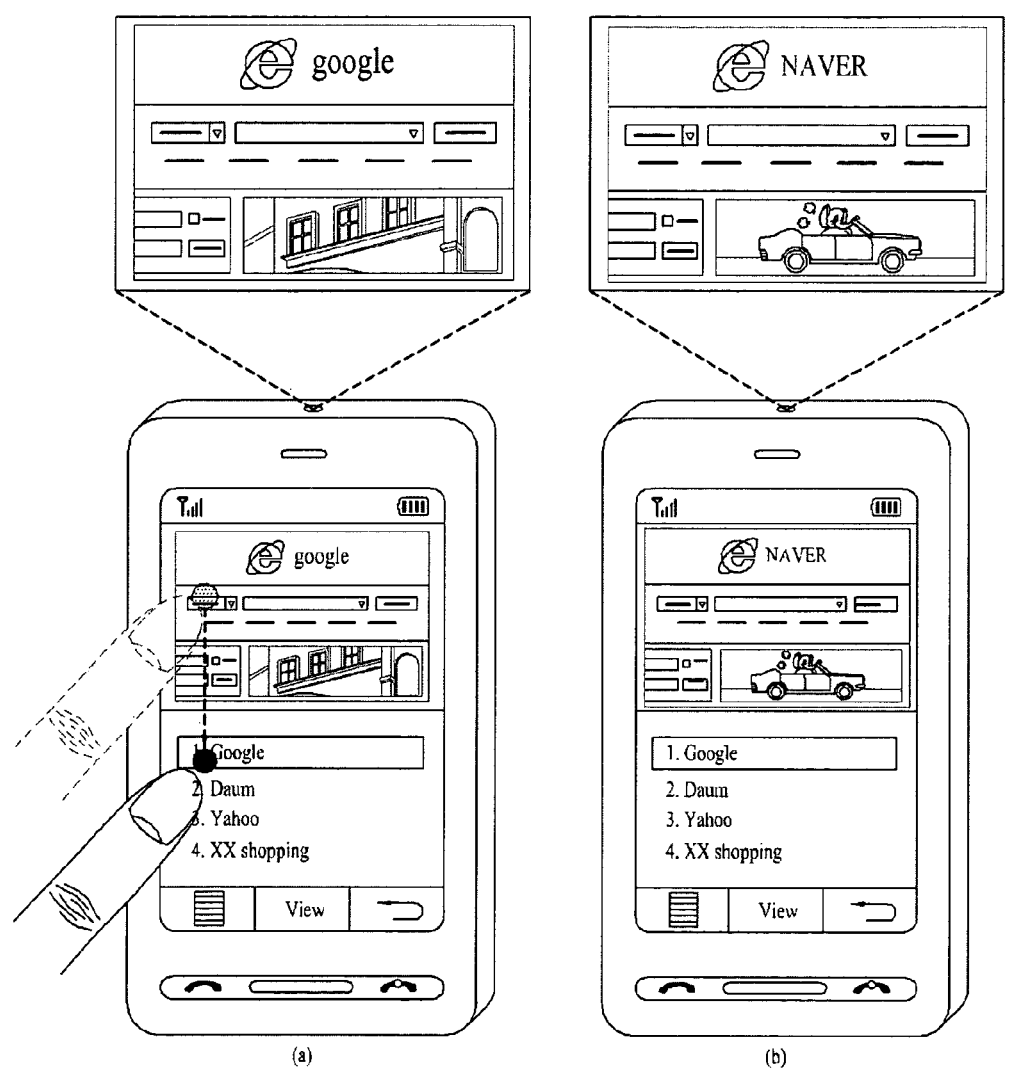

If the mobile terminal 100 detects a touch and drag to one point of the non-projection region from one point of the projection region in the status shown in (a) of FIG. 28B [(a) of FIG. 29A], the mobile terminal 100 is able to return to the status shown in FIG. 28A [(b) of FIG. 29A].

Figure 29B:
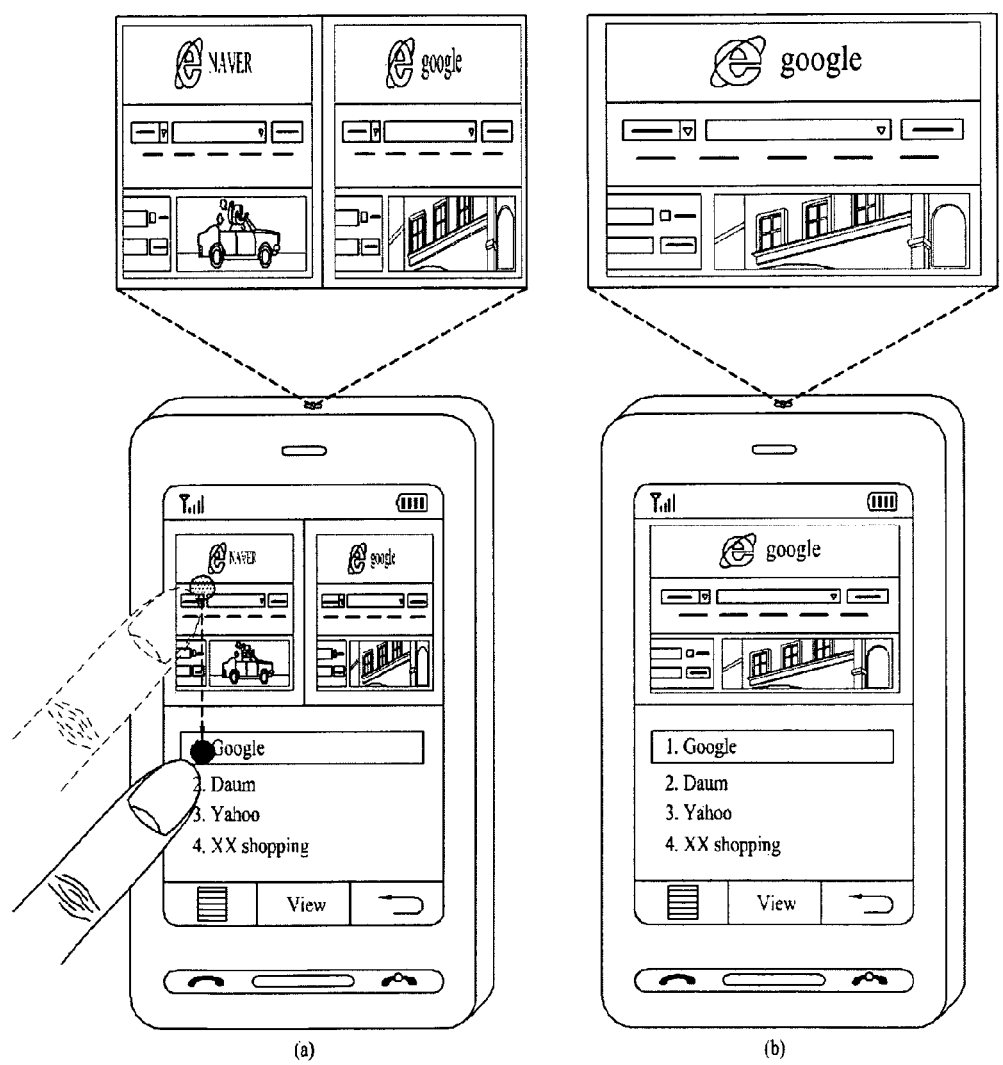

If the mobile terminal 100 detects a touch and drag to one point of the non-projection region from one point of either the access picture to the first web address or the access picture to the second web address in the status shown in (b) of FIG. 28B [(a) of FIG. 29B], the mobile terminal 100 is able to display the access picture, which avoids the above touch and drag, on both the projection region and the projection plane [(b) of FIG. 29B].

Figure 30A:
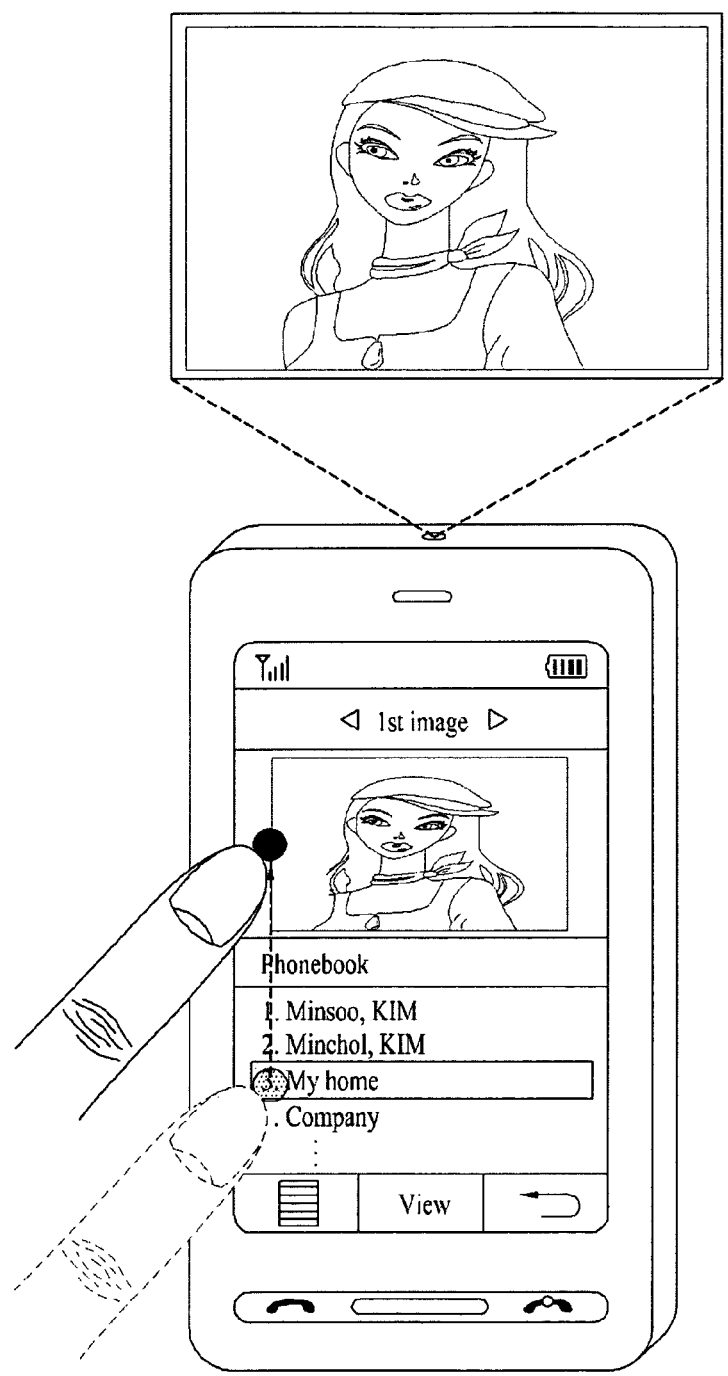
Figure 30B:
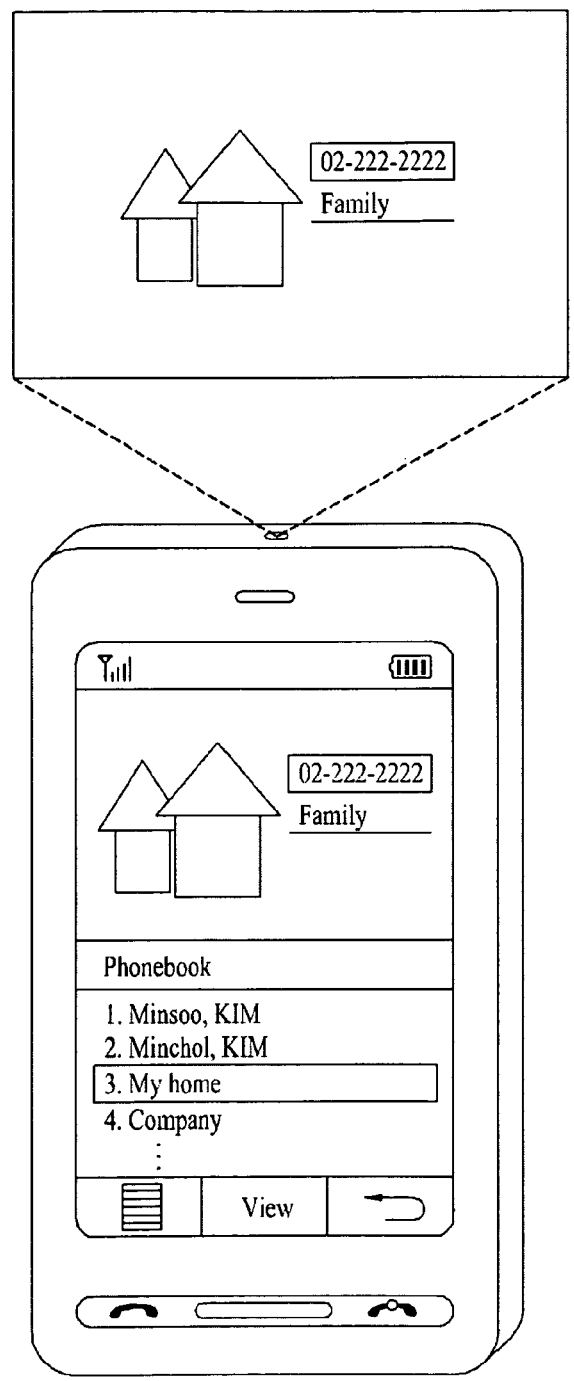
Figure 30C:
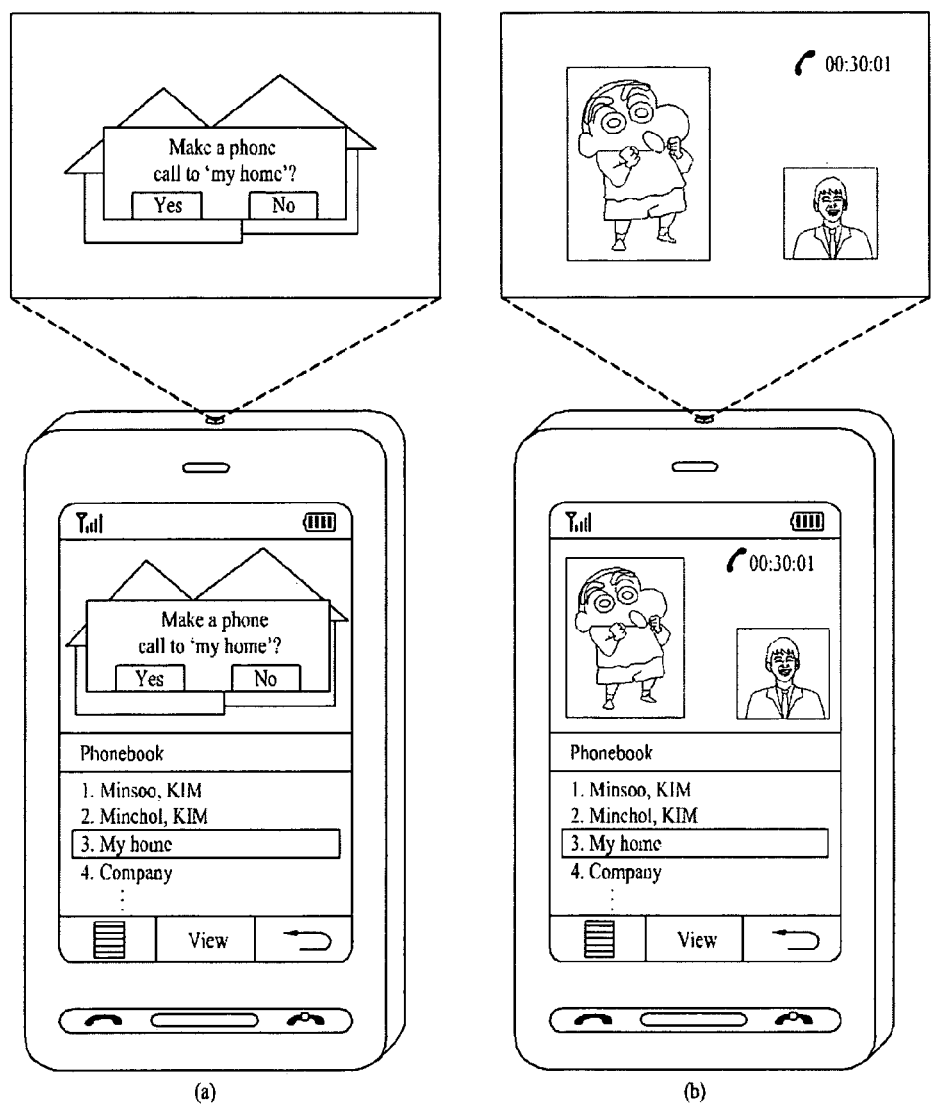

Referring to FIGS. 30A to 31B, if the mobile terminal 100 detects a touch and drag to one point of a projection region from 'my home' region in a phone number list of a non-projection region in the course of displaying a first photo and the phone number list on the projection region and the non-projection region, respectively (assuming that a photo display and a phone number search are simultaneously in progress) [FIG. 30A], the mobile terminal 100 displays information on 'my home' on the projection region and a projection plane [FIG. 30B], displays a window for enabling a user to select whether to make a phone call to the 'my home' on both of the projection region and the projection plane [(a) of FIG. 30C], or can display a picture according to the call connection to the 'my home' on both of the projection region and the projection plane after trying the call connection to the 'my home' [(b) of FIG. 30C].

Figure 31A:
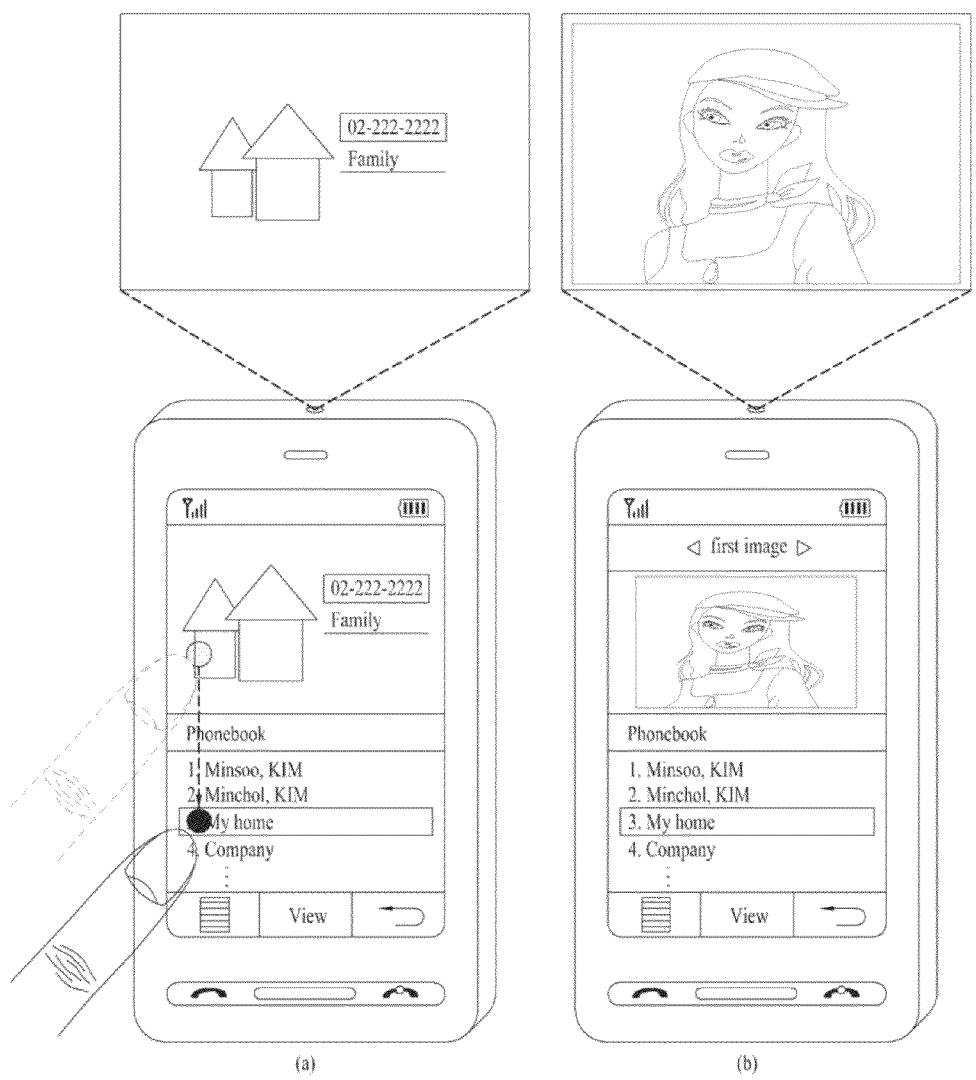
Figure 31B:
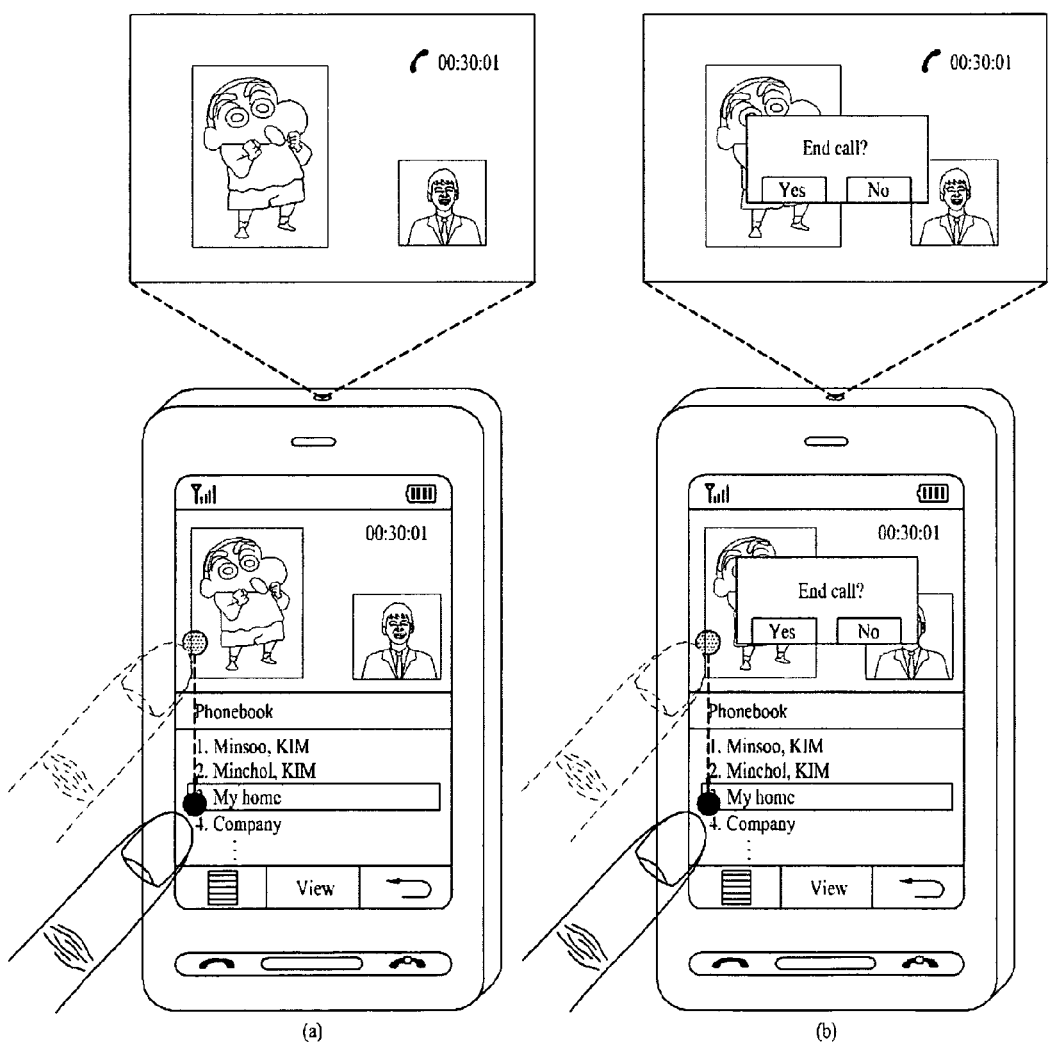

If the mobile terminal 100 detects a touch and drag to one point of the non-projection region from one point of the projection region in the status shown in FIG. 30B [(a) of FIG. 31A], the mobile terminal 100 displays a window for enabling a user to select a call disconnection with the 'my home' on both of the projection region and the projection plane [(b) of FIG. 31B]. Alternatively, the mobile terminal 100 ends the call and is then able to return to the status shown in FIG. 30A.

Figure 32:
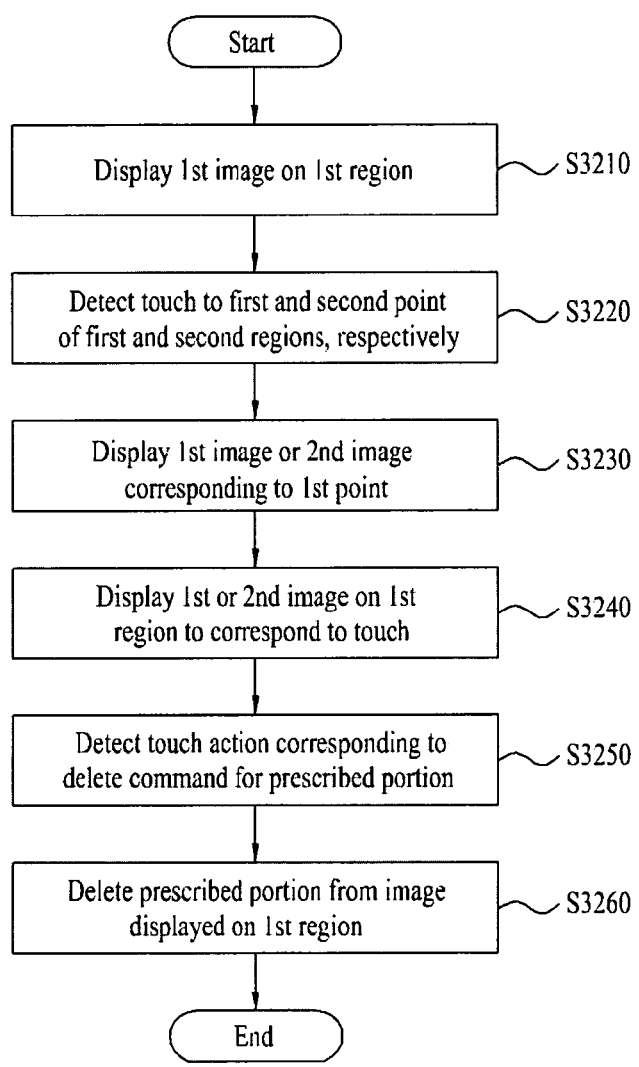
FIG. 32 is a flowchart for a method of controlling a display of a mobile terminal according to another embodiment.

Referring to FIG. 32, the mobile terminal 100 includes a first region and a second region provided to the touch screen and then displays a first image on the first region (or a display region) under the control of the controller 180 [S3210].

In this case, the first region means a region responsible for a display on the touch screen and the second region can mean a region for receiving an input of a touch to an image to display on a projection plane using the projector module 155. For instance, the second region can include an outer region except the first region on the touch screen (hereinafter called 'outer region') or an icon region separately provided to the touch screen (hereinafter called ;icon region').

Under the control of the controller 180, the mobile terminal 100 detects a touch to first and second points of the first and second regions [S3220].

In this case, the touch to the first and second points may mean the touch for generating a command signal to display the first image displayed on the first region or a second image corresponding to a first point of the first image on the projection plane. For instance, the touch to the first and second points can include a multi-touch to the first and second points, a touch and drag to the second point from the first point, or the like.

If the mobile terminal 100 detects the touch to the first and second points, the mobile terminal 100 displays the first image or the second image corresponding to the first point on the projection plane (or an external screen) under the control of the controller 180 [S3230].

In this case, the first image may include one or more of the following: an image associated with an executed application, an application list, a multimedia data list, a web address list, a phone number list and a folder list.

And, the second image may include one or more of the following: an image associated with an executed application, in response to detecting a user selecting the application from an application list by touching a first point. The second image may include an image associated with multimedia data being executed, in response to detecting a user selecting the multimedia data from a multimedia data list by touching the first point.

The second image may also include an image associated with a web site, in response to detecting the selection of a web site address from a web address list by way of a user touching the first point. The second image may include an image associated with a voice/video call connection to a phone number, in response to detecting a user selecting a phone number from a phone number list by touching to the first point. The second image may include an image associated with execution of data included in a specific folder if a touch to the specific folder in a folder list is detected as a touch to the first point.

In the following description, a process for displaying an image on a projection plane to correspond to a touch to first and second points is explained in detail with reference to FIGS. 33A to 34B.

Figure 33A:
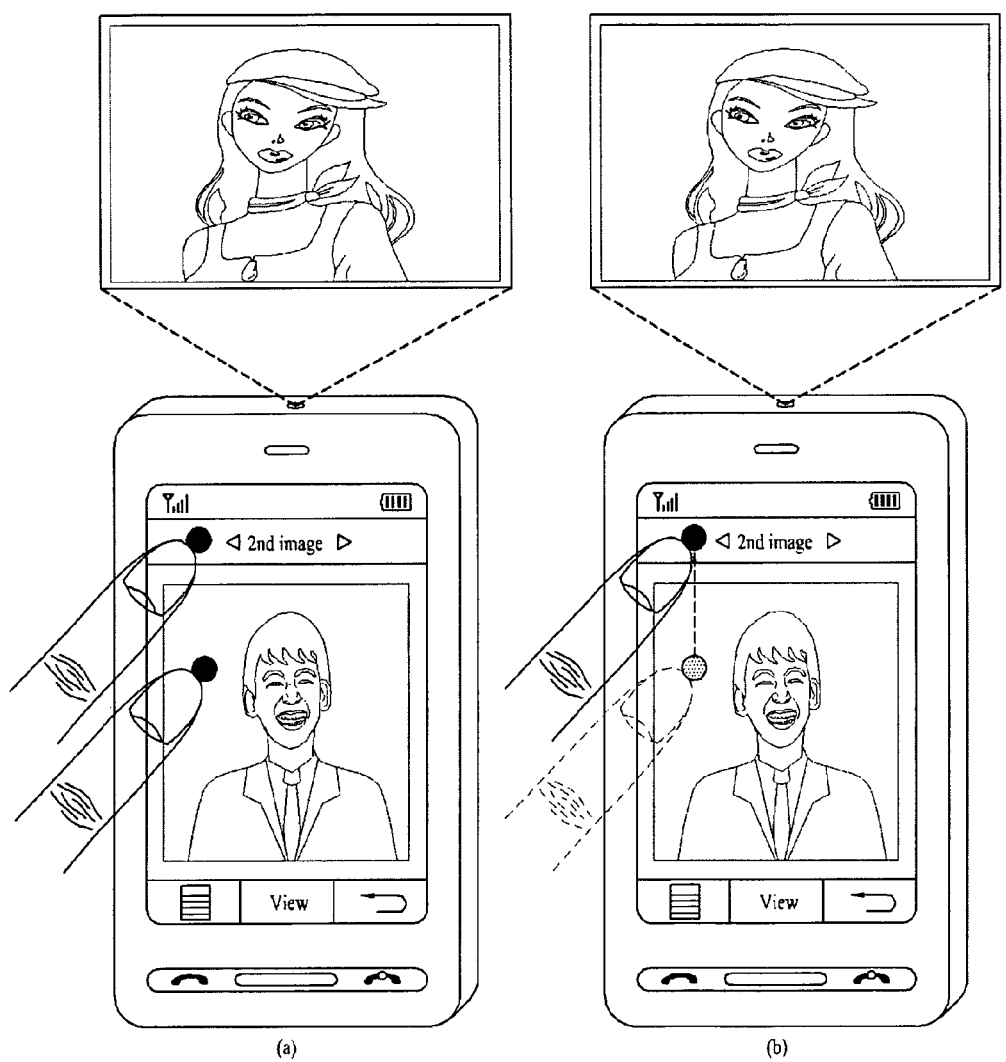
FIGS. 33A to 33C are diagrams of touches to first and second regions in a mobile terminal according to another embodiment.
Figure 33B:
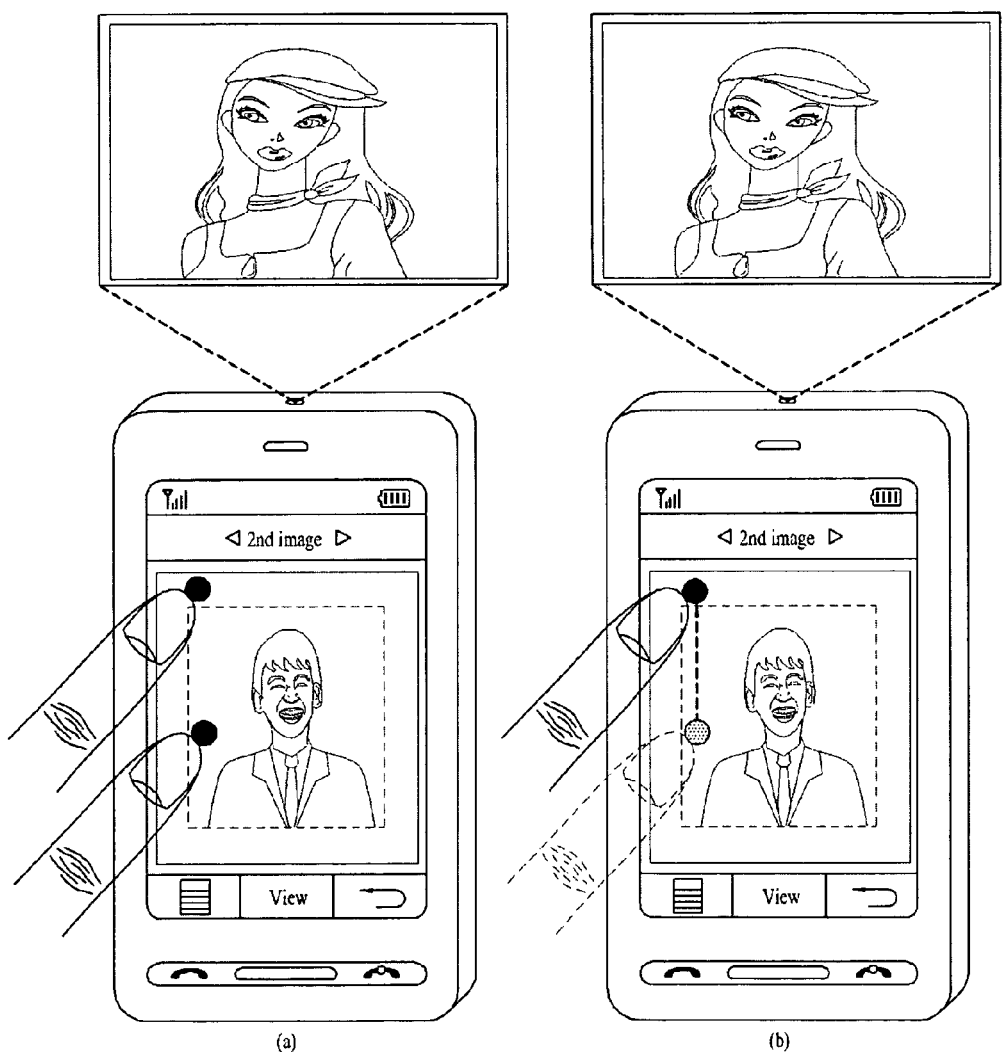
Figure 33C:

In particular, FIG. 33A shows a case that a second region is an outer region, FIG. 33B shows a case that a second region includes an edge region of a first region and an outer region (i.e., a case that the second region and the first region are overlapped in part), and FIG. 33C shows a case that a second region is an icon region.

Figure 34A:
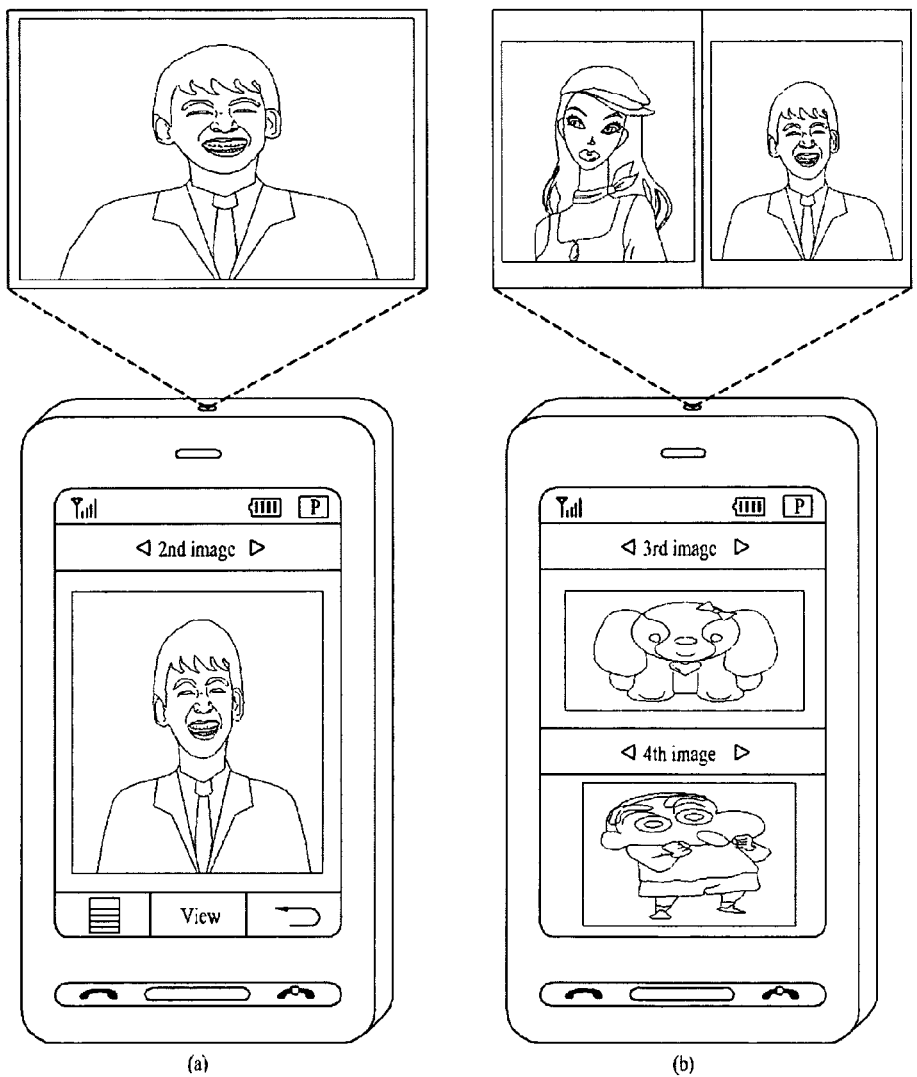
FIG. 34A and FIG. 34B are diagrams for displaying an image on a first region and a projection plane to correspond to the touch in FIGS. 33A to 33C.
Figure 34B:

In one implementation, if the mobile terminal 100 detects a multi-touch to first and second points [(a) of FIG. 33A, (a) of FIG. 33B, or (a) of FIG. 33C] or a touch and drag to the second point from the first point[(b) of FIG. 33A, (b) of FIG. 33B, or (b) of FIG. 33C], the mobile terminal 100 is able to display an image (or a first image), which is displayed on the first region, on a projection plane [FIG. 34A or FIG. 34B].

In particular, referring to FIG. 34A, the mobile terminal 100 displays the first image on the projection plane and the first region [(a)]. Alternatively, the mobile terminal 100 displays an image, which was displayed before the touch detection, on the projection plane and also displays at least one image next to the first image on the first region [(b)].

Referring to FIG. 34B, the mobile terminal 100 displays the first image on the projection plane and also displays the image next to the first image on the first region [(a)]. Alternatively, the mobile terminal 100 displays the image, which was displayed before the touch detection, on the projection plane and also displays an image list on the first region [(b)].

In particular, if the second region is an icon region, as shown in FIG. 34B, in order to represent a status that a specific image is absorbed in the icon region according to a touch and drag to the first point from the second point, it is able to use an image conversion, a vibration, a bell sound and/or the like. Optionally, the mobile terminal 100 is able to display an image corresponding to the first point on the projection plane [not shown in the drawing].

In the following description, a process for displaying a first or second image on a projection plane to correspond to a touch and drag to a second point of an icon region from a first point of a first region is explained in detail.

Figure 35A:
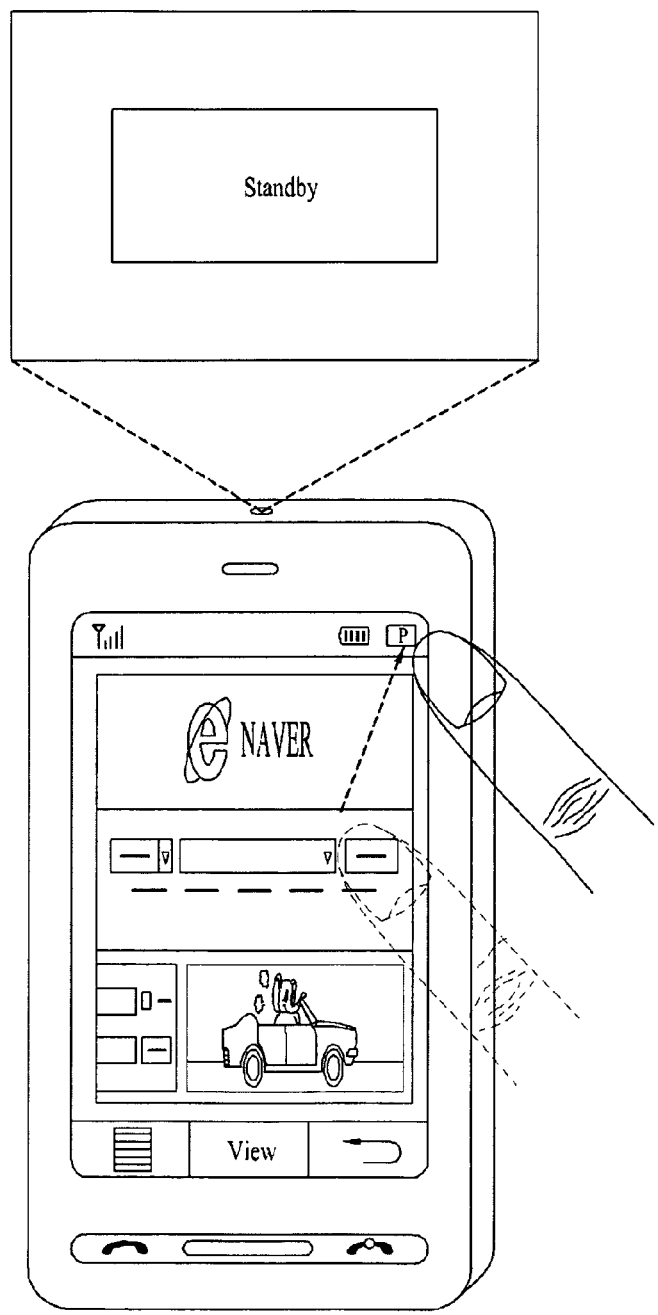
FIGS. 35A to 39B are diagrams for displaying an image on a first region and a projection plane to correspond to a touch and drag between the first region and a second region in a mobile terminal according to another embodiment.
Figure 35B:
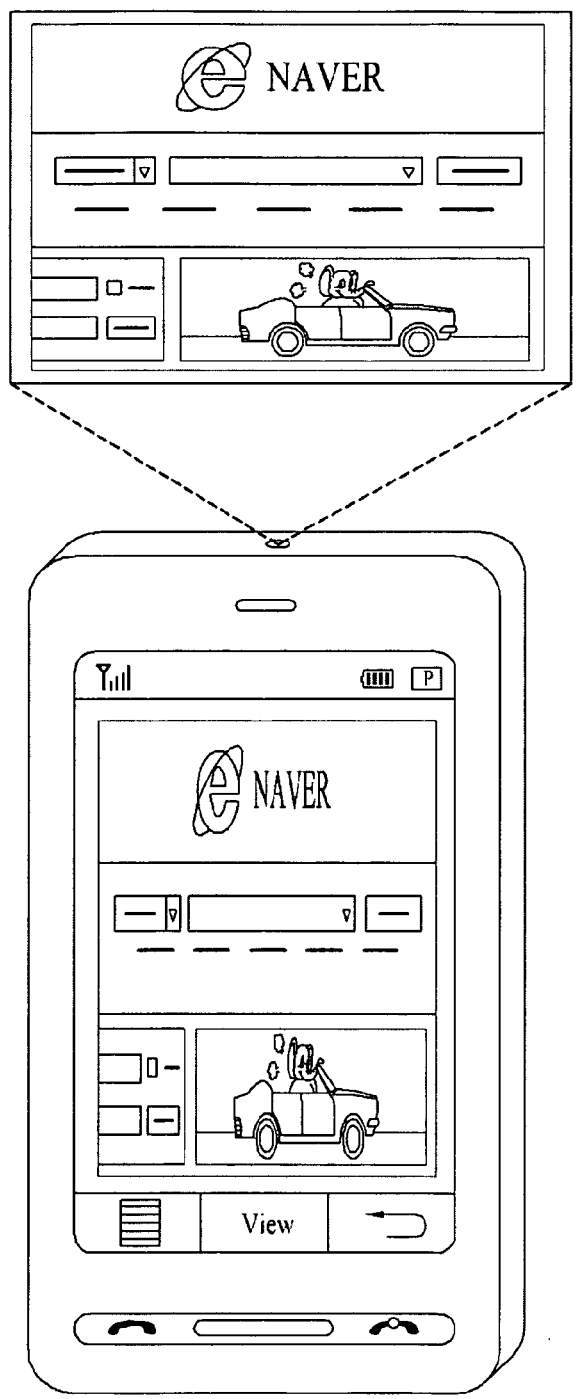
Figure 35C:
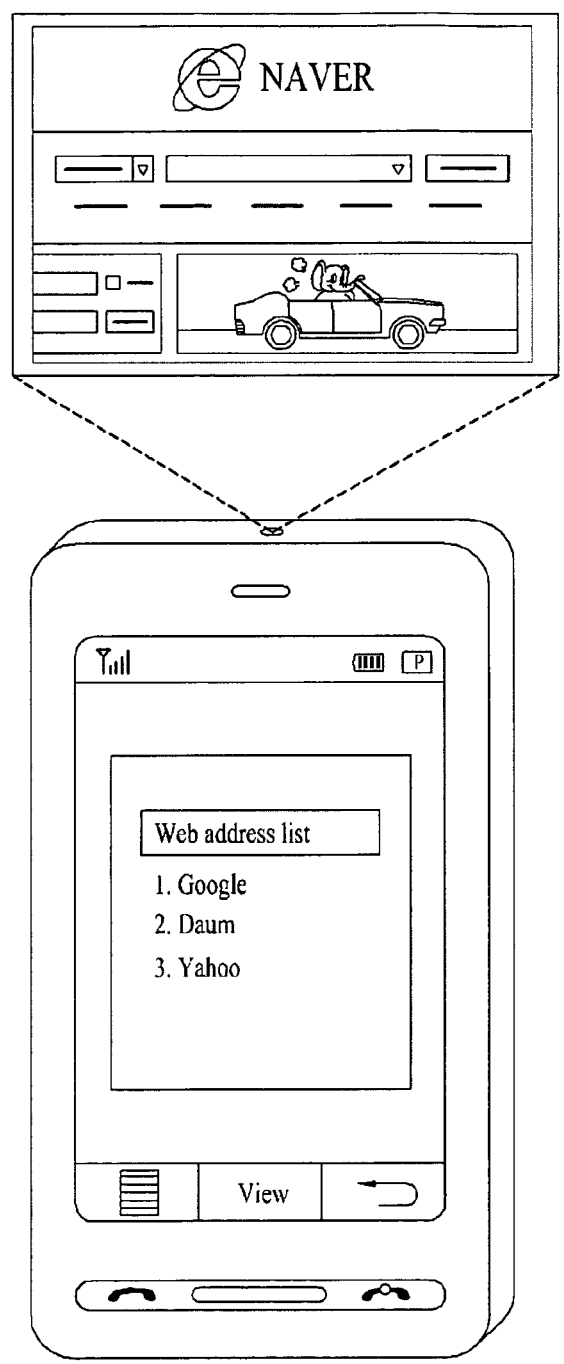

Referring to FIGS. 35A to 35C, if the mobile terminal 100 detects a touch and drag to one point of an icon region from one point of a first region in the course of displaying an internet access picture on the first region [FIG. 35A], the mobile terminal 100 is able to display the internet access picture on a projection plane [FIG. 35B or FIG. 35C]. In particular, the internet access picture is displayed on the first region as it is [FIG. 35B] or a web address list can be displayed on the first region [FIG. 35C].

Figure 36A:
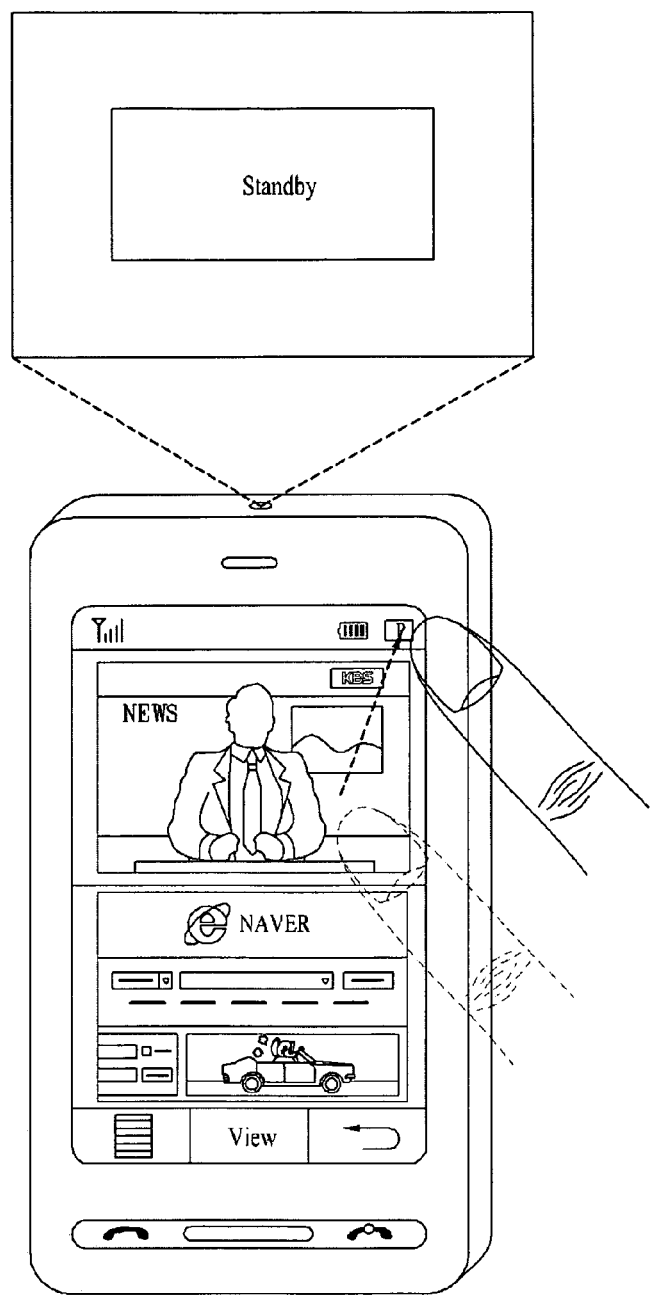
Figure 36B:
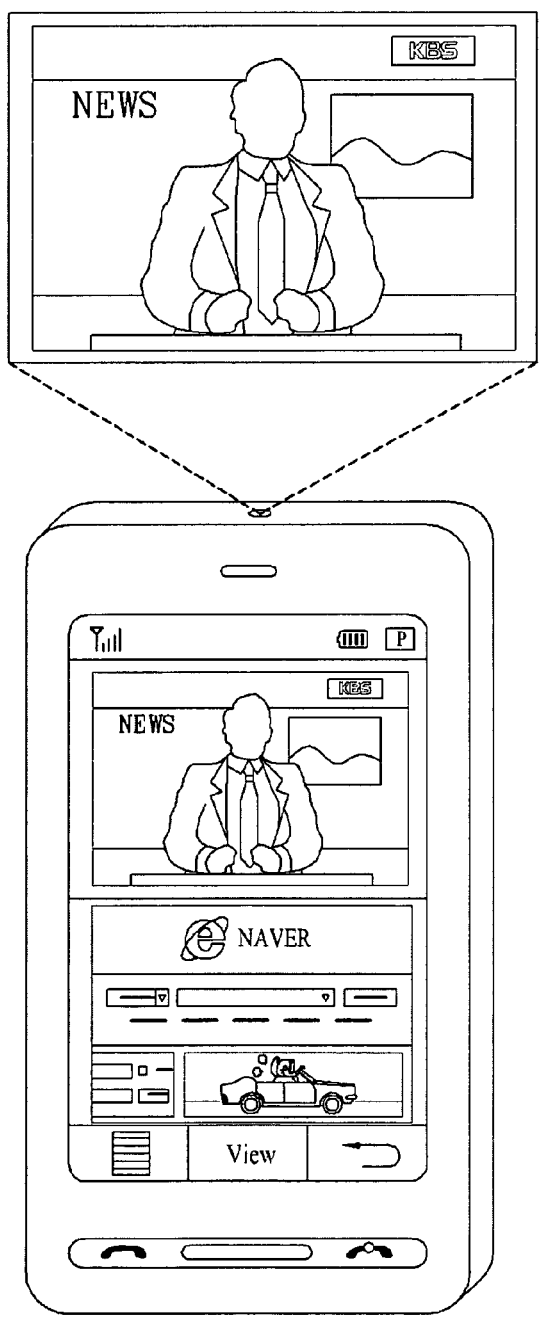
Figure 36C:
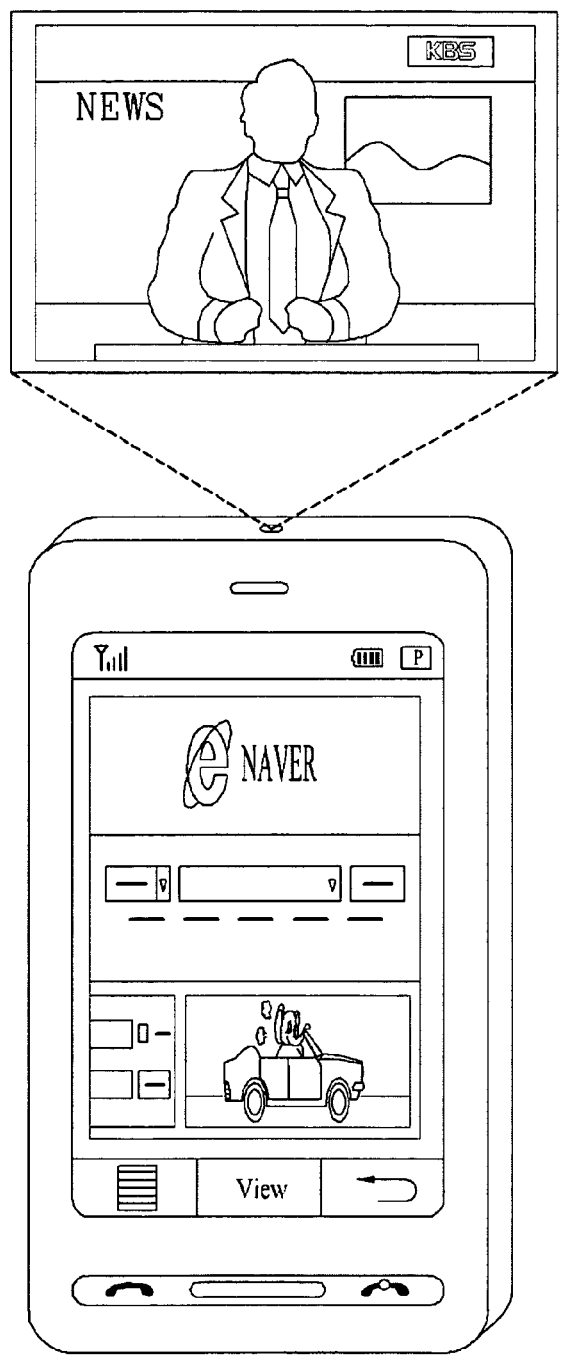

Referring to FIGS. 36A to 36C, if the mobile terminal 100 detects a touch and drag to one point of an icon region from one point of a broadcast output picture in the course of displaying a broadcast output picture and an internet access picture on a first region (assuming that both a broadcast output and an internet access are simultaneously in progress) [FIG. 36A], the mobile terminal 100 is able to display the broadcast output picture on a projection plane [FIG. 36B or FIG. 36C]. In particular, both of the broadcast output picture and the internet access picture are displayed on the first region as it is [FIG. 36B] or the internet access picture failing to be touched and dragged can be displayed on the first region only [FIG. 36C].

Figure 37A:
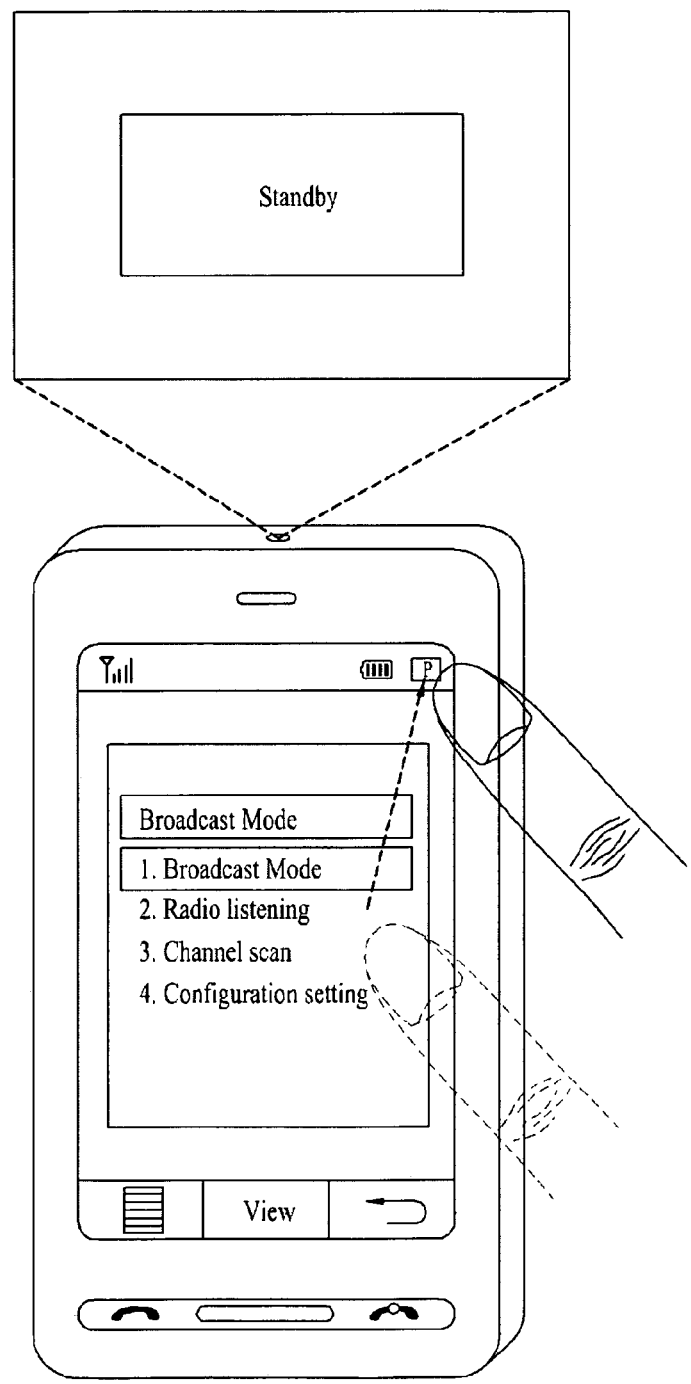
Figure 37B:
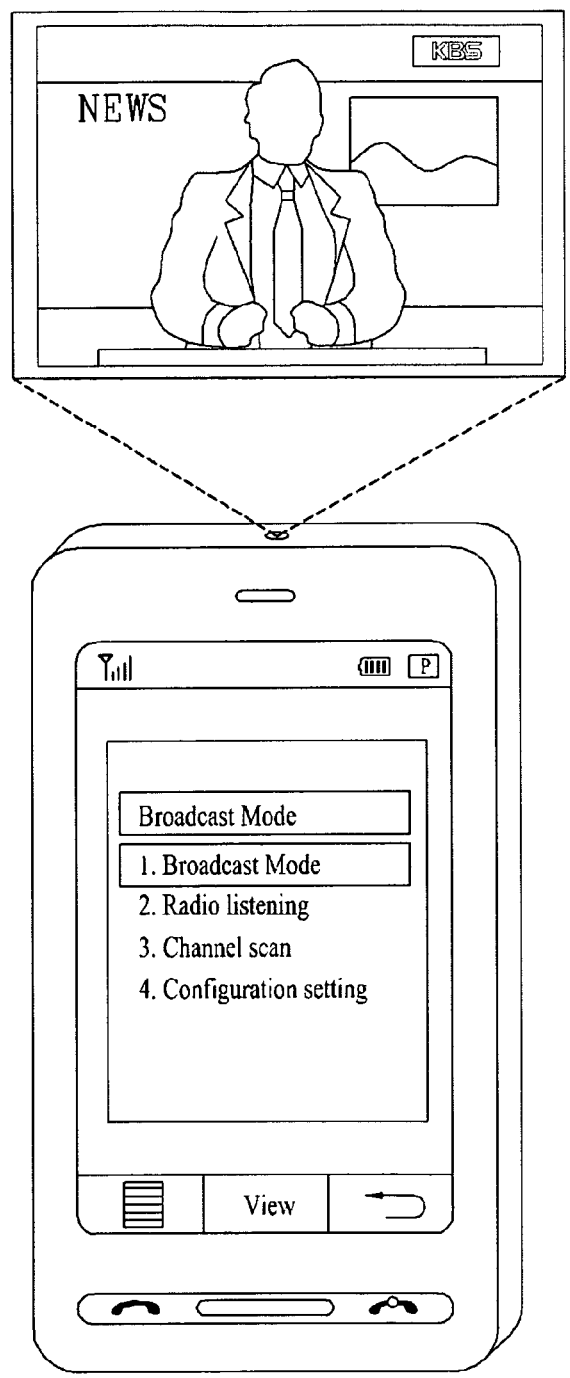

Referring to FIG. 37A and FIG. 37B, if the mobile terminal 100 detects a touch and drag to one point of an icon region from one point of 'TV viewing' region in a list in the course of displaying a broadcast mode relevant operation list on a first region [FIG. 37A], the mobile terminal 100 is able to display a broadcast output picture on a projection plane [FIG. 37B]. In doing so, the broadcast mode relevant operation list can keep being displayed on the first region.

Figure 38A:
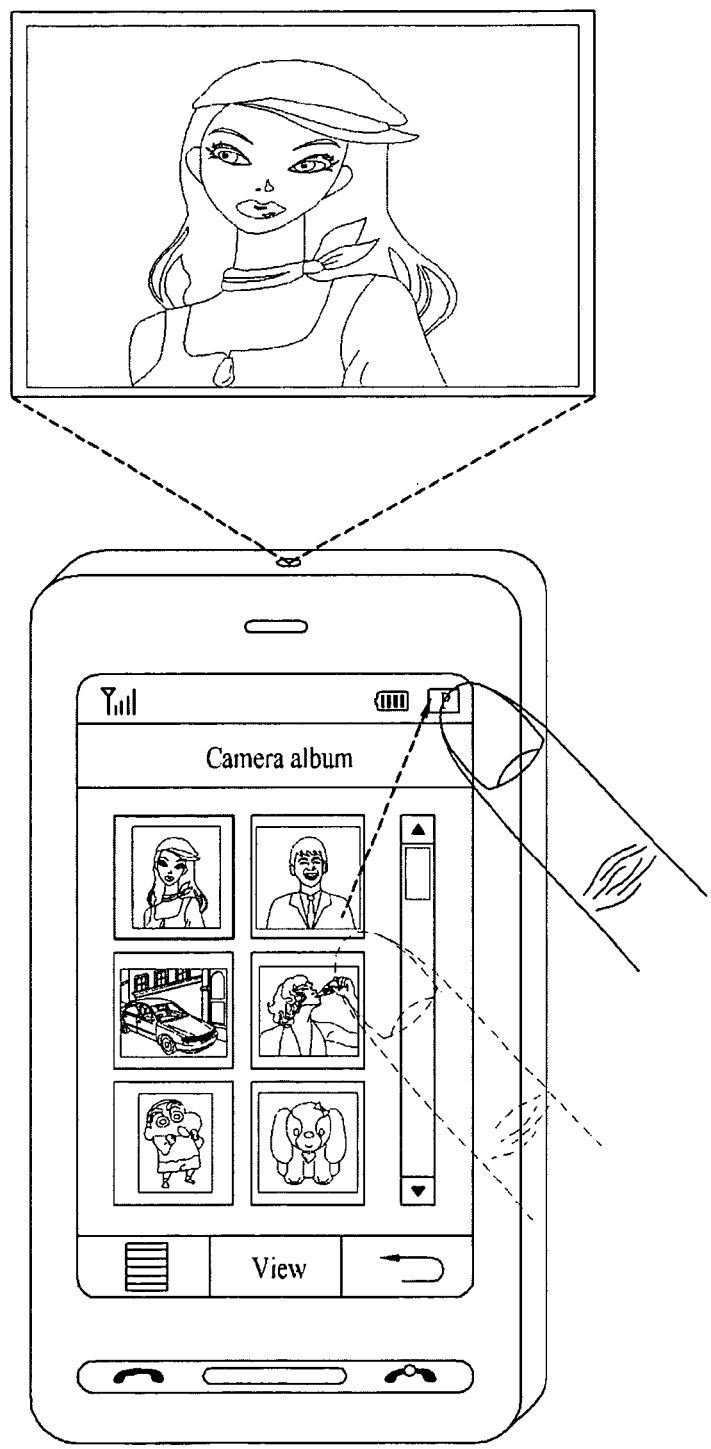
Figure 38B:
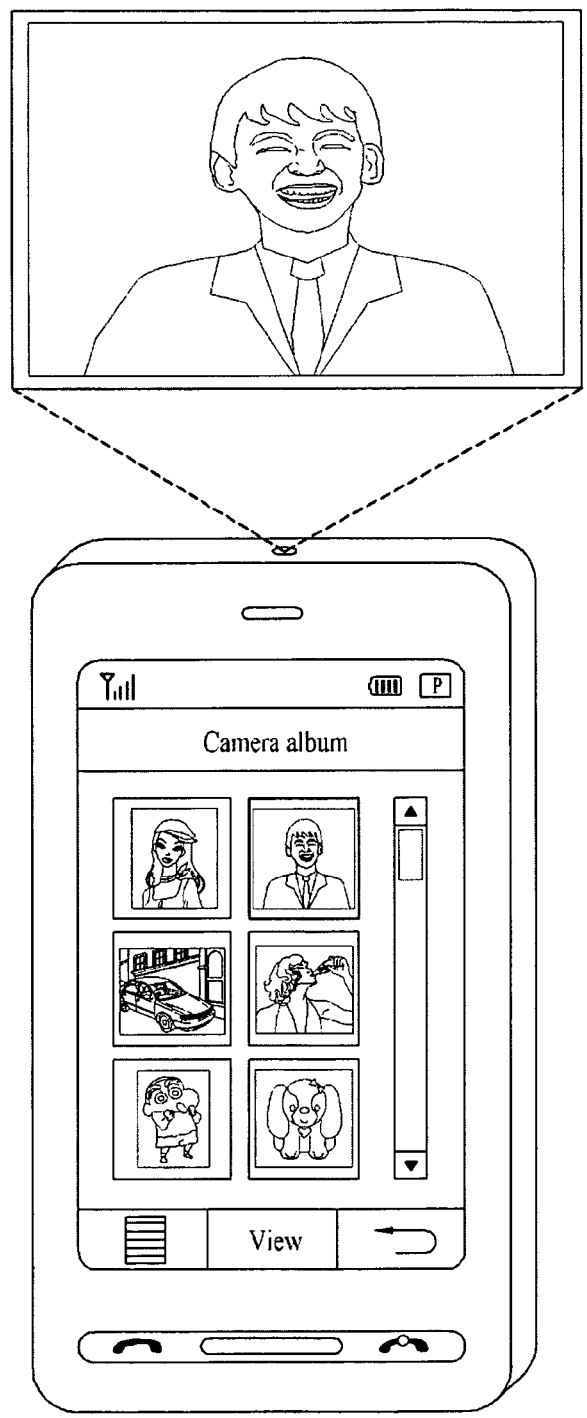
Figure 38C:
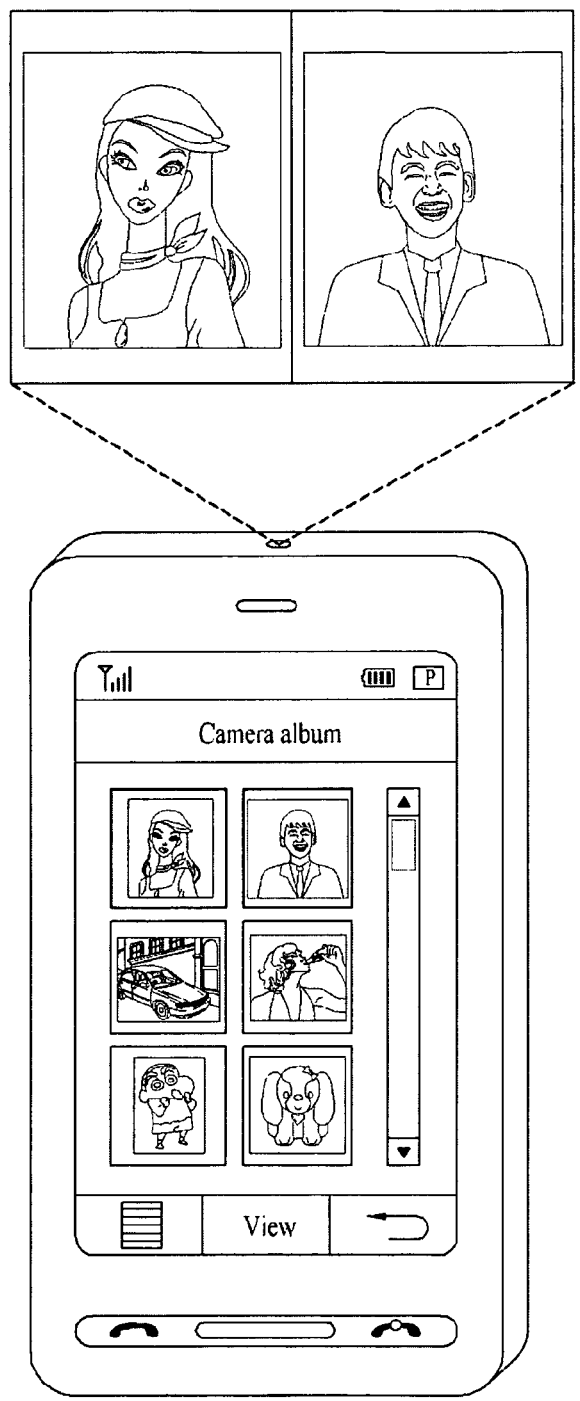

Referring to FIG. 38A and FIG. 38B, if the mobile terminal 100 detects a touch and drag to one point of an icon region from one point of 'second photo' region in a photo list in the course of displaying the photo list and a first photo on a first region and a projection plane, respectively [FIG. 38A], the mobile terminal 100 displays a second photo on the projection plane [FIG. 38B] or can display both of the first and second photos on the projection plane [FIG. 38C]. In doing so, the photo list can keep being displayed on the first region.

Figure 39A:
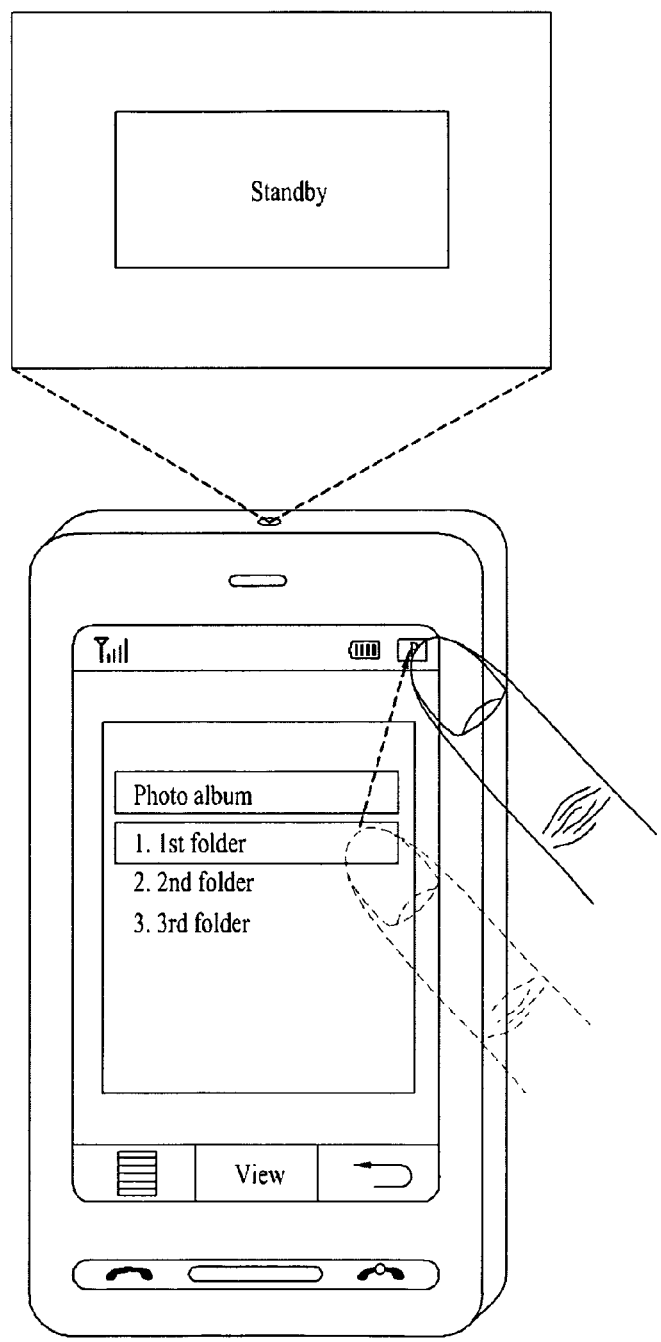
Figure 39B:
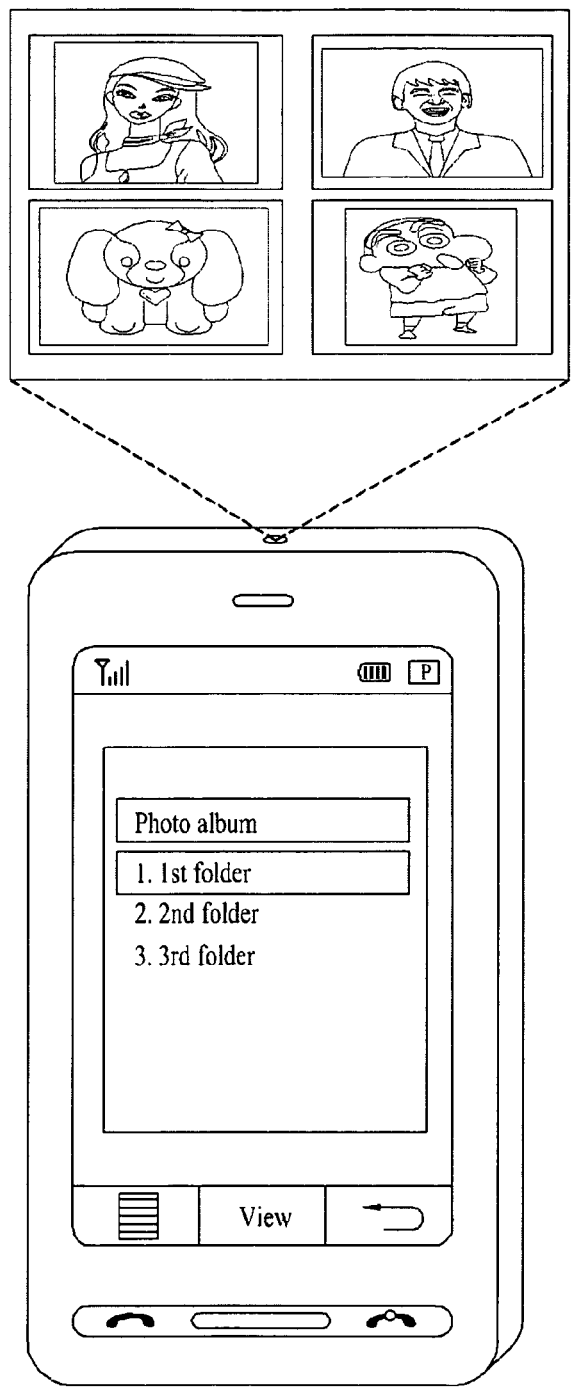

Referring to FIG. 39A and FIG. 39B, if the mobile terminal 100 detects a touch and drag to one point of an icon region from one point of 'first folder' region in a folder list in the course of displaying the folder list on a first region [FIG.

39A], the mobile terminal 100 is able to display data (e.g., a plurality of photos) included in a first folder on a projection plane [FIG. 39B]. In doing so, the folder list can keep being displayed on the first region.

Referring now to FIG. 32, the mobile terminal 100 is able to display the first or second image, which is being displayed on the projection plane using the projector module 155, on the first region to correspond to the touch inputted via the touch screen under the control of the controller 180.

This is explained with reference to FIGS. 40A to 41 as follows. For clarity, assume that the following description is limited to an icon region.

Figure 40A:
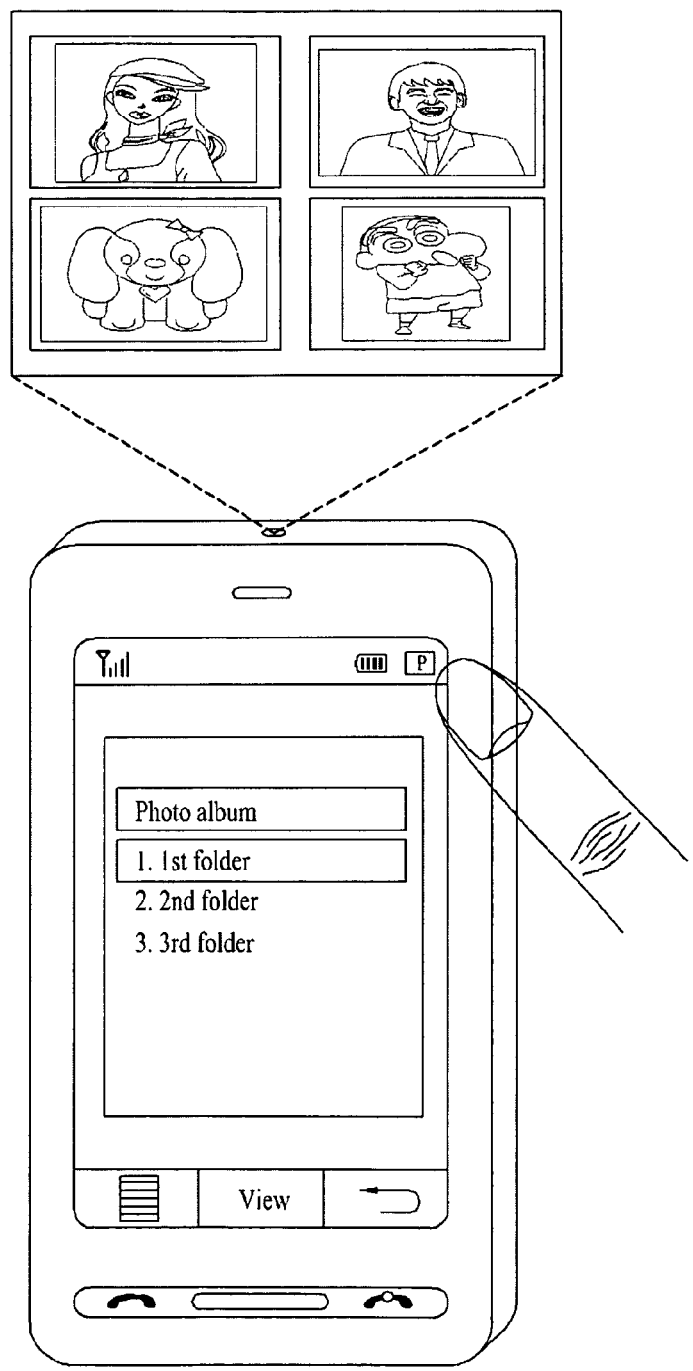
FIGS. 40A to 41 are diagrams for displaying an image displayed on a projection plane on a first region to correspond to a touch to a touch screen in a mobile terminal according to another embodiment.
Figure 40B:
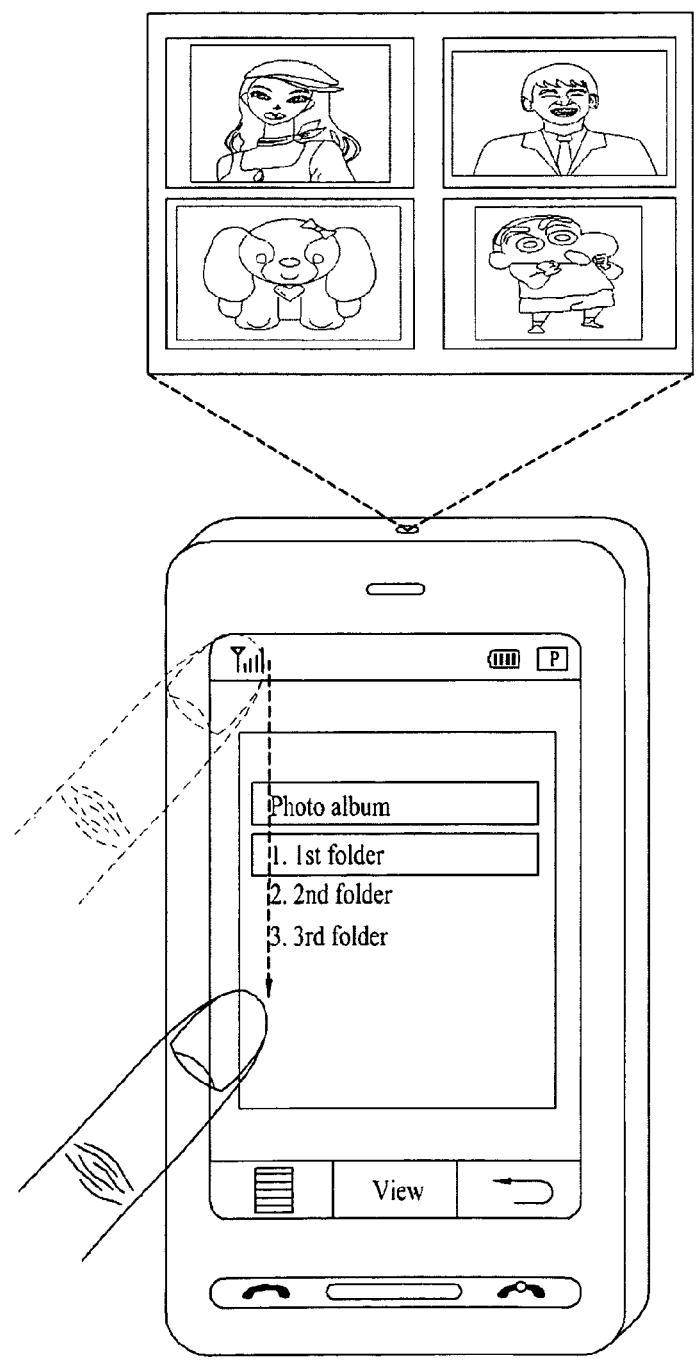
Figure 40C:
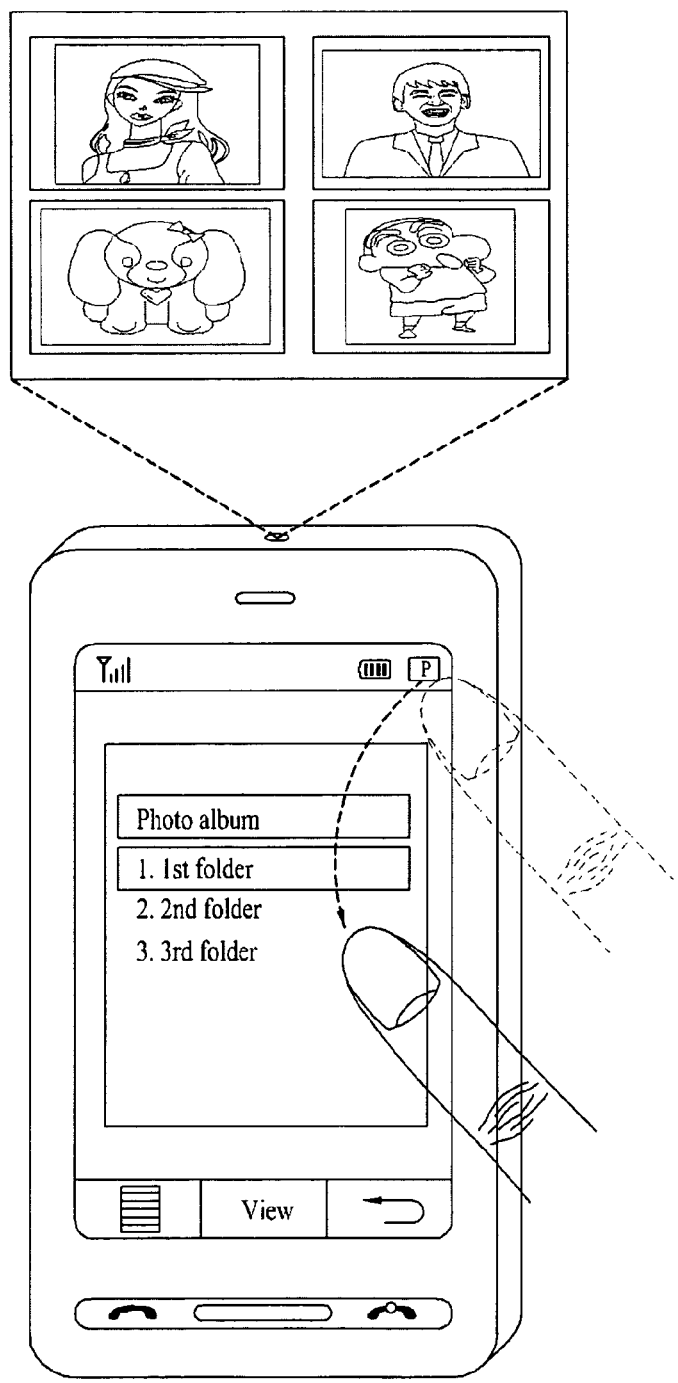
Figure 41:
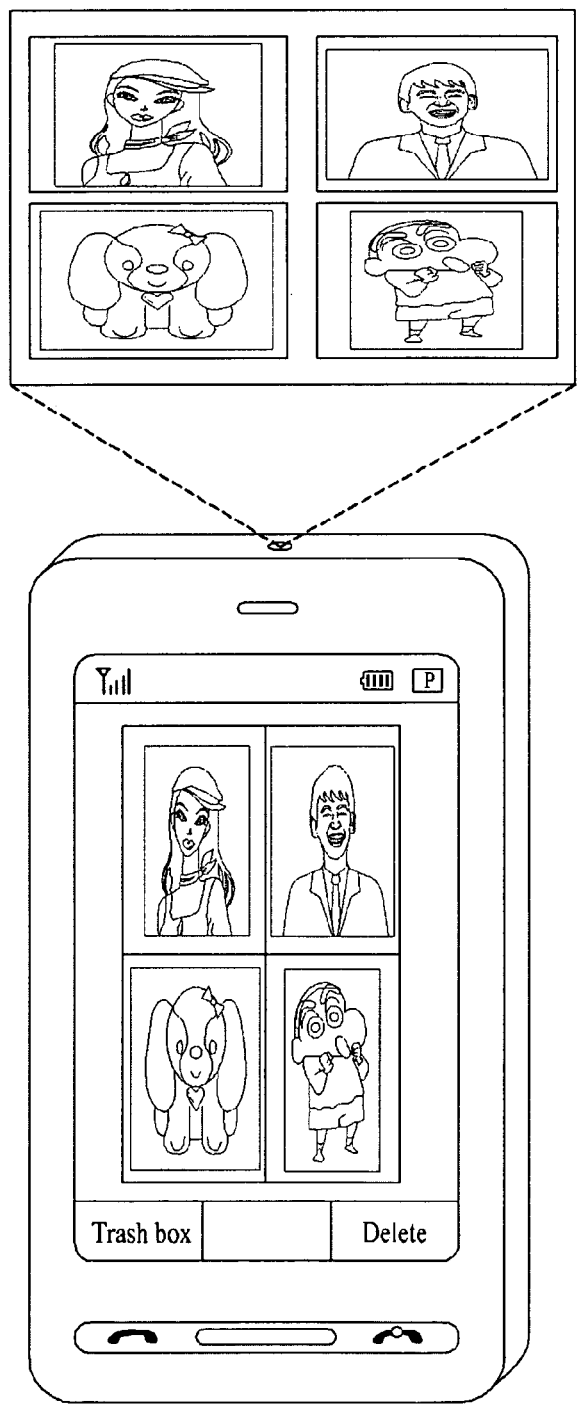

In one implementation, if the mobile terminal 100 detects a touch amounting to a predetermined count or duration to an icon region [FIG. 40A], a touch and drag, which amounts to a predetermined distance or longer, to bottom from a top of a first region [FIG. 40B] or a touch and drag to the first region from one point of the icon region [FIG. 40C], the mobile terminal 100 is able to display an image, which is displayed on a projection plane, to the first region [FIG. 41].

When a second region is an outer region, if the mobile terminal 100 detects a touch and drag amounting to a predetermined count or duration to the outer region, a touch and drag, which amounts to a predetermined distance or longer, to bottom from a top of a first region or a touch and drag to the first region from one point of the outer region, the mobile terminal 100 is able to display an image, which is displayed on a projection plane, to the first region [FIG. 41].

Referring now to FIG. 32, in the course of performing the displaying step S3240, the mobile terminal 100 detects a touch action corresponding to a delete command for a prescribed portion of the image displayed on the first region under the control of the controller 180 [S3250].

Subsequently, the mobile terminal 100 deletes the prescribed portion of the image displayed on the first region to correspond to the touch action detected in the detecting step S3250 under the control of the controller 180 [S3260].

Therefore, the image, from which the prescribed portion is deleted, can be displayed on the projection plane and the first region.

This is explained in detail with reference to FIGS. 42A to 43 as follows. For clarity, assume that the following description is limited to the case that first to fourth photos are displayed in a first region.

Figure 42A:
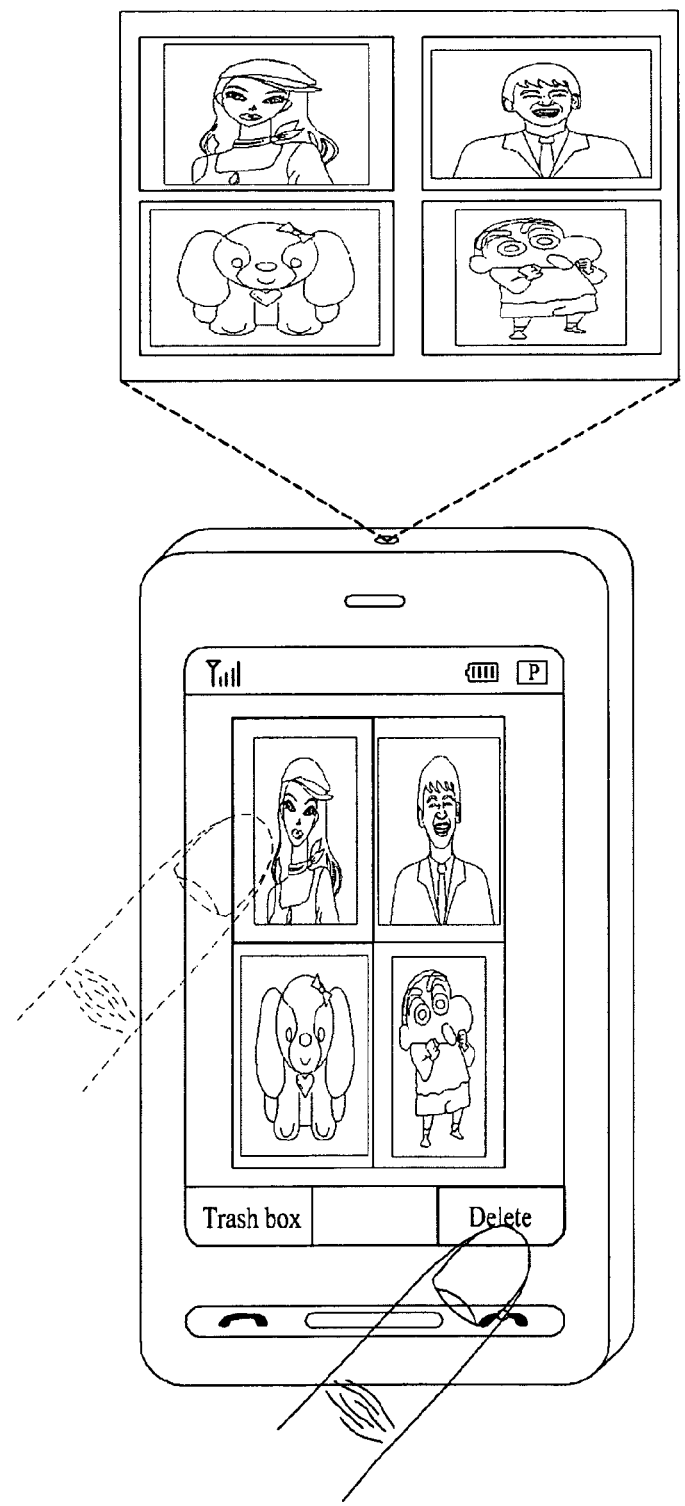
FIGS. 42A to 43 are diagrams for deleting a portion of an image while the image displayed on a projection plane is displayed on a first region in a mobile terminal according to another embodiment.
Figure 42B:
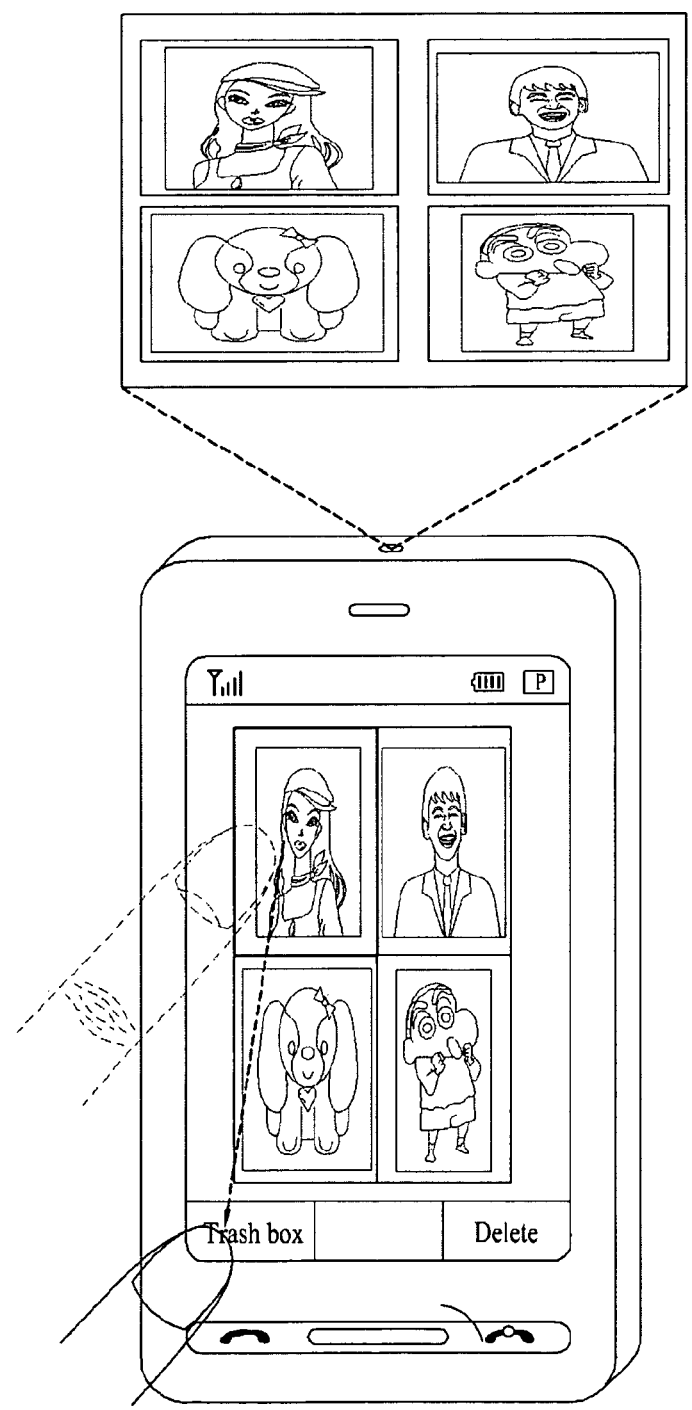
Figure 42C:
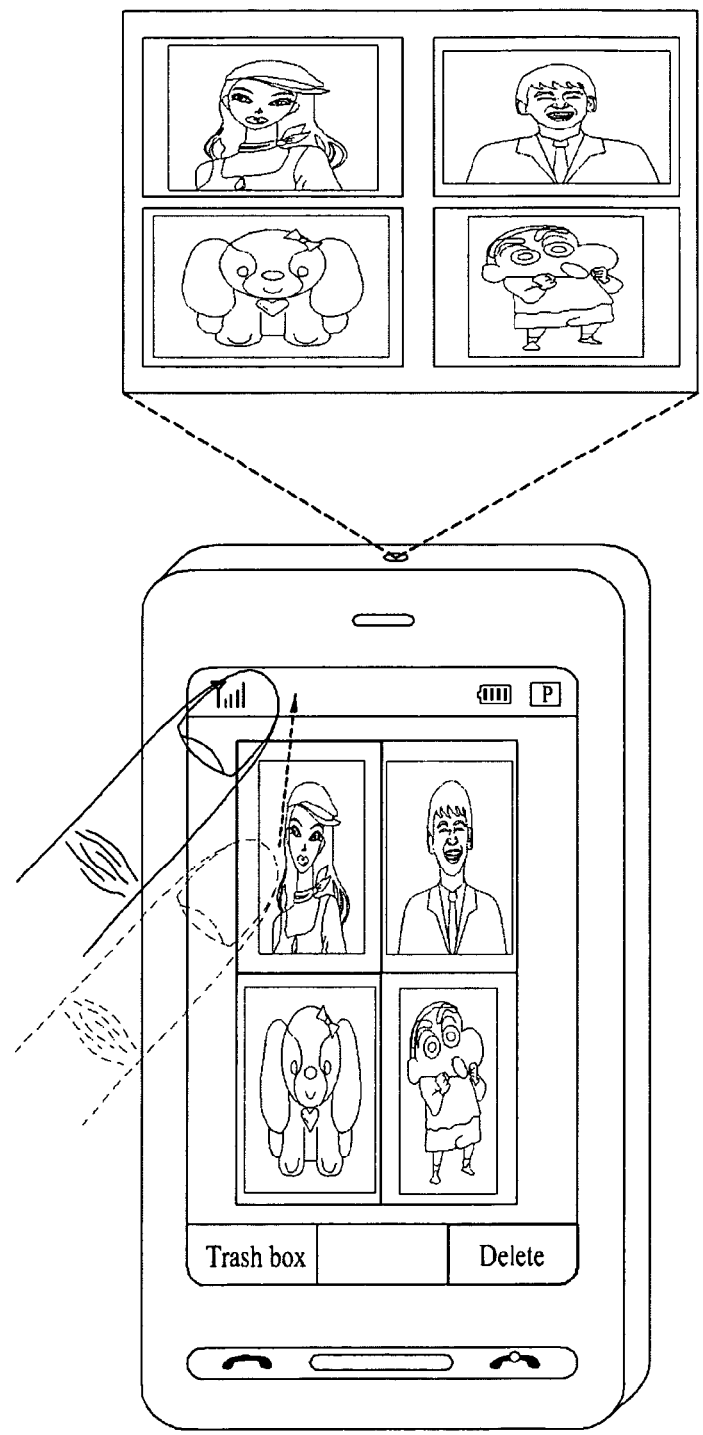
Figure 43:
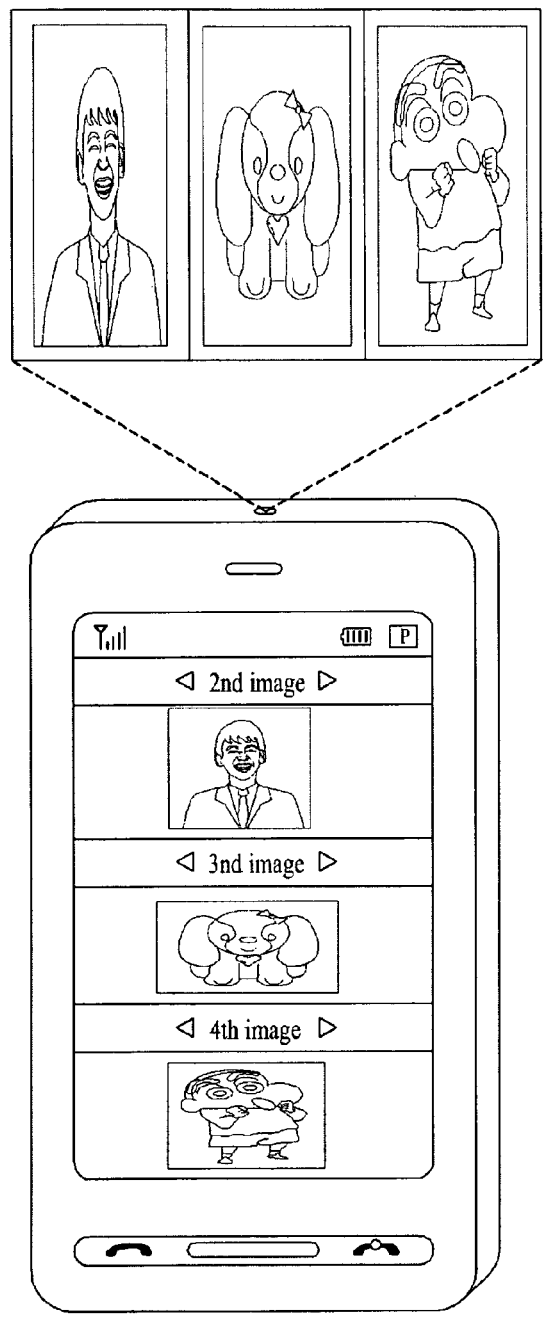

In one implementation, if the mobile terminal 100 detects a selection of 'delete region (or 'trash box region')' after selecting a first photo from first to fourth photos displayed in a first region [FIG. 42A], a touch and drag to one point of the 'delete region (or 'trash box region')' from one point of 'first photo' region [FIG. 42B] or a touch and drag to one point of an outer region from one point of the 'first photo' region [FIG. 42C], the mobile terminal 100 is able to display the second to fourth photos on a projection region and the first region [FIG. 43].

Under the control of the controller 180, the mobile terminal 100 according to the present disclosure is able to display an image on the projection plane in a same direction of an image display direction in the first region or in a direction rotated at a predetermined angle from the image display direction in the first region by comparing the two directions to each other.

The image display direction on the projection plane is set by a selection made by a user or can be set according to projection plane size information (horizontal/vertical length) obtained from a projection plane picture inputted via the camera.

For instance, if a user selects a rotation by 90 degrees to the left, the image display direction on the projection plane can be set to a direction rotated by 90 degrees to the left from the image display direction on the first region.

Once it is determined that a horizontal length of the projection plane is greater than a vertical direction, the image display direction on the projection plane can be set to the horizontal direction (or a direction rotated by 90 degrees to the left) if the image display direction on the first region is the horizontal direction (or the vertical direction).

For instance, referring to FIG. 43, even if the image display direction on the first region is 'vertical direction', the mobile terminal 100 is able to display an image in 'horizontal direction' rotated by 90 degrees to the left on the projection plane.

Under the control of the controller 180, the mobile terminal 100 according to the present disclosure is able to stop displaying the image, which is displayed on the projection plane, on the first region to correspond to a touch action inputted via the touch screen in the course of performing the displaying step S3240.

Figure 44A:
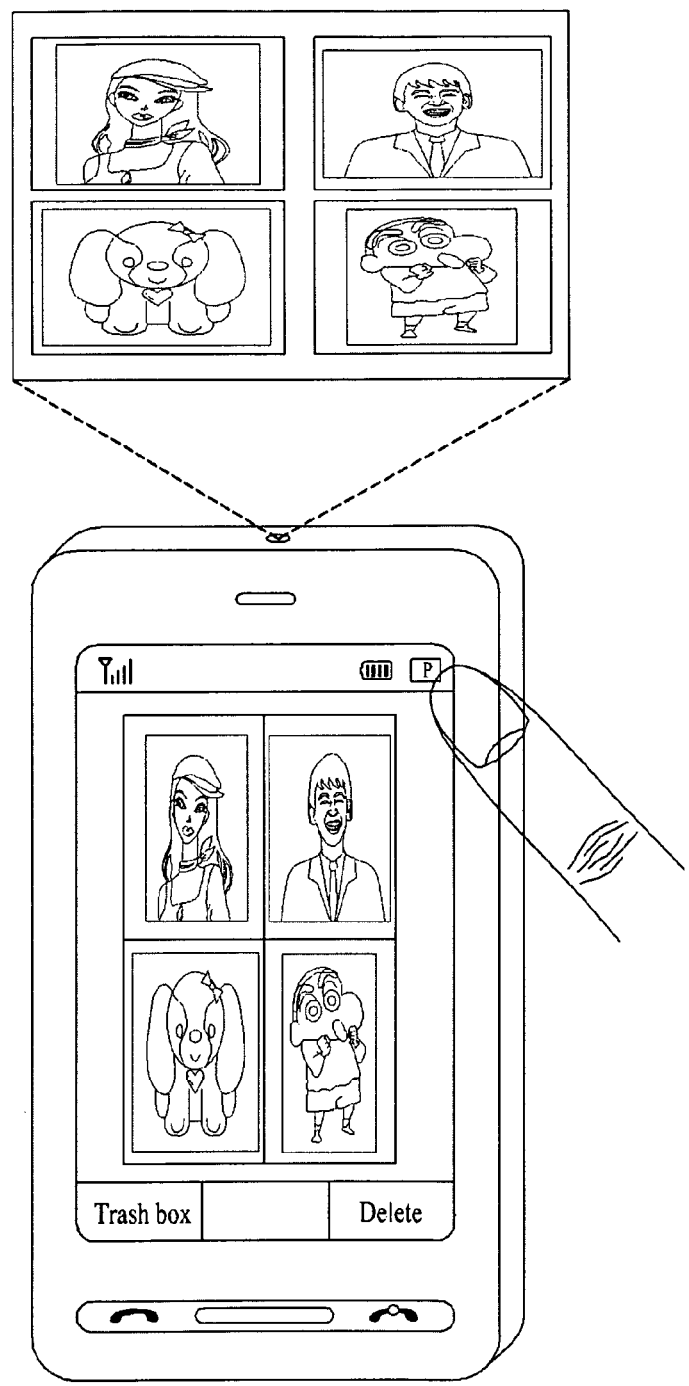
FIGS. 44A to 44C are diagrams for inputting a touch for returning to a previous state while an image displayed on a projection plane is displayed on a first region in a mobile terminal according to another embodiment.
Figure 44B:
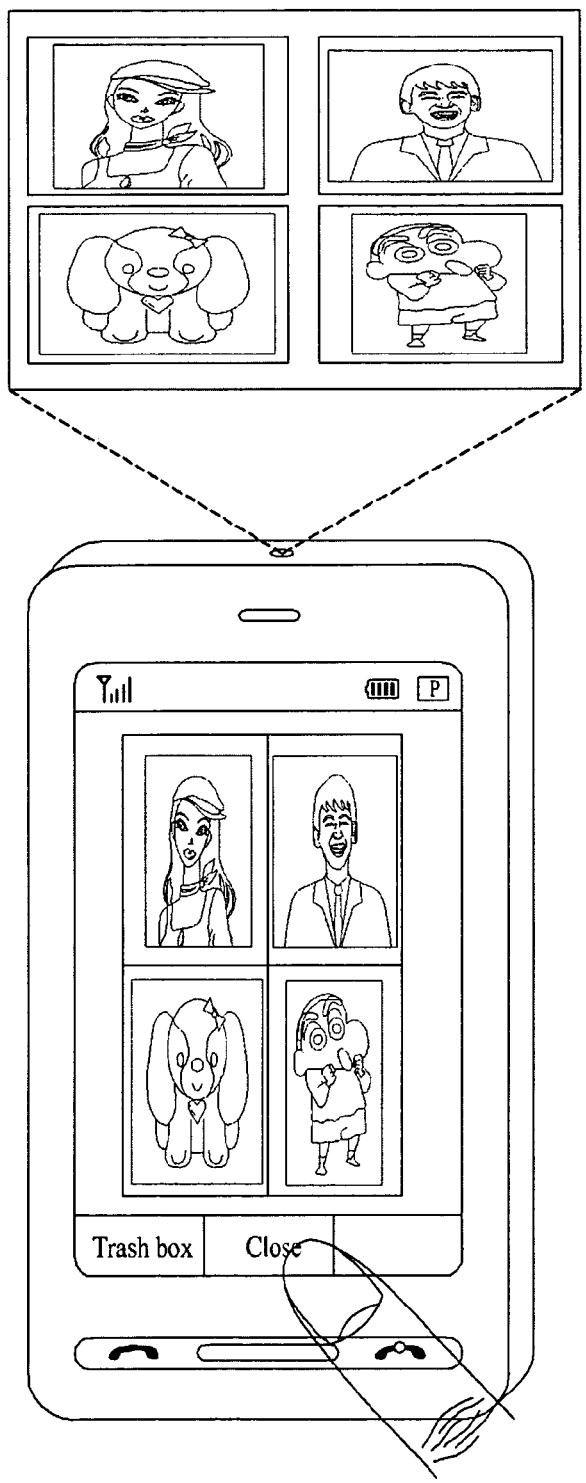
Figure 44C:
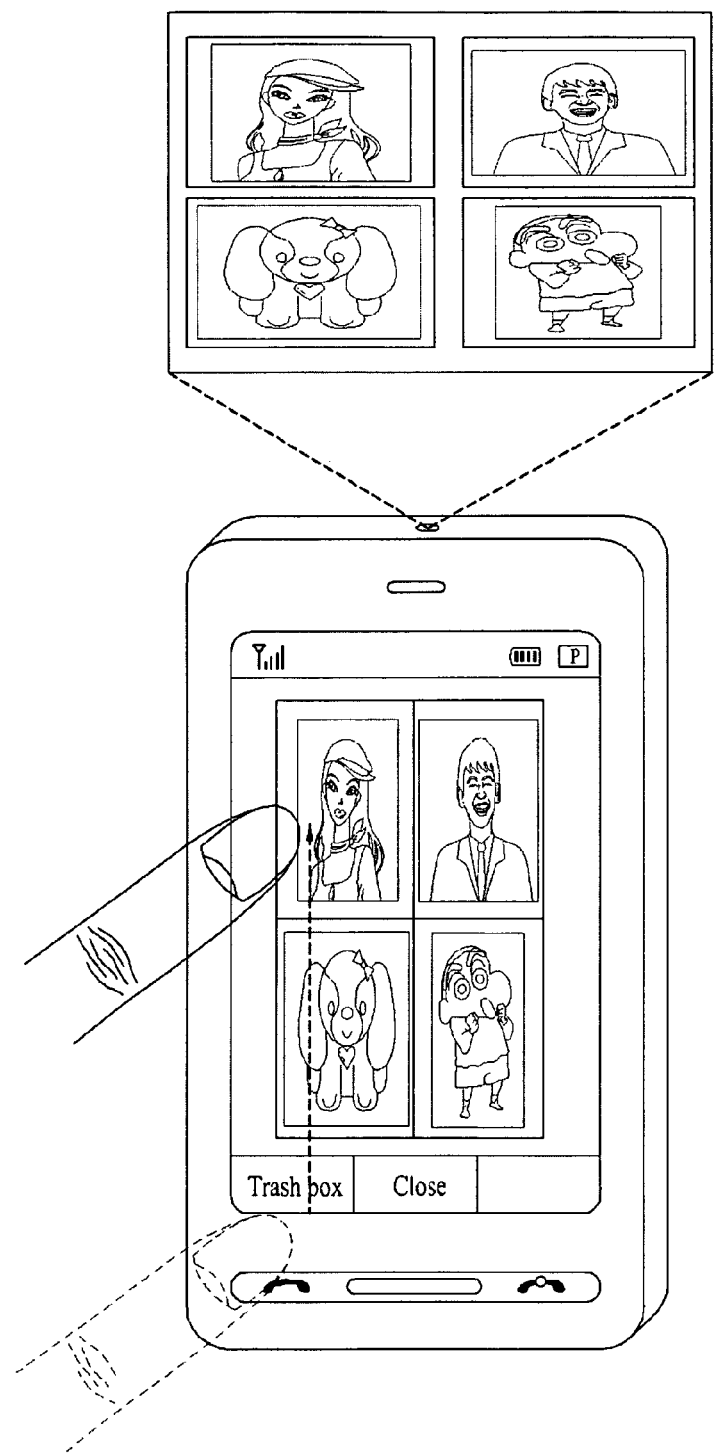

Referring to FIGS. 44A to 44C, the mobile terminal 100 is able to stop displaying the image, which is displayed on the projection plane, on the first region if a touch, which amounts to a predetermined count or duration, to the second region is inputted [FIG. 44A], a touch to 'close region' provided to the screen is inputted [FIG. 44B], or a touch and drag to a top from an edge of a bottom of the first region is inputted [FIG. 44C].

According to one embodiment of the present disclosure, the above-described touch recognizing methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). Accordingly, the present disclosure provides the following effects and/or advantages.

Since a projection region and a non-projection region are provided to a touchscreen, it is able to display an image, which is displayed on the projection region, on a projection only. Therefore, a picture for controlling an image displayed on the projection region and a projection plane can be displayed on the non-projection region.

Secondly, an image displayed on a display region to correspond to a touch to a display region and an outer region (or an icon region) on a touchscreen or an image corresponding to a touch point of a display region can be displayed on a projection plane. Therefore, the present disclosure is able to display a picture for controlling an image, which is displayed on the projection plane, on the display region.

It will be apparent to those skilled in the art that various modifications and variations can be made in the present disclosure without departing from the spirit or scope of the disclosure. Thus, it is intended that the present disclosure covers the modifications and variations of this disclosure provided they come within the scope of the appended claims and their equivalents.

What is claimed is:

1. A mobile communication terminal comprising:
   a projection module configured to project images on a projection surface external to the mobile communication terminal;
   a touchscreen configured to display a first region and a second region such that a first image is rendered on the first region and a second image is rendered on the second region;
   a controller configured to:
      designate the first region as a projection region and cause the projection module to project the first image that is rendered on the designated projection region onto the projection surface; and
      designate the second region as a non-projection region such that the second image that is rendered on the designated non-projection region is not projected onto the projection surface,
      wherein if the second image rendered on the designated non-projection region is selected while projecting the first image rendered on the designated projection region, the controller is further configured to:
         move the second image from the designated non-projection region to the designated projection region such that the first image and the second image are rendered on the designated projection region simultaneously; and
         cause the project module to project the first image and the second image simultaneously onto the projection surface.

2. The mobile communication terminal of claim 1, wherein:
   the second image rendered on the designated non-projection region is selected in response to a user input received via the touchscreen, and
   the user input comprises touching at least a first point of the non-projection region and touching at least a second point of the projection region.

3. The mobile communication terminal of claim 2, wherein the user input comprises a touch and drag from the first point to the second point or from the second point to the first point.

4. The mobile communication terminal of claim 2, wherein the controller is further configured to display a third image on the designated non-projection region instead of the second image when the second image is moved from the designated non-projection region to the designated projection region.

5. The mobile communication terminal of claim 1, wherein:
   the touchscreen is divided into the first region and the second region in response to a first touch input,
   the first touch input comprises touching the touchscreen at a first point and at a second point, and
   the first and second regions are separated by a single imaginary line connecting the first point and the second point.

6. The mobile communication terminal of claim 5, wherein the first touch input comprises touch and drag.

7. The mobile communication terminal of claim 5, wherein the first region is designated as the projection region in response to a second touch input received at the first region after the touchscreen has been divided into the first region and the second region in response to the first touch input.

8. The mobile communication terminal of claim 5, wherein the controller is further configured to assign a specific number to each of the first and second regions when a second user input is received such that the assigned specific number is displayed on a portion of each of the first and second regions when the touchscreen is divided.

9. The mobile communication terminal of claim 8, wherein the controller is further configured to designate the first region as the projection region when the specific number assigned to the first region is selected.

10. The mobile communication terminal of claim 9, wherein the specific number is selected in response to an input received via a numeric key corresponding to the assigned specific number.

11. The mobile communication terminal of claim 1, wherein the first region and the second region are fixed when the touchscreen is divided into the first region and the second region, and the first region and the second region remain as the projection region and the non-projection region, respectively, once the first region and the second region are designated as the projection region and the non-projection region, respectively.

12. A method of projecting images rendered on a touchscreen of a mobile communication terminal comprising a projection module, the method comprising:
   rendering a first image and a second image on the touchscreen of the mobile communication terminal, the touchscreen displaying a first region and a second region such that the first image is rendered on the first region and the second image is rendered on the second region;
   designating the first region as a projection region such that the first image rendered on the designated projection region is projected by the projection module onto a projection surface external to the mobile communication terminal;
   designating the second region as a non-projection region such that the second image that is rendered on the designated non-projection region is not projected onto the projection surface;
   projecting the first image displayed on the projection region onto the projection surface;
   selecting the second image rendered on the designated non-projection area while projecting the first image rendered on the designated projection region;
   moving the second image from the designated non-projection region to the designated projection region such that the first image and the second image are rendered on the designated projection region simultaneously; and
   projecting the first image and the second image displayed on the projection region onto the projection surface simultaneously.

13. The method of claim 12, wherein:
   the second image rendered on the designated non-projection region is selected in response to a user input received via the touchscreen, and
   the user input comprises touching at least a first point of the non-projection region and touching at least a second point of the projection region.

14. The method of claim 13, wherein the user input comprises a touch and drag from the first point to the second point or from the second point to the first point.

15. The method of claim 13, further comprising displaying a third image, instead of the second image, on the designated non-projection region such that the touchscreen displays the first image and the second image concurrently on the first region and displays the third image on the second region.

16. The method of claim 12, wherein the touchscreen receives a first touch input, and the method further comprises:
   dividing the touchscreen into the first region and the second region, in response to the first touch input, the first touch input comprising touching the touchscreen at a first point and at a second point, wherein the first and second regions are separated by a single imaginary line connecting the first point and the second point.

* * * * *